United States Patent
Pang

(10) Patent No.: US 12,013,739 B2
(45) Date of Patent: Jun. 18, 2024

(54) DATA TRANSMISSION METHOD AND DATA TRANSMISSION DEVICE

(71) Applicants: GUANGZHOU SHIYUAN ELECTRONIC TECHNOLOGY COMPANY LIMITED, Guangzhou (CN); GUANGZHOU SHIRUI ELECTRONICS CO., LTD., Guangzhou (CN)

(72) Inventor: Yuanyang Pang, Guangzhou (CN)

(73) Assignees: GUANGZHOU SHIYUAN ELECTRONIC TECHNOLOGY COMPANY LIMITED, Guangzhou (CN); GUANGZHOU SHIRUI ELECTRONICS CO., LTD., Guangzhou (CN)

(*) Notice: Subject to any disclaimer, the term of this patent is extended or adjusted under 35 U.S.C. 154(b) by 157 days.

(21) Appl. No.: 17/556,984

(22) Filed: Dec. 20, 2021

(65) Prior Publication Data
US 2022/0116237 A1 Apr. 14, 2022

Related U.S. Application Data

(63) Continuation of application No. PCT/CN2020/139260, filed on Dec. 25, 2020.

(30) Foreign Application Priority Data

Nov. 8, 2019 (CN) .......................... 201921922693.4
Nov. 8, 2019 (CN) .......................... 201921922694.9
May 29, 2020 (CN) .......................... 202010479265.X

(51) Int. Cl.
*G06F 3/14* (2006.01)
*G06F 1/26* (2006.01)
(Continued)

(52) U.S. Cl.
CPC ............ *G06F 1/3231* (2013.01); *G06F 1/263* (2013.01); *G06F 1/266* (2013.01);
(Continued)

(58) Field of Classification Search
CPC ........ G06F 1/3231; G06F 1/263; G06F 1/266; G06F 13/4282; G06F 3/1454;
(Continued)

(56) References Cited

U.S. PATENT DOCUMENTS

2003/0104821 A1* 6/2003 Gerner ...................... G01S 5/02
455/574
2014/0286323 A1 9/2014 Hsu et al.
(Continued)

FOREIGN PATENT DOCUMENTS

CN 102982653 A 3/2013
CN 105799735 A 7/2016
(Continued)

OTHER PUBLICATIONS

International Search Report issued in corresponding international application No. PCT/CN2020/139260, dated Mar. 24, 2020, 10 pages.
(Continued)

*Primary Examiner* — Shean Tokuta
(74) *Attorney, Agent, or Firm* — BAYES PLLC

(57) ABSTRACT

This application provides a data transmission method and a data transmission device. The data transmission device is provided with a microcontroller, a power supply, and a vibration sensor. When the vibration sensor detects that the user moves the data transmission device, the microcontroller controls the power supply to supply power to the data transmission module, so that the data transmission module starts to activate before the data transmission device is connected to the electronic device, thereby improving the
(Continued)

response speed and work efficiency of the data transmission device. Meanwhile, the power supply does not need to supply power to the data transmission module constantly, which reduces the capacity and volume of the power supply.

19 Claims, 28 Drawing Sheets

(51) Int. Cl.
    *G06F 1/3231*     (2019.01)
    *G06F 13/42*     (2006.01)
    *G09G 3/20*     (2006.01)
    *H04L 12/10*     (2006.01)
    *H04N 7/15*     (2006.01)

(52) U.S. Cl.
    CPC ........ *G06F 13/4282* (2013.01); *G06F 3/1454* (2013.01); *G06F 2213/0016* (2013.01); *G06F 2213/0042* (2013.01); *G09G 3/2092* (2013.01); *G09G 2330/021* (2013.01); *G09G 2370/16* (2013.01); *H04L 12/10* (2013.01); *H04N 7/15* (2013.01)

(58) Field of Classification Search
    CPC .... G06F 2213/0016; G06F 2213/0042; G09G 3/2092; G09G 2330/021; G09G 2370/16; H04L 12/10; H04N 7/15
    See application file for complete search history.

(56) References Cited

U.S. PATENT DOCUMENTS

| | | |
|---|---|---|
| 2015/0312240 A1 | 10/2015 | Fu |
| 2017/0148414 A1* | 5/2017 | Hsu .......................... G06T 1/20 |
| 2017/0287347 A1 | 10/2017 | Liau |
| 2019/0026058 A1* | 1/2019 | Chen ....................... G09G 5/12 |
| 2021/0144335 A1 | 5/2021 | Pang |

FOREIGN PATENT DOCUMENTS

| | | | |
|---|---|---|---|
| CN | 107046736 A | | 8/2017 |
| CN | 108340803 A | | 7/2018 |
| CN | 108829227 A | | 11/2018 |
| CN | 208421800 U | | 1/2019 |
| CN | 109683928 A | | 4/2019 |
| CN | 209118258 U | | 7/2019 |
| CN | 209153677 U | * | 7/2019 |
| CN | 111641431 A | | 9/2019 |
| CN | 110442366 A | | 11/2019 |
| CN | 112181339 U | | 1/2021 |
| JP | 2015022043 A | * | 2/2015 |
| WO | WO-2005081565 A1 | * | 9/2005 .......... H04B 1/1615 |

OTHER PUBLICATIONS

Notification of International Search Report issued in corresponding international application No. PCT/CN2020/139260, dated Jan. 13, 2021, 1 pages.
International Search Report with invention tile of 一种无线传屏的远程配对升级方法, 6 pages.

* cited by examiner

DATA TRANSMISSION METHOD AND DATA TRANSMISSION DEVICE

CROSS-REFERENCE TO RELATED APPLICATION

The present application is a continuation of International Application No. PCT/CN2020/139260, filed on Dec. 25, 2020, which claims the benefit of priority to Chinese Patent Application No. 201921922693.4, filed on Nov. 8, 2019, Chinese Patent Application No. 201921922694.9, filed on Nov. 8, 2019, and Chinese Patent Application No. 202010479265.X, filed on May 29, 2020, all of which are incorporated herein by reference in their entireties.

TECHNICAL FIELD

This application relates to the electronic technology, in particular to a data transmission method and a data transmission device.

BACKGROUND

In order to help people communicate at the conference, traditional technology provides many technical solutions, for example, projecting a presentation on the screen for displaying and sharing, remote instant communication, and a large-screen touch panel for providing a writing canvas. Another way is to use a data transmission device which includes a communication interface and a data transmission module. When the communication interface is plugged into the corresponding interface of the user's electronic device through a connecting line, the display interface of the user's electronic device can be transmitted to the large-screen tablet in the conference room through the data transmission module.

In traditional technologies, after some data transmission devices are connected to the electronic devices, the electronic devices can supply power to the data transmission device. However, the data transmission module in the data transmission device does not start the configuration process such as initialization until the data transmission device is connected to the electronic device and is powered on. The data transmission module starts to work after a period for completing configuration, which increases the configuration time of the data transmission device and reduces the response speed and work efficiency of the data transmission device. In another traditional technology, a power supply can be arranged in the data transmission device to supply power to the data transmission module, so that the data transmission module is maintained in the power-on state. Thus, the display interface of the electronic device can be projected on a screen immediately to improve efficiency after the data transmission device is connected to the electronic device, which however places higher requirements on the capacity and volume of the power supply, causing that the power supply occupies a lot of space in the data transmission device.

Therefore, a technical problem to be solved in this field is how to balance the space and efficiency of the data transmission device, so that it is possible to improve the response speed and work efficiency of the data transmission device during projection without requiring excessive capacity and volume of the power supply.

SUMMARY

This application provides a data transmission method and a data transmission device to solve the technical problem in the prior art of low work efficiency of the data transmission device.

A first aspect of this application provides a data transmission method, applied to a data transmission device, characterized in that the data transmission device includes a power supply, a microcontroller, a communication interface, a vibration sensor, a controllable switch and a data transmission module. The controllable switch is connected between the power supply and the data transmission module, the communication interface is used to receive data and transmit the received data to the data transmission module, the vibration sensor is used to generate detection data according to movement of the data transmission device, the data transmission module is used for data communication with a display device, and the microcontroller is used to control the on and off of the controllable switch according to an interrupt signal transmitted by the vibration sensor. The data transmission method includes that the vibration sensor generates the detection data according to the movement of the data transmission device. The detection data includes an acceleration value of the vibration sensor itself. When the vibration sensor determines that the acceleration value of the vibration sensor itself exceeds a preset acceleration threshold, the vibration sensor transmits the interrupt signal to the microcontroller. After the microcontroller receives the interrupt signal, the microcontroller transmits a first connection signal to the controllable switch. The controllable switch is turned on according to the first connection signal and the power connection between the power supply and the data transmission module is connected. The data transmission module performs a communication configuration. The communication configuration includes a communication configuration of the communication interface, and/or a communication configuration for data communication between the data transmission module and the display device.

A second aspect of this application provides a data transmission device, which includes a power supply, a microcontroller, a communication interface, a vibration sensor, a controllable switch and a data transmission module. The controllable switch is connected between the power supply and the data transmission module. The communication interface is used to receive data and transmit the received data to the data transmission module. The vibration sensor is used to generate detection data according to movement of the data transmission device. The detection data carries an acceleration value of the vibration sensor itself. The vibration sensor transmits an interrupt signal to the microcontroller according to the acceleration value of the vibration sensor itself and a preset acceleration threshold. The data transmission module is used for data communication with a display device. The microcontroller is used to control the on and off of the controllable switch according to the interrupt signal transmitted by the vibration sensor.

A third aspect of this application provides a data transmission method, applied to a data transmission device, which includes receiving detection data or an interrupt signal of a vibration sensor. The detection data includes an acceleration value of the vibration sensor itself. The vibration sensor is used to generate the detection data according to movement of the data transmission device, or generate the interrupt signal according to the detection data that generated on the basis of the movement of the data transmission device. The method further includes, when it is determined that the acceleration value of the vibration sensor itself exceeds a preset acceleration threshold or when the interrupt signal is received, controlling a power supply of the data transmission device to supply power to the data transmission module. The data transmission module is used for data communication with a display device.

Overall, in the data transmission method and data transmission device provided in the embodiments of this application, the data transmission device is provided with a microcontroller, a power supply, and a vibration sensor. When the vibration sensor detects that the user moves the data transmission device, the microcontroller controls the power supply to supply power to the data transmission module, so that the data transmission module starts to activate before the data transmission device is connected to the electronic device, thereby improving the response speed and work efficiency of the data transmission device, meanwhile the power supply does not need to supply power to the data transmission module constantly, which reduces the capacity and volume of the power supply. Moreover, the data transmission device can balance both space and efficiency, and it is possible to improve the response speed and work efficiency of the data transmission device during projection without requiring excessive capacity and volume of the power supply in the data transmission device.

BRIEF DESCRIPTION OF DRAWINGS

In order to more clearly describe the technical solutions in the embodiments of this application or the prior art, the drawings that need to be used in the description of the embodiments or the prior art will be briefly described hereinafter. Obviously, the drawings in the following description are only some embodiments of this application. For those skilled in the art, other drawings can be obtained based on these drawings without creative labor.

DETAILED DESCRIPTION

The technical solutions in the embodiments of this application will be described clearly and completely in conjunction with the drawings in the embodiments of this application. Obviously, the described embodiments are only a part of the embodiments of this application, rather than all the embodiments. Based on the embodiments in this application, all other embodiments obtained by those skilled in the art without creative work shall fall within the claimed scope of this application.

The terms of "first," "second," "third," "fourth," etc. (if any) in the description and claims of this application and the above-mentioned drawings are just used to distinguish similar objects, and not necessarily used to describe a specific order or sequence. It should be understood that the data used in this way can be interchanged under appropriate circumstances, so that the embodiments of this application described herein can be implemented in an order other than those illustrated or described herein, for example. In addition, the terms of "include" and "have" and any variations thereof are intended to cover non-exclusive inclusion, for example, a process, method, system, product or device that includes a series of steps or units is not necessarily limited to those clearly listed steps or units, but can include other steps or units which are not clearly listed or are inherent to these processes, products, or devices.

Before formally describing the embodiments of this application, the application scenarios of this application and the deficiencies in some technologies will be described in conjunction with the drawings.

Figure 1:
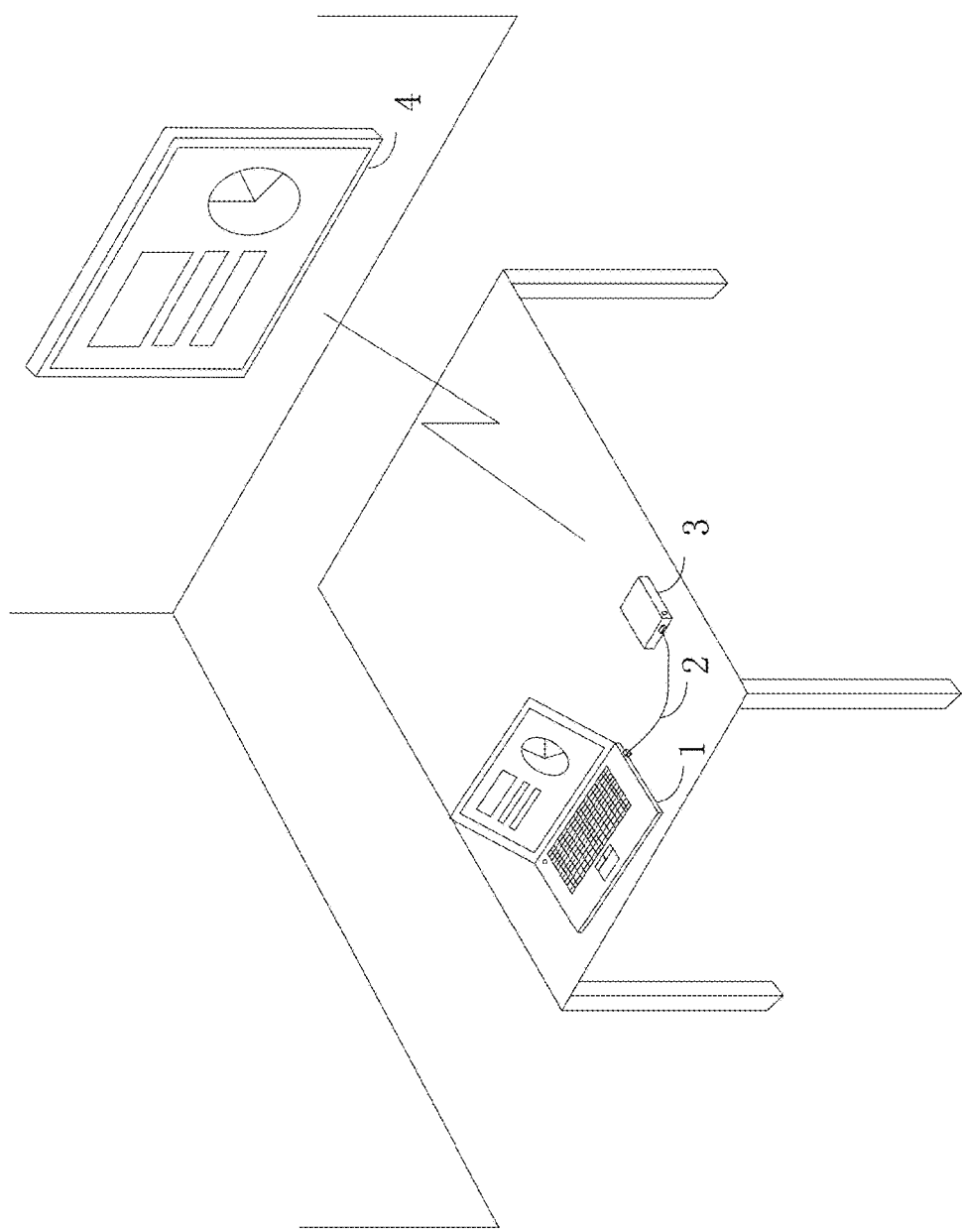
FIG. 1 is a schematic diagram of the application scenario of this application.

FIG. 1 is a schematic diagram of the application scenario of this application. Taking the scenario where a user needs to share the presentation in an electronic device 1 in a meeting as an example, due to the limitation of the screen size of the electronic device 1, the user can connect the electronic device 1 to a data transmission device 3 through a connection line 2, and then the picture of the presentation displayed on the display interface of the electronic device 1 is projected to the display device 4 hung on the wall for display, through the data transmission device 3.

Thereinto, the electronic device 1 can also be a device with a display interface such as a notebook computer, a tablet computer, a desktop computer, or a workstation. Data communication can be performed between the electronic device 1 and the data transmission device 3, for example, a connecting line 2 can be provided between the electronic device 1 and the data transmission device 3 to connect to each other through wired communication. The connection line 2 can be a universal serial bus (simply referred to as USB) connection line, a high definition multimedia interface (simply referred to as HDMI) connection line, or a network connection line. In an embodiment, the USB connection line can be USB Type-C connection line.

In some embodiments, the connection line 2 can be integrated with the data transmission device 3, that is, the connection line 2 and the data transmission device 3 together form an integrated device. At this time, the connection line 2 can be regarded as a part of the data transmission device 3. Thus, when connecting the data transmission device 3 to the electronic device 1, the user can omit the step of connecting the data transmission device 3 to one end of the connection line 2, and only needs to connect the electronic device 1 to the other end of the connection line 2, thereby improving the efficiency. Also, the situation where the data transmission device 3 cannot be connected to the electronic device 1 because the connection line 2 cannot be found can be avoided.

The data transmission device 3 and a display device 4 can be connected by wireless communication, which includes but not limited to, wireless fidelity (Wi-Fi), Bluetooth and other short-distance wireless communication. In some embodiments, the data transmission device 3 can also be called a screen projection device, a screen projector, a wireless screen projector, a screen transmitter, or a wireless screen transmitter, etc. The display device 4 can also be called a large-screen tablet, etc., and the display device 4 can cooperate with the data transmission device 3 to realize the sharing of the presentation in the electronic device 1. In some embodiments, the display device 4 can also realize remote instant communication and provide functions such as writing canvas through a touch panel alone.

Figure 2:
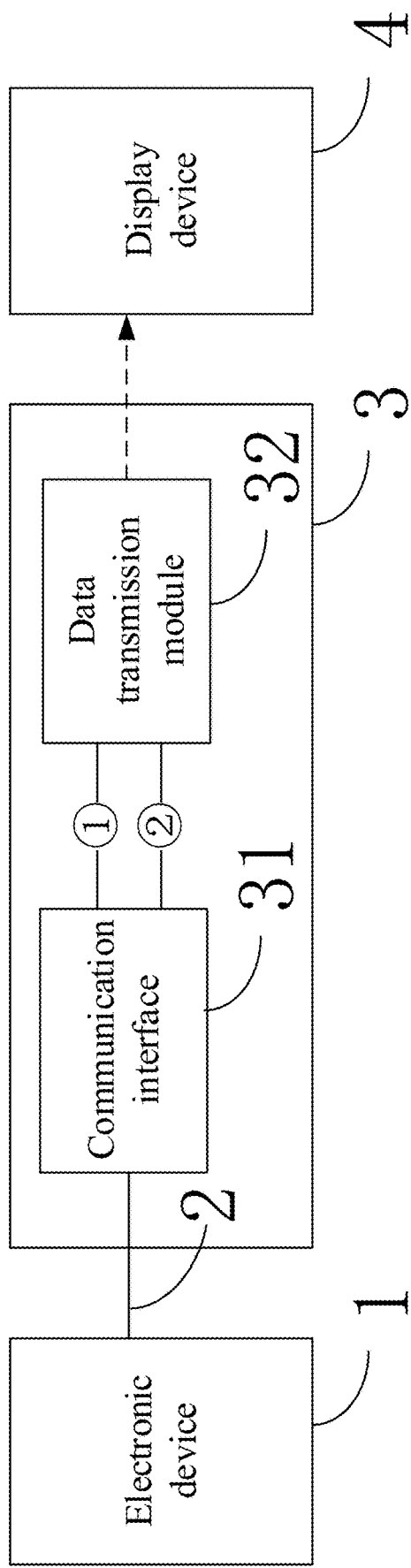
FIG. 2 is a schematic diagram of the structure of a data transmission device in a technology.

Since the data transmission device 3 is connected to the electronic device 1 through a wired connection, if the data transmission device 3 is not connected to an external power supply, after the electronic device 1 is connected to the data transmission device 3, the data transmission device 3 is powered by the electronic device 1 through the connection line 2. For example, FIG. 2 is a schematic diagram of the structure of a data transmission device in a technology. In FIG. 2, the data transmission device 3 includes a communication interface 31 and a data transmission module 32. The data transmission module 32 can be connected to the connection line 2 through the communication interface 31, and further receive data transmitted by the electronic device 1. When the connection line 2 is a USB connection line, the communication interface 31 can be a USB interface (such as a USB Type-C interface). Accordingly, the electronic device 1 can also provide a USB interface, so that after a connection between the two USB interfaces of the electronic device 1 and the data transmission device 3 is established, the USB connection line 2 establishes a connection between the electronic device 1 and the data transmission device 3. Since the USB connection line can transmit both data and electric power, the electronic device 1 can sequentially provide data and electric power to the data transmission module 32 through the connection line 2 and the communication interface 31, so that there are at least two connection logics, which are data connection and electric power connection, between the data transmission module 32 and the communication interface 31, for example, the data transmission module 32 can receive the electric power transmitted from the electronic device 1 through a path ① in the figure, and can also receive the data of the display interface transmitted from the electronic device 1 through a path ② in the figure, and then the display interface is projected to the display device 4 for display through wireless communication.

However, in the data transmission device 3 as shown in FIG. 2, since the electric power required for the data transmission module 32 to complete operations such as startup and projection of the display interface is completely provided by the electronic device 1, the electronic device 1 needs to simultaneously transmit data and electric power to the data transmission module through the connection line 2. When the data transmission device 3 is not connected to the electronic device 1, the data transmission module 32 is in a shutdown state due to no input of electric power. When the user connects the electronic device 1 to the data transmission device 3 through the connection line 2, the data transmission module 32 cannot immediately receive data and perform operations such as projection of the display interface, but needs to first receive electric power through the path ① to perform operations of the transmission module 32 such as startup, initialization, and communication configuration to switch the data transmission module 32 from the shutdown state to the working state, and then the data transmission module 32 can receive data through the path ②. It can be understood that the time when the electronic device 1 and the data transmission device 3 are connected through the connection line 2 is denoted as a first time, and the time when the data transmission module 32 is switched from the shutdown state to the working state is denoted as a second time. Between the first time and the second time, even if the electronic device 1 transmits the data of the display interface to the data transmission module 32 through the path ②, the data transmission module 32 cannot project the display interface to the display device 4 for display. Only when the data transmission module 32 is switched to the working state, that is, after the data transmission module 32 is ready for screen projection, after the second time, the data of the display interface that the electronic device 1 transmits to the data transmission module 32 through the path ② can be received by the data transmission module 32 through the path ② and projected to the display device 4 for display. As a result, when the user starts to use the data transmission device 3 and connects the data transmission device 3 to the electronic device 1, the intuitive feeling brought to the user is that, after the electronic device 1 and the data transmission device 3 are connected through the connection line 2 (the first time), the user has to wait 10 to 20 seconds (until the second time) before seeing the display interface projected by the electronic device 1 on the display device 4. During the waiting time of 10 to 20 seconds, the display interface of the electronic device 1 cannot be projected by the data transmission device 3 onto the display device 4, which reduces the response speed and work efficiency of the data transmission device 3 during projection, thereby causing impact on user experience.

Figure 3:
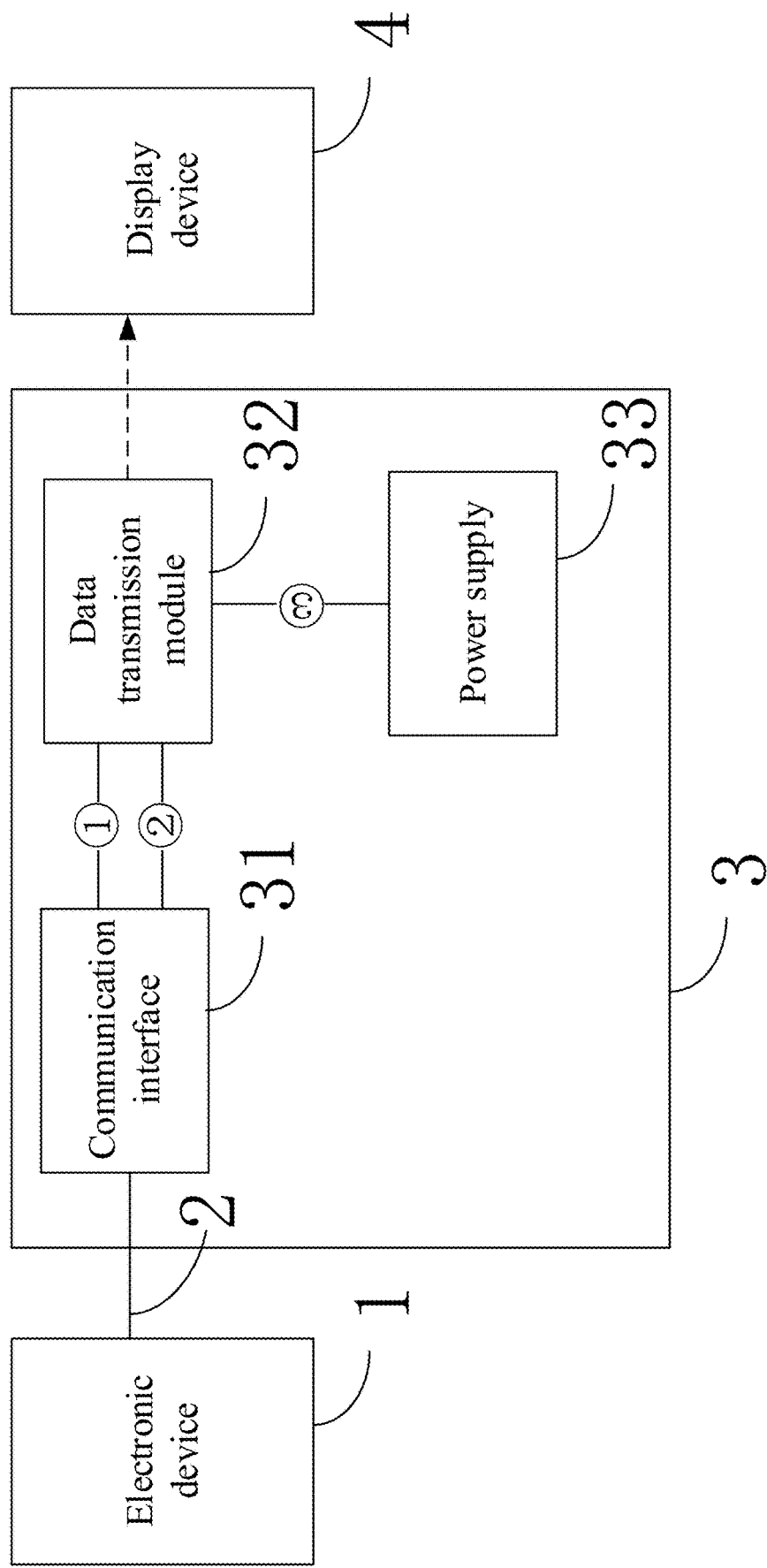
FIG. 3 is a schematic diagram of the structure of a data transmission device in another technology.

In the data transmission device, the data transmission module in the data transmission device can also be maintained in the working state by means of separate power supply, so as to improve the response speed of the data transmission device to the projection of the input display interface. For example, FIG. 3 is a schematic diagram of the structure of a data transmission device in another technology. In addition to the communication interface 31 and the data transmission module 32, the data transmission device 3 is further specially provided with a power supply 33 for supplying power to the data transmission module 32. When the communication interface 31 in the data transmission device 3 is not connected to the electronic device 1, the power supply 33 provided in the data transmission device 3 supplies power to the data transmission module 32 through a path ③, so that the data transmission module 32 can still be maintained in the working state when the data transmission device 3 is not connected to the electronic device 1 through the connection line 2. After the user connects the electronic device 1 to the communication interface 31 of the data transmission device 3 through the connection line 2 (denoted as the first time), since the data transmission module 32 is constantly in the working state, the data transmission module 32 can start to receive data of the display interface of the electronic device 1 through the path ② after the first time, and project the display interface to the display device 4 for display. After connecting the electronic device 1 to the data transmission device 3 through the connection line 2, the user can quickly see the projected display interface of the electronic device 1 on the display device 4, which improves the response speed and work efficiency, bringing the user the intuitive experience of "Plug and Play."

However, although the data transmission device 3 shown in FIG. 3 improves the response speed and work efficiency, in order to constantly maintain the data transmission module 32 of the data transmission device 3 in the working state to prolong the endurance time of the data transmission device 3 to realize the function of "Plug and Play," both capacity and volume of the power supply 33 in the data transmission device 3 are relatively large, which occupies a large amount of space in the data transmission device 3, seriously affecting the design of the internal layout and external appearance of the data transmission device 3.

Overall, the data transmission device shown in FIG. 2 has the problems of slow response speed and low work efficiency. The data transmission device shown in FIG. 3 has insufficient device space and capacity. How to balance the space and efficiency, that is, how to improve the response speed and work efficiency of the data transmission device during data transmission while the power supply in the data transmission device does not require an excessively large capacity and volume, is a technical problem to be solved in this field.

Therefore, this application provides a data transmission method and a data transmission device, and the data transmission device is provided with a microcontroller and a vibration sensor. If the data transmission device is not connected to the electronic device, when the vibration sensor does not detect that the user moves the data transmission device, the microcontroller does not control the power supply to supply power to the data transmission module through a controllable switch, so that the data transmission module is not powered and is maintained in the shutdown state. Only when the vibration sensor detects that the user moves the data transmission device (for example, when the user picks up the data transmission device), the microcontroller controls the power supply to supply power to the data transmission module through the controllable switch, so that the data transmission module starts to activate before the data transmission device is connected to the electronic device, and starts to be switched from the shutdown state to the working state, thereby improving the response speed and work efficiency of the data transmission device, meanwhile preventing the power supply from supplying power to the data transmission module constantly, which reduces the capacity and volume of the power supply. Optionally, when the vibration sensor does not detect that the user moves the data transmission device, the microcontroller in the data transmission device can be in a standby state, and the power consumption of the microcontroller in the standby state is less than that in the normal working state, so as to save the power consumption of the microcontroller itself, and the microcontroller can be powered by the power supply in the data transmission device. If the microcontroller is in the standby state, only when the vibration sensor detects that the user moves the data transmission device (for example, when the user picks up the data transmission device), the microcontroller is awakened and switched from the standby state to the working state, and then the microcontroller controls the power supply to supply power to the data transmission module through the controllable switch, so that the data transmission module starts to activate before the data transmission device is connected to the electronic device.

Hereinafter, the technical solution of this application will be described in detail in combination with concrete embodiments. The following concrete embodiments can be combined with each other, and the same or similar concepts or processes may not be repeated in some embodiments.

Figure 4:
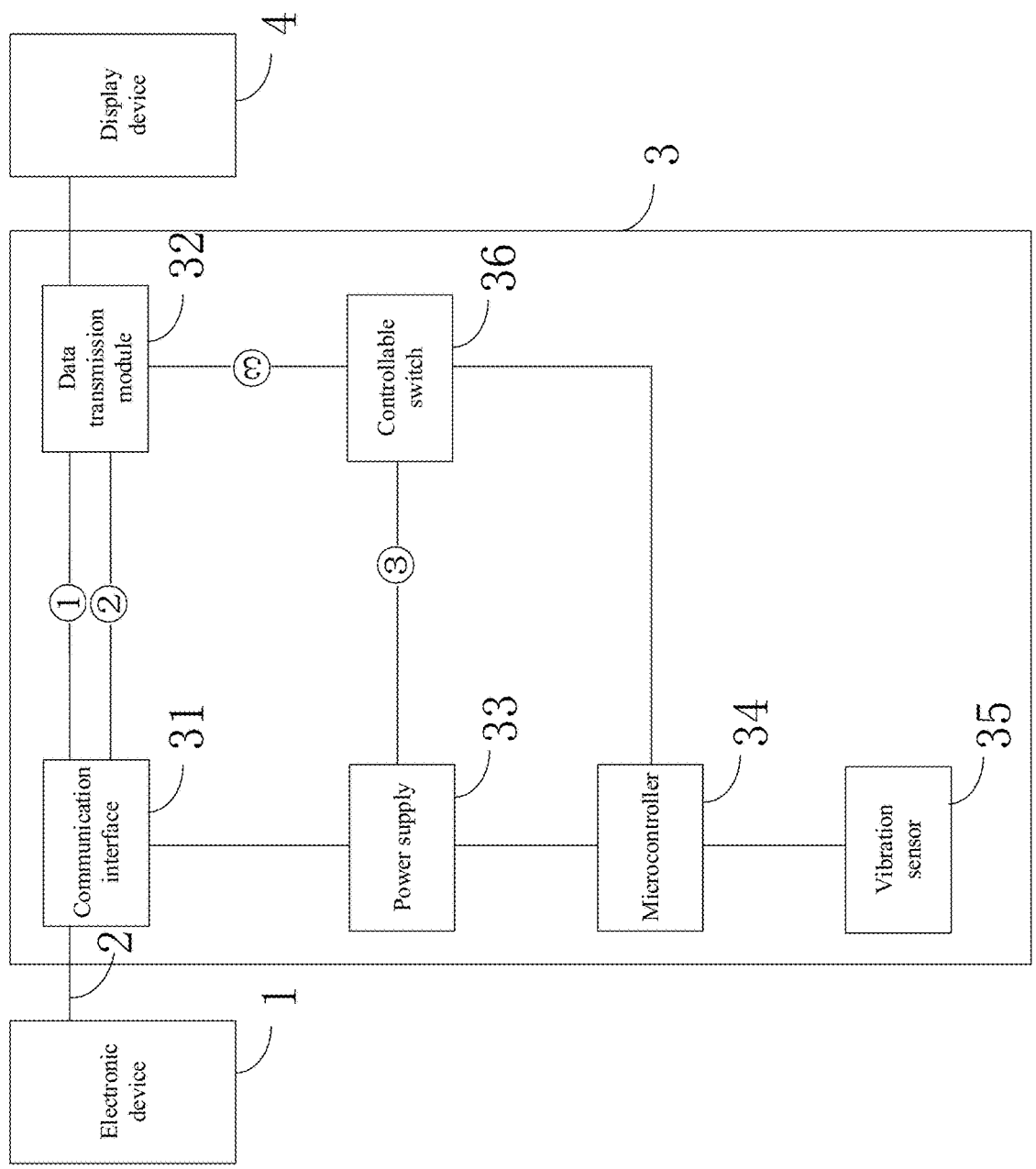
FIG. 4 is a schematic diagram of an application scenario framework of a data transmission device provided by an embodiment of this application.

FIG. 4 is a schematic diagram of the application scenario framework of a data transmission device provided by an embodiment of the application. As shown in FIG. 4, the electronic device 1, the connection line 2, the data transmission device 3, and the display device 4 can be applied to the scenario shown in FIG. 1. Concretely, the data transmission device 3 provided in the embodiment includes a communication interface 31, a data transmission module 32, and a power supply 33. After the data transmission device 3 is connected to the electronic device 1 through the connection line 2, the data transmission module 32 can receive the electric power transmitted from the electronic device 1 through the path ① in the figure, and can also receive the data of the display interface transmitted from the electronic device 1 through the path ② in the figure, and perform data communication with the display device 4 through wireless communication. The data communication includes the projection of the display interface to the display device 4 for display. When the communication interface 31 in the data transmission device 3 is not connected to the electronic device 1, the power supply 33 can supply power to the data transmission module 32 through the path ③, so that the data transmission module 32 is in working state. However, in the embodiment, the power supply 33 does not constantly supply power to the data module 32 through the path ③, but supplies power to the data module 32 according to the on or off states of a controllable switch 36 connected between the power supply 33 and the data transmission module 32. When the controllable switch 36 is turned on, the power supply 33 can transmit electric power to the data transmission module 32 through the controllable switch 36, and when the controllable switch 36 is turned off, the power supply 33 cannot supply power to the data transmission module 32 through the controllable switch 36.

In the embodiment, the on-off control of the controllable switch 36 is realized through the microcontroller 34 and the vibration sensor 35. Concretely, when the data transmission device 3 is moved, the vibration sensor 35 inside the data transmission device 3 can generate detection data according to the movement of the data transmission device 3, and can transmit the detection data to the microcontroller 34. For example, the vibration sensor 35 is an acceleration sensor in the embodiment, and the vibration sensor 35 generates detection data according to the movement of the data transmission device. The detection data includes at least the acceleration value of the vibration sensor 35 itself. The microcontroller 34 can control the on and off of the controllable switch 36 between the power supply 33 and the data transmission module 32 according to the detection data generated by the vibration sensor 35, so as to control whether the power supply 33 supplies power to the data transmission module 32 through the path ③. That is, although the data transmission device 3 in the embodiment is provided with the power supply 33 connected to the data transmission module 32, whether the power supply 33 supplies power to the data transmission module 32 is controlled by the microcontroller 34 according to the detection data of the vibration sensor 35.

It should be noted that the data transmission device 3 is usually placed on the table in the conference room, and the table is subject to various external forces to produce large or small vibrations. In a possible scenario, due to the high sensitivity of the vibration sensor, the data transmission device 3 is slightly moved and touched by mistake, causing that the vibration sensor generates useless signals. In order to filter out these useless signals, the microcontroller 34 can store a preset acceleration threshold value by pre-storing an acceleration threshold value. The microcontroller 34 receives the acceleration value of the vibration sensor 35 itself carried in the detection data transmitted by the vibration sensor 35. When the microcontroller 34 determines that the acceleration value of the vibration sensor 35 itself exceeds the pre-stored acceleration threshold, the microcontroller 34 controls the controllable switch 36 between the power supply 33 and the data transmission module 32 to be turned on, so that the power supply 33 supplies power to the data transmission module 32 through the path ③. Or, in another possible implementation, the vibration sensor 35 can also pre-store the acceleration threshold. When the vibration sensor 35 determines that the acceleration value in the detection data exceeds the pre-stored acceleration threshold, the vibration sensor 35 transmits an interrupt signal to the microcontroller 34. When the microcontroller 34 receives the interrupt signal, the microcontroller 34 controls the controllable switch 36 between the power supply 33 and the data transmission module 32 to be turned on, so that the power supply 33 supplies power to the data transmission module 32 through the path ③.

Figure 5:
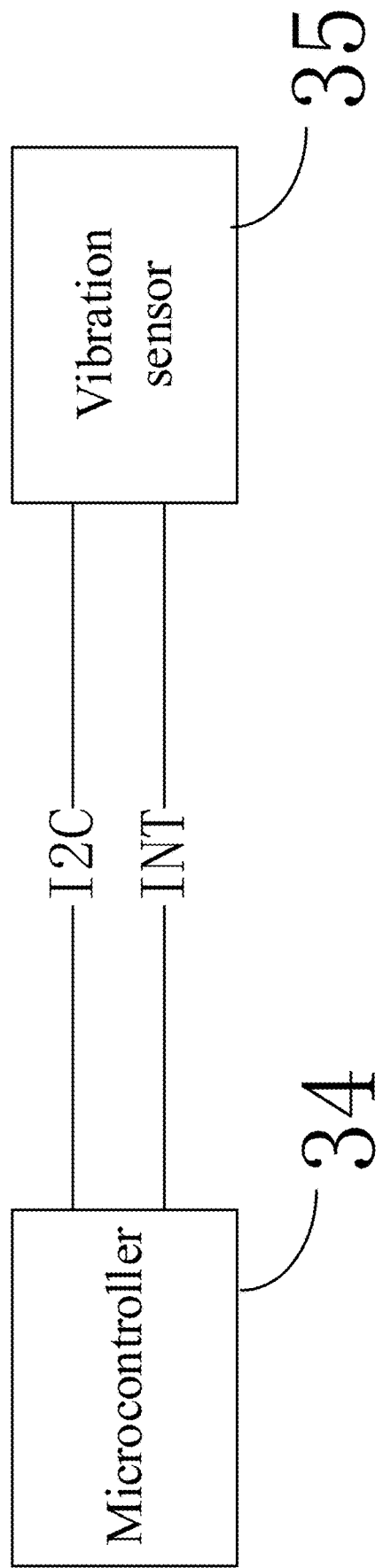
FIG. 5 is a schematic diagram of the connection relationship between a microcontroller and a vibration sensor provided by an embodiment of this application.

Optionally, in some embodiments, the vibration sensor 35 can concretely be an acceleration sensor provided in the data transmission device 3. The acceleration sensor can obtain the real-time acceleration value in the positive and negative six directions in the three reference axes of the current data transmission device 3 according to the motion of the data transmission device 3. The real-time acceleration values in these six directions can be used as the detection data generated by the vibration sensor 35. More concretely, FIG. 5 is a schematic diagram of the connection relationship between the microcontroller and the vibration sensor according to an embodiment of this application, and the connection relationship between the microcontroller 34 and the vibration sensor 35 includes at least I2C (Inter-Integrated Circuit) connection and/or interrupt (simply referred to as INT) connection. The connection relationship can be multiple physical connection lines or an integrated connection line. The concrete implementation of the connection relationship is not limited in this application. Exemplarily, on a concrete printed circuit board (simply referred to as PCB), the connection relationship can be a connective wire printed on the circuit board. Thereinto, the microcontroller 34 can perform setting, such as initialization, on the vibration sensor 35 through the I2C connection, and the microcontroller 34 can also read the detection data of the vibration sensor 35 through the I2C connection continuously. At this time, the microcontroller 34 needs to actively acquire the detection data of the vibration sensor 35. The vibration sensor 35 can transmit an interrupt (simply referred to as INT) signal to the microcontroller through the INT connection. The I2C connection and the INT connection between the microcontroller 34 and the vibration sensor 35 as shown in FIG. 5 can be set at the same time, or the I2C connection can be set when only the I2C signal is transmitted between the microcontroller 34 and the vibration sensor 35, or the INT connection is set when only the INT signal is transmitted between the microcontroller 34 and the vibration sensor 35.

Optionally, the power supply 33 in the data transmission device 3 provided in the embodiment can also be used to supply power to the microcontroller 34. In an embodiment, the microcontroller 34 can enter two power consumption states, that is, a first power consumption working state and a second power consumption working state. Before receiving the detection data or the interrupt signal, the microcontroller 34 is in the first power consumption working state when being powered by the power supply of the data transmission device 3. After receiving the detection data or the interrupt signal, the microcontroller 34 is in the second power consumption working state. In some application scenarios, the power consumption of the microcontroller 34 in the first power consumption working state is lower than that in the second power consumption working state. Concretely, the first power consumption working state can be a low power consumption working state, and the second power consumption working state can be a high power consumption working state. A micro control unit (simply referred to as MCU) with a low power consumption working state can be selected as the microcontroller 34. When the microcontroller 34 is in a standby state, the microcontroller 34 can be maintained in a low power consumption state, and its working current can be limited to the uA level, so as to minimize the power consumption of the power supply 33 by the microcontroller 34 itself when the data transmission device 3 is not connected to the electronic device 1.

Figure 6:
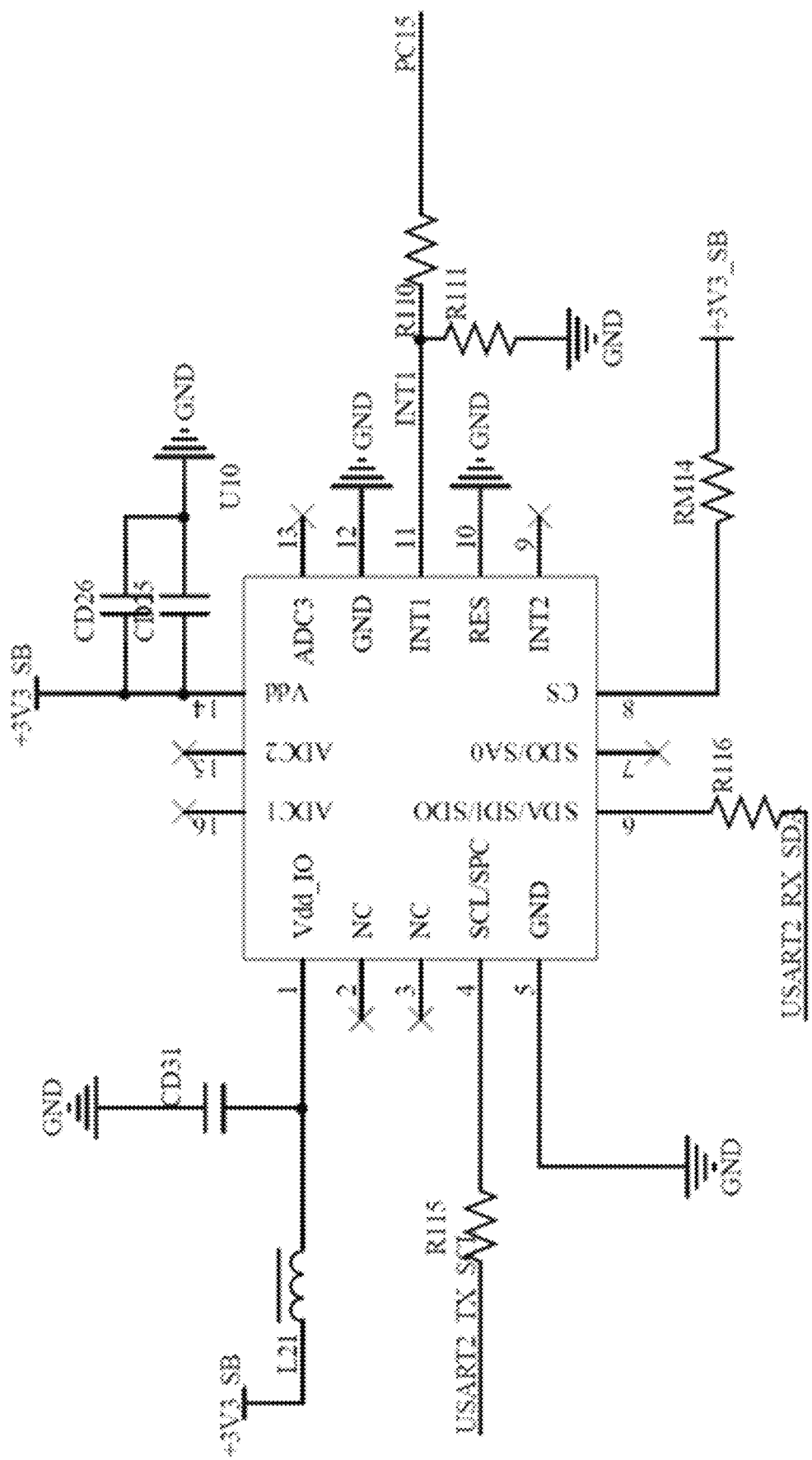
FIG. 6 is a schematic diagram of the structure of a vibration sensor provided by some embodiments of this application.
Figure 7:
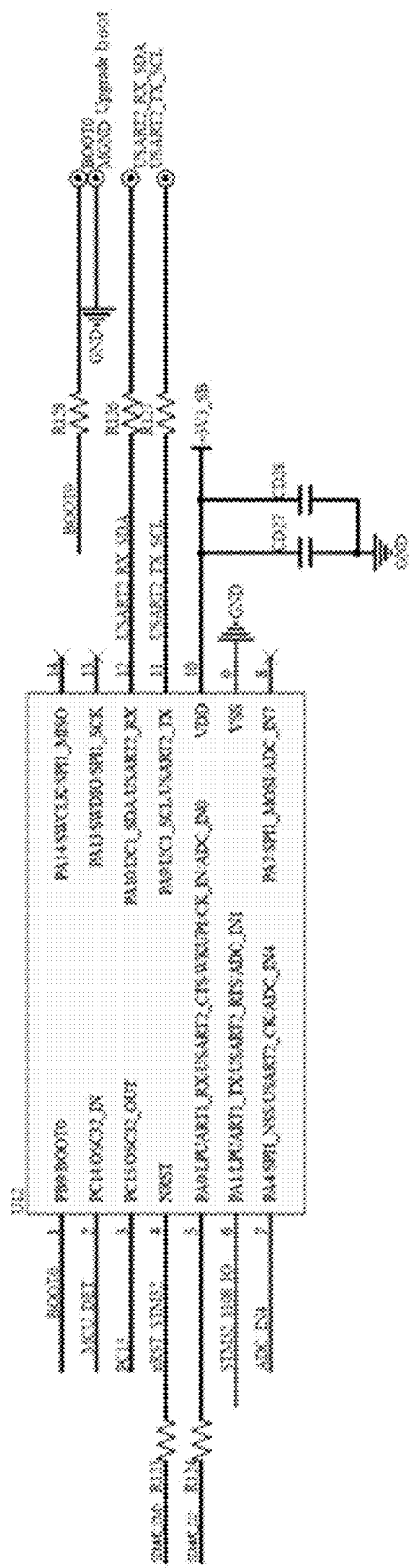
FIG. 7 is a schematic diagram of the structure of a microcontroller provided by some embodiments of this application.

Exemplarily, FIG. 6 is a schematic diagram of the structure of a vibration sensor provided by some embodiments of the application, and an acceleration sensor chip with LIS3DHTR type can be selected as the vibration sensor. FIG. 7 is a schematic diagram of the structure of a microcontroller provided by some embodiments of the application, and an MCU chip with STM32L011D3P6 type can be selected as the microcontroller. Combining the examples shown in FIGS. 6 and 7, the INT1 pin of the vibration sensor is connected to the PC15/OSC32_OUT pin of the microcontroller to achieve the "INT connection" as shown in FIG. 5. The vibration sensor can transmit an interrupt signal to the PC15/OSC32_OUT pin of the microcontroller through the INT1 pin. The SCL/SPC pin of the vibration sensor is connected to the PA9/I2C1_SCL/USART2_TX pin of the microcontroller, and the SDA/SDI/SDO pin of the vibration sensor is connected to the PA10/I2C1_SDA/USART2_RX pin of the microcontroller, which jointly achieve the "I2C connection" as shown in FIG. 5. The vibration sensor can transmit I2C serial data to the PA10/I2C1_SDA/USART2_RX pin of the microcontroller through the SDA/SDI/SDO pin, and the vibration sensor can transmit I2C serial clock to the PA9/I2C1_SCL/USART2_TX pin of the microcontroller through the SCL/SPC pin, and the like. It should be noted that FIGS. 6 and 7 only show a possible selection of the microcontroller and the vibration sensor in the embodiment of the present application, and this application does not limit the concrete implementation of the microcontroller and the vibration sensor.

Optionally, the controllable switch 36 provided in the embodiment can be a switch such as a bipolar junction transistor (BJT) and a field effect transistor, and a controllable signal transmitted by the microcontroller 34 to the control end of the controllable switch 36 can be at a high level or a low level. Exemplarily, when the controllable switch 36 is a field effect transistor, the control end of the field effect transistor is the gate, and the source and drain are respectively connected to the data transmission module 32 and the power supply 33. At this time, when the gate of the field effect transistor receives a signal in the form of high level (corresponding to the N-channel type) or low level (corresponding to the P-channel type) which is denoted as a first connection signal, the first connection signal can cause the field effect transistor to be turned on, and connection between the source and drain of the field effect transistor is performed, and the power supply 33 can supply power to the data transmission module 32 through the controllable switch 36. When the field effect transistor receives a signal in the form of low level (corresponding to the N-channel type) or high level (corresponding to the P-channel type) which is denoted as a first disconnection signal, the first disconnection signal can control the field-effect transistor to be turned off, and the connection between the source and drain of the field-effect transistor is broken off, and the power supply 33 will not supply power to the data transmission module 32.

In the embodiment of this application, a power interface is provided in the data transmission device 3, and the power interface is used to connect to a power supply 33, and the power supply 33 can supply power to the data transmission module 32 through the power interface. In some embodiments, the power supply 33 in the data transmission device 3 can include a non-removable battery, and the battery is connected to the data transmission module 32 through the power interface in the data transmission device 3, so that the battery can supply power to the data transmission module 32. In some embodiments, the power supply 33 in the data transmission device 3 can include a detachable battery. When the battery is installed in the data transmission device 3, the battery is connected to the data transmission module 32 through the power interface in the data transmission device 3, so that the battery can supply power to the data transmission module 32.

Figure 8:
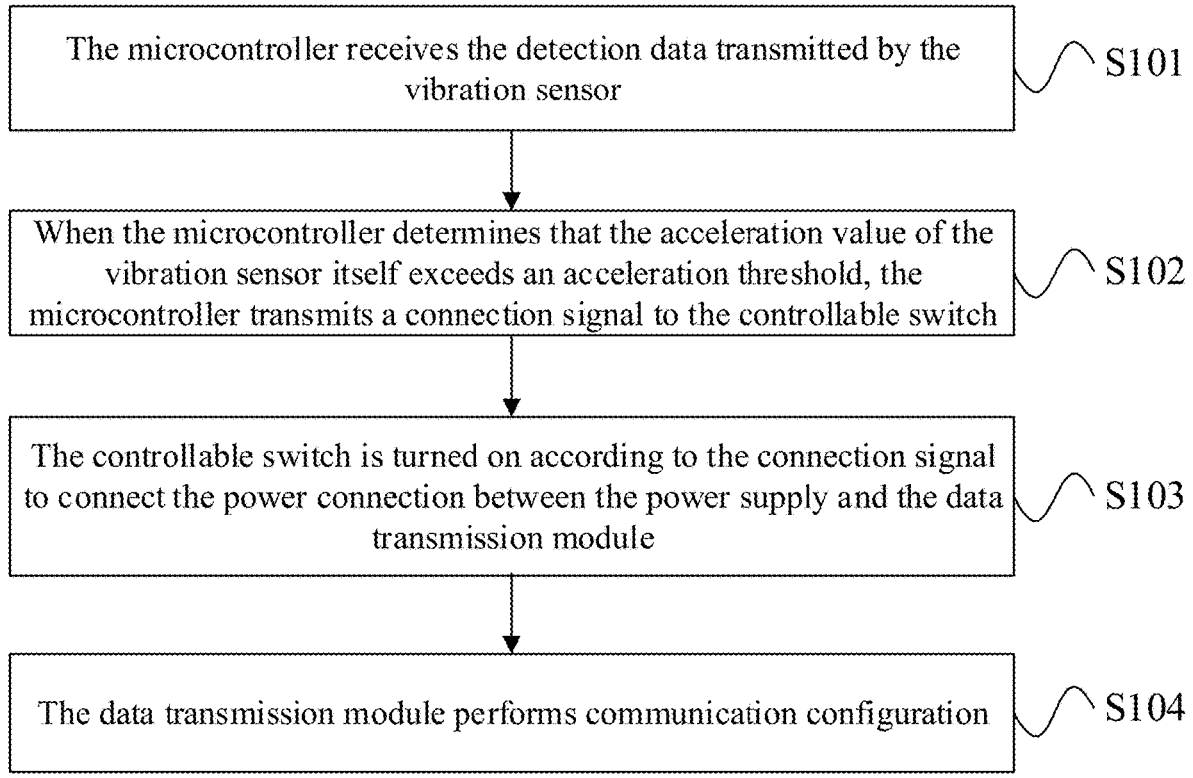
FIG. 8 is a schematic diagram of the flowchart of a data transmission method provided by an embodiment of this application.

When the data transmission device 3 transmits data to the display device 4, for example, when projection is performed on the display device 4, the microcontroller 34 can control whether the power supply 33 supplies power to the data transmission module 32 according to the detection data of the vibration sensor 35. For example, FIG. 8 is a schematic diagram of the flowchart of a data transmission method provided by an embodiment of the application, and the data transmission method can be used for the execution by the data transmission device 3 as shown in FIG. 4. When the data transmission device 3 is not connected to the electronic device 1, the method includes:

S101: The microcontroller 34 receives the detection data transmitted by the vibration sensor 35, and the detection data carries the acceleration value of the vibration sensor 35 itself.

Concretely, when the microcontroller 34 controls the data transmission device 3, the microcontroller 34 first needs to acquire the detection data obtained by the vibration sensor 35 detecting the motion of the data transmission device 3. The detection data includes at least the acceleration value of the vibration sensor itself. In the embodiment, the vibration sensor 35 is an acceleration sensor. The acceleration sensor detects the motion state of the data transmission device 3 in real time, and generates acceleration data in six directions (for example, the acceleration data detected in an embodiment is 0 mg, 200 mg, 100 mg, 150 mg, 0 mg, 400 mg). The microcontroller 34 can acquire the detection data detected by the vibration sensor 35 in real time through the connection with the vibration sensor 35 at intervals. Or, the vibration sensor 35 can transmit the detection data detected in real time to the microcontroller 34 at intervals.

S102: When the microcontroller 34 determines that the acceleration value of the vibration sensor 35 itself exceeds a preset acceleration threshold, the microcontroller 34 transmits a first connection signal to the controllable switch 36.

The microcontroller 34 can store the preset acceleration threshold by pre-storing the acceleration threshold. Subsequently, the microcontroller 34 determines whether the acceleration value of the vibration sensor 35 itself received from the vibration sensor 35 exceeds the acceleration threshold. If the acceleration value exceeds the acceleration threshold, it means that the data transmission device 3 has been moved. This situation where the data transmission device 3 has been moved may occur because the user will connect the electronic device 1 to the data transmission device 3 through the connection line 2. If the acceleration value does not exceed the acceleration threshold, it means that the data transmission device 3 has not been moved and is in a static state. For example, assuming that the acceleration threshold pre-stored by the microcontroller 34 is 350 mg (mg is the unit of the acceleration sensor, the resolution of the G-Sensor), when the acceleration values in six directions of the vibration sensor 35 itself acquired by the microcontroller 34 are (0 mg, 200 mg, 100 mg, 150 mg, 0 mg, 400 mg), if the acceleration value in one of the directions, that is, 400 mg, exceeds the acceleration threshold of 350 mg, the microcontroller 34 transmits the first connection signal to the controllable switch 36. Thereinto, when the acceleration value in any one of the directions of the vibration sensor 35 itself exceeds the acceleration threshold, it means that the data transmission device 3 has been moved in the direction. Therefore, as long as the microcontroller 34 determines that the acceleration value in at least one direction exceeds the acceleration threshold, the microcontroller 34 transmits the first connection signal to the controllable switch 36.

S103: The controllable switch 36 is turned on according to the first connection signal to connect the power connection between the power supply 33 and the data transmission module 32.

The controllable switch 36 is turned on according to the first connection signal to connect the power connection between the power supply 33 and the data transmission module 32, and the power supply 33 supplies power to the data transmission module 32 through the controllable switch 36.

S104: The data transmission module 32 performs communication configuration.

Concretely, after the power connection between the power supply and the data transmission module is connected, the power supply 33 supplies power to the data transmission module 32, so that the data transmission module 32 can start the communication configuration after being powered on, and the communication configuration includes the communication configuration of the interface 31, and/or the communication configuration for data communication between the data transmission module 32 and the display device 4.

In order to avoid that the detection data is transmitted and received frequently between the microcontroller 34 and the vibration sensor 35 to cause the high power consumption of the microcontroller 34 and the vibration sensor 35, in another embodiment, the vibration sensor 35 determines whether its own acceleration value in the detection data reaches the preset acceleration threshold. When the vibration sensor 35 determines that its own acceleration value reaches the preset acceleration threshold, the vibration sensor 35 can transmit an interrupt signal to the microcontroller 34 through the INT connection arranged between the microcontroller 34 and the vibration sensor 35, so that the microcontroller 34 controls the on and off of the controllable switch 36 according to whether the interrupt signal is received.

Figure 9:
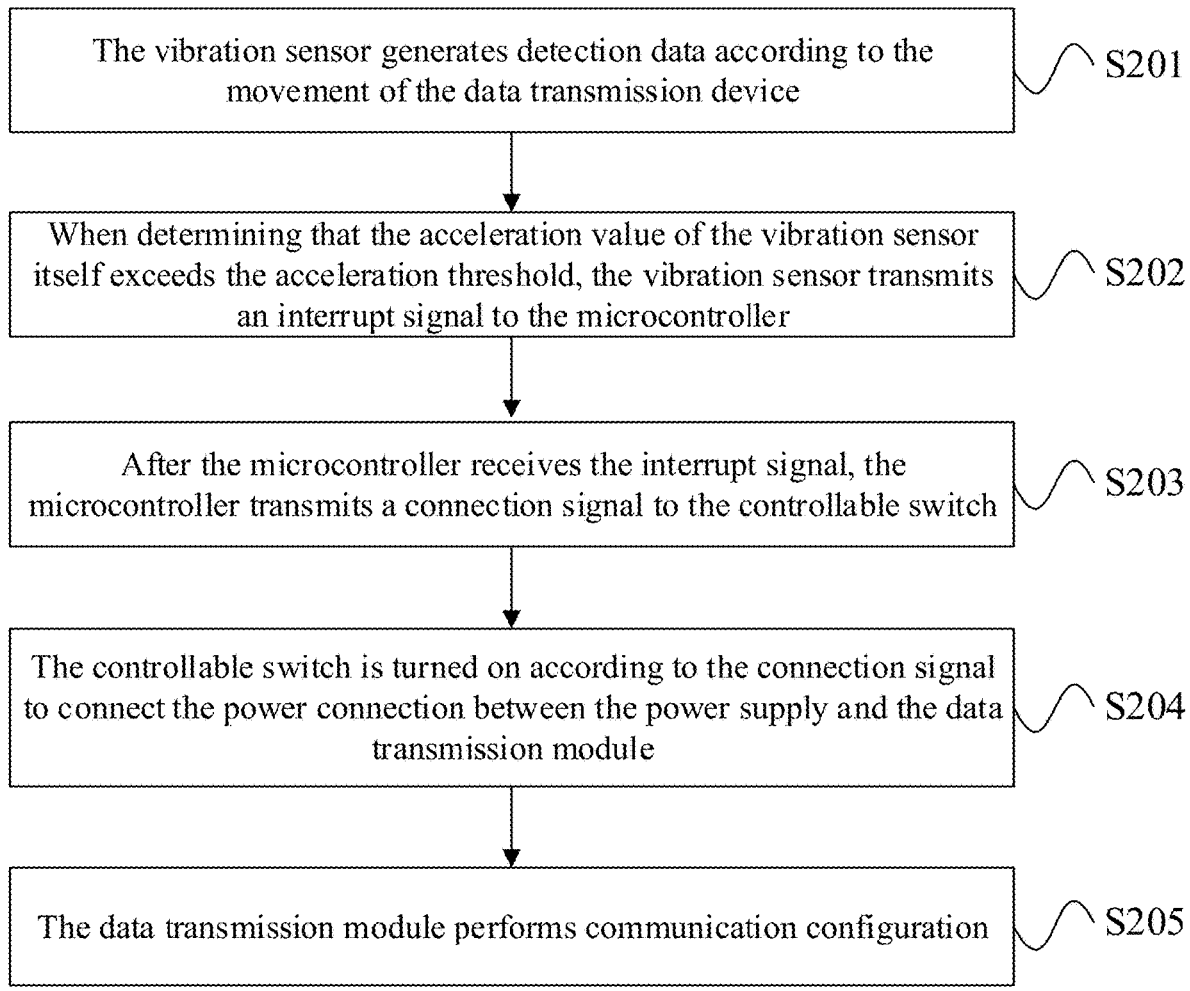
FIG. 9 is a schematic diagram of the flowchart of a data transmission method provided by an embodiment of this application.

Concretely, FIG. 9 is a schematic diagram of the flowchart of a data transmission method provided by an embodiment of this application, and the data transmission method can be used for the execution by the data transmission device 3 as shown in FIG. 4. It can be understood that the data transmission device 3 shown in FIG. 4 can be configured to execute any one of the data transmission methods in the embodiments shown in FIGS. 8 and 9. Or, the data transmission device 3 can also be configured to execute the data transmission methods of the embodiments shown in FIGS. 8 and 9, and execute any of the data transmission methods according to the instruction or settings of the user of the data transmission device 3, thereby enriching the functions of the data transmission device 3, which allows the user to flexibly perform selection and setting so as to improve the user experience.

Concretely, in the data transmission method shown in FIG. 9, when the data transmission device 3 is not connected to the electronic device 1, the method includes:

S201: The vibration sensor 35 generates detection data according to the movement of the data transmission device 3, and the detection data includes at least the acceleration value of the vibration sensor 35 itself.

S202: When determining that the acceleration value of the vibration sensor 35 itself exceeds the acceleration threshold, the vibration sensor 35 transmits an interrupt signal to the microcontroller 34.

Concretely, in the embodiment, the vibration sensor 35 continuously generates detection data carrying its own acceleration value at preset intervals. After each time when detection data is generated, the vibration sensor 35 does not directly transmit the detection data to the microcontroller 34, but compares the acceleration value in the detection data with a preset acceleration threshold. In some embodiments, the preset acceleration threshold can be pre-stored in the vibration sensor 35 by transmitting instructions from the microcontroller 34. In another embodiment, the vibration sensor 35 can also preset a trigger threshold of the vibration sensor 35 as the preset acceleration threshold by means of hardware parameters of the peripheral hardware circuit of the vibration sensor 35. When the acceleration value in the detection data generated by the vibration sensor 35 does not exceed the preset acceleration threshold, the vibration sensor 35 does not perform other operations, but continues to generate detection data at intervals. When the acceleration value in the detection data generated by the vibration sensor 35 at a certain time exceeds the preset acceleration threshold, it means that the data transmission device 3 has been moved at this time, and the vibration sensor 35 can transmit an interrupt signal to the microcontroller 34 through the INT connection with the microcontroller 34.

S203: After the microcontroller 34 receives the interrupt signal, the microcontroller 34 transmits a first connection signal to the controllable switch 36.

After the interrupt signal transmitted in S202 by the vibration sensor 35 through the INT connection is received, the microcontroller 34 transmits the first connection signal to the controllable switch.

S204: The controllable switch 36 is turned on according to the first connection signal to connect the power connection between the power supply 33 and the data transmission module 32.

Finally, the controllable switch 36 is turned on according to the first connection signal to connect the power connection between the power supply 33 and the data transmission module 32, and the power supply 33 supplies power to the data transmission module 32 through the controllable switch 36.

S205: The data transmission module 32 performs communication configuration.

Concretely, after the power connection between the power supply and the data transmission module is connected, the power supply 33 supplies power to the data transmission module 32, so that the data transmission module 32 can start the communication configuration after being powered on, and the communication configuration includes the communication configuration of the interface 31, and/or the communication configuration for data communication between the data transmission module 32 and the display device 4.

Overall, in the data transmission device provided by the embodiments of this application, the data transmission device includes a vibration sensor for detecting whether the data transmission device is moved, and a microcontroller that can control the connection of the controllable switch between the power supply and the data transmission module according to the detection data of the vibration sensor so that the power supply can supply power to the data transmission module. Only when the microcontroller detects that the data transmission device has been moved according to the data detected by the vibration sensor, the microcontroller controls the connection of the control switch between the power supply and the data transmission module, so that the power supply supplies power to the data transmission module. Therefore, when the data transmission device in the embodiment is not in use, the power supply may not supply power to the data transmission module. When the user uses the data transmission device in the embodiment, once the user moves the data transmission device (denoted as time T0), it means that the user may be about to connect the electronic device to the data transmission device through the connection line. At time T0, the microcontroller controls the power supply to supply power to the data transmission module, so that the data transmission module starts to active and performs communication configuration before the data transmission device is connected to the electronic device. Assuming that the data transmission module completes configuration operations such as communication configuration at time T1, for the user using the data transmission device, if the user connects the electronic device to the data transmission device through the connection line at time T2 after time T1, since the data transmission module in the data transmission device has completed the configuration operations such as communication configuration, after time T2, the data transmission module can immediately receive the data of the display interface transmitted by the electronic device from the communication interface, and project the data to the display device. If the user connects the electronic device to the data transmission device through the connection line at time T3 between time T0 and time T1, at this time, the period from the time of the user picking up the data transmission device to the time of plugging it to the electronic device is relatively short, but the user only needs to wait for the period between time T3 and time T1. At time T1, after the data transmission module completes the configuration operations such as communication configuration, the data transmission module can receive the data of the display interface transmitted by the electronic device from the communication interface, and project the data to the display device.

Compared with the data transmission device shown in FIG. 2, since the data transmission module provided by the embodiment starts to activate before the data transmission device is connected to the electronic device, the waiting time for the user to use the data transmission device is reduced, and ideally, there is no need to wait, thereby improving the response speed and work efficiency of the data transmission device. Compared with the data transmission device shown in FIG. 3, since the power supply does not constantly supply power to the data transmission module, but the power supply needs to be controlled to supply power to the data transmission module only when a movement detection module actually detects that the user may have moved the data transmission device, thereby reducing the need for the power supply to supply power to the data transmission module and reducing the capacity and volume of power supply arranged in the data transmission device. Overall, the data transmission device provided by this application can take care of both space and efficiency and in the case where the power supply in the data transmission device does not require excessive capacity and volume. It is also possible to improve the response speed and work efficiency of the data transmission device during data transmission. In addition, in the data transmission device provided by the embodiment, a controllable switch is provided between the power supply and the data transmission module. By turning on and off the switch, it is possible to control whether the power supply supplies power to the data transmission module, so that the control of the power supply by the microcontroller can be realized through a relatively simple circuit structure.

Figure 10:
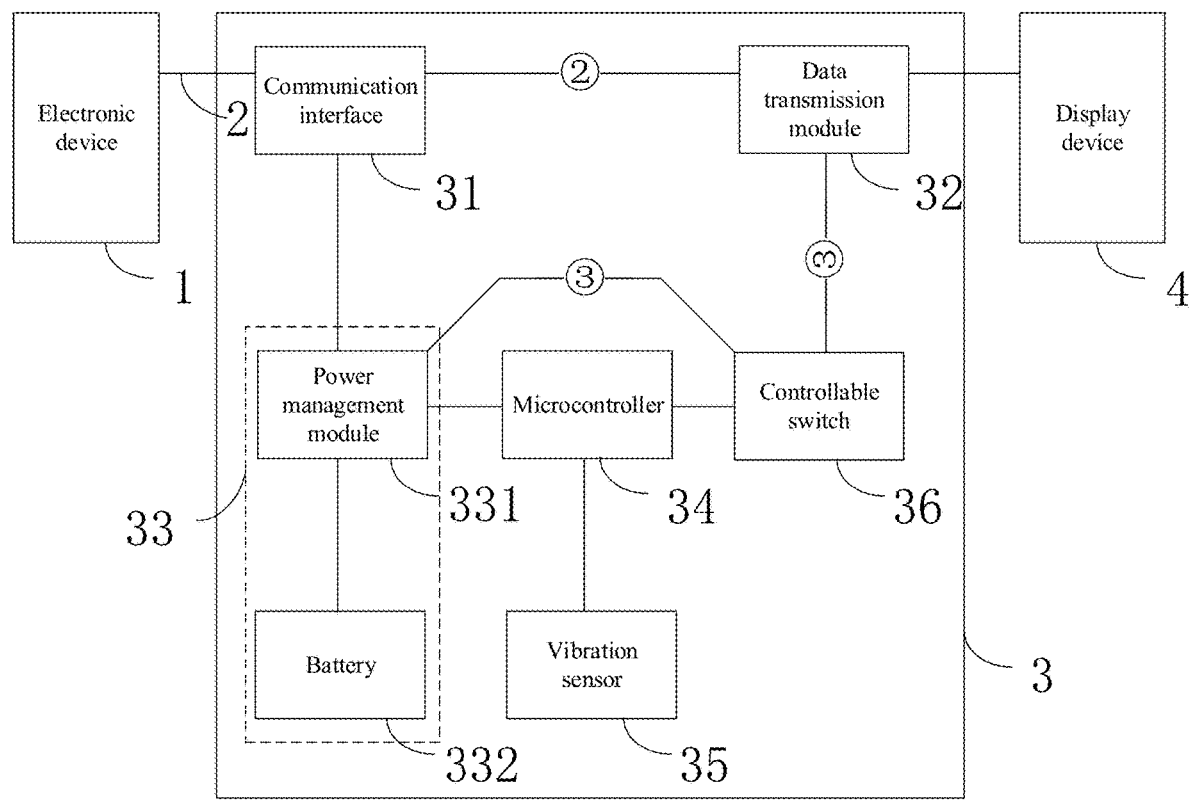
FIG. 10 is a schematic diagram of an application scenario framework of a data transmission device provided by an embodiment of this application.

Optionally, in the data transmission device 3 shown in FIG. 4, as an example, the power supply 33 directly supplies power to the data transmission module 32 and the microcontroller 34. Similarly, after the data transmission device 3 is connected to the electronic device 1 through the communication interface 31, the electric power provided by the electronic device 1 is also directly supplied to the data transmission module 32 and the microcontroller 34 through the communication interface 31. The power supply 33 can be a battery that can be charged and discharged, which is provided in the data transmission device 3. In such a situation, the timing of charging and discharging the battery needs to be controlled. Therefore, in a possible concrete implementation of the power supply 33, FIG. 10 is a schematic diagram of the application scenario framework of a data transmission device provided by an embodiment of the application. The data transmission device shown in FIG. 10 is based on the embodiment shown in FIG. 4, in which the power supply 33 can concretely include a power management module 331 and a battery 332. The battery 332 is used to store electric power, and the battery 332 provided in the data transmission device of the embodiment can be a lithium battery, for example, a power consumption of 1 mA or less and a capacity of 50 mAH-100 mAH can be selected. The power management module 331 is connected to the communication interface 31 and the battery 332, and the power management module 331 performs charging and discharging management of the battery 332 according to the electric power from the electronic device 1 acquired by the communication interface 31. The battery 332 supplies electric power to the microcontroller 34 and the data transmission module 32 through the power management module 331.

Concretely, the power management module 331 can include an IC (integrated circuit) chip for performing charging and discharging management of the battery 332. When the data transmission device 3 is connected to the electronic device 1 through the connection line 2, the electronic device 1 transmits electric power to the communication interface 31 through the connection line 2, and the power management module 331 can transmit the electric power received by the communication interface 31 to the battery 332 for charging the battery 332. When the data transmission device 3 is not connected to the electronic device 1, the power management module 331 can control the battery 332 to output electric power, so that the electric power output by the battery 332 is transmitted to the microcontroller 34 for supplying power, and is transmitted to the data transmission module 32 through the path ③ in FIG. 10 for supplying power.

Figure 11:
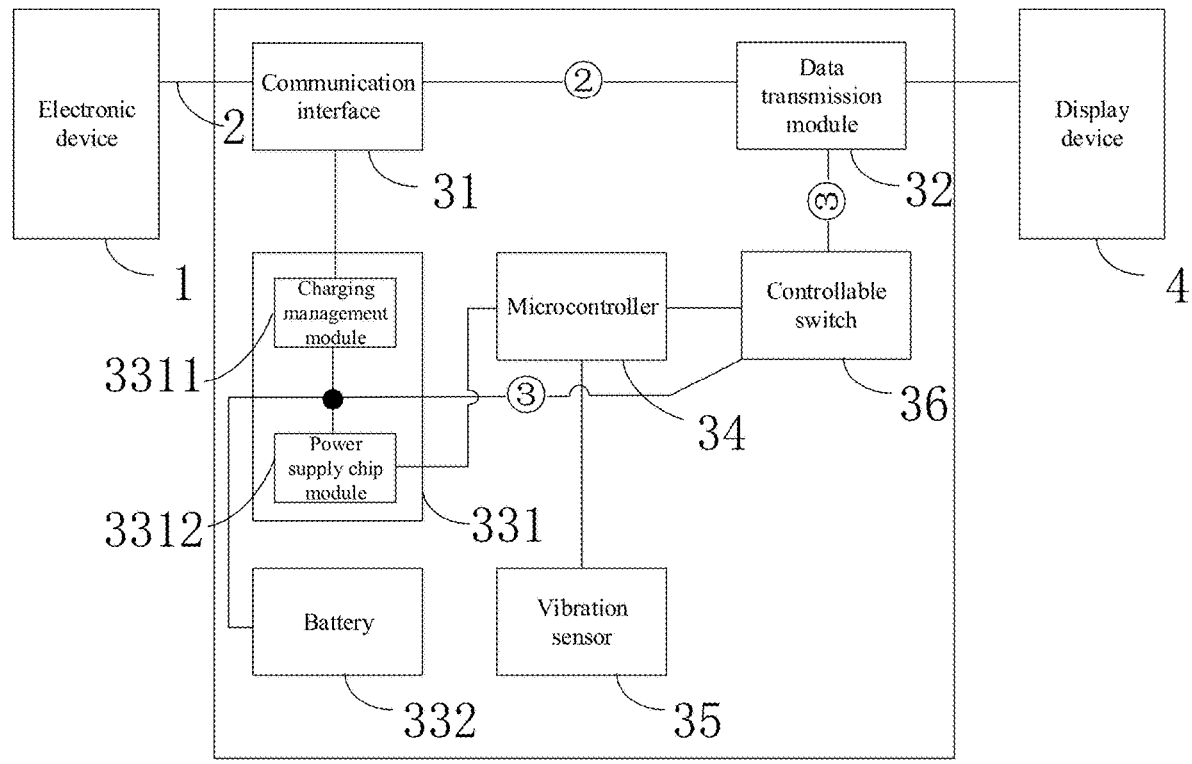
FIG. 11 is a schematic diagram of an application scenario framework of a data transmission device provided by an embodiment of the application.

Optionally, FIG. 11 is a schematic diagram of the application scenario framework of a data transmission device provided by an embodiment of the application. The data transmission device as shown in FIG. 11 is based on the embodiment as shown in FIG. 10, and the power management module 331 provided in the power supply 33 can concretely include a charging management module 3311 and a power supply chip 3312. The power supply chip 3312 can be a DC-DC converter (DC-to-DC converter) or LDO (low dropout regulator), which is used to convert the voltage (generally 3.5V-4.2V) provided by the power supply 332 into a suitable voltage (for example, 3.3V) to supply power to the microcontroller 34. The power management module 331 is concretely used to manage the battery 332. During the charging, the charging management module receives the electric power transmitted by the electronic device 1 through the communication interface 31 to charge the battery 332. When the battery 332 is a lithium battery, the charging management module can convert direct current into a constant current output power supply for charging the battery 332. During the discharging, the charging management module supplies power to the data transmission module 32 through the path ③, and supplies power to the microcontroller 34 through the power chip 3312.

Figure 12:
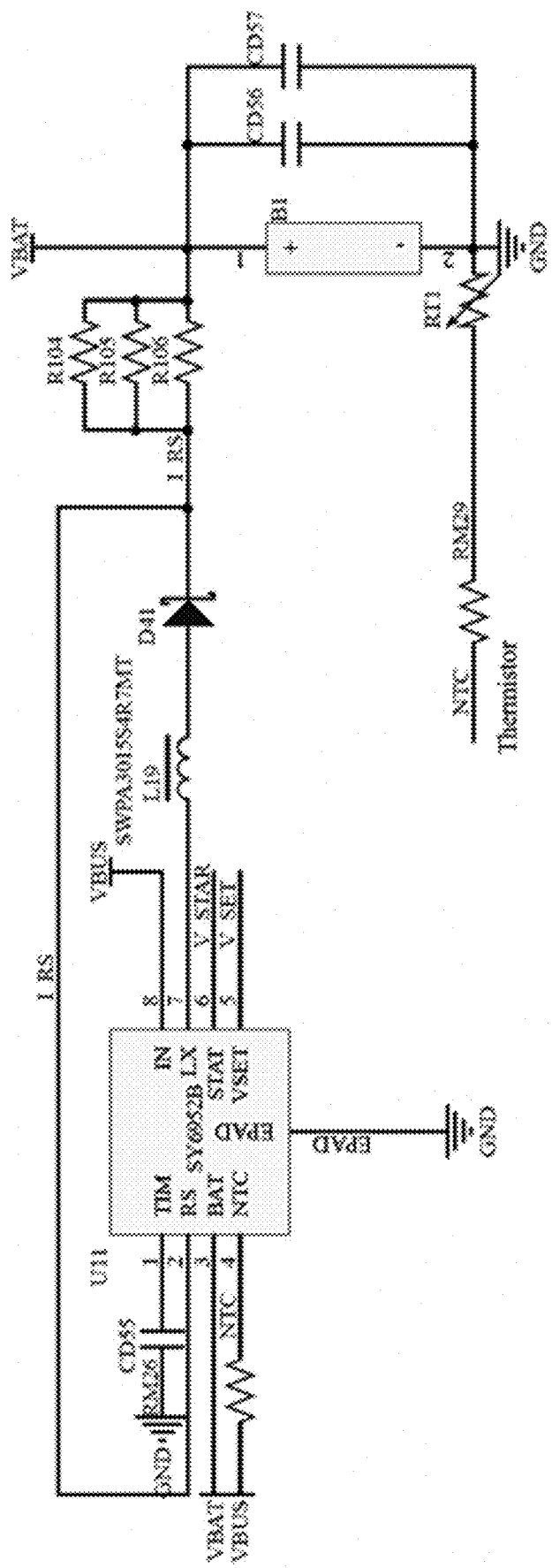
FIG. 12 is a schematic diagram of a charging management IC chip and peripheral circuits provided by some embodiments of the application.
Figure 13:
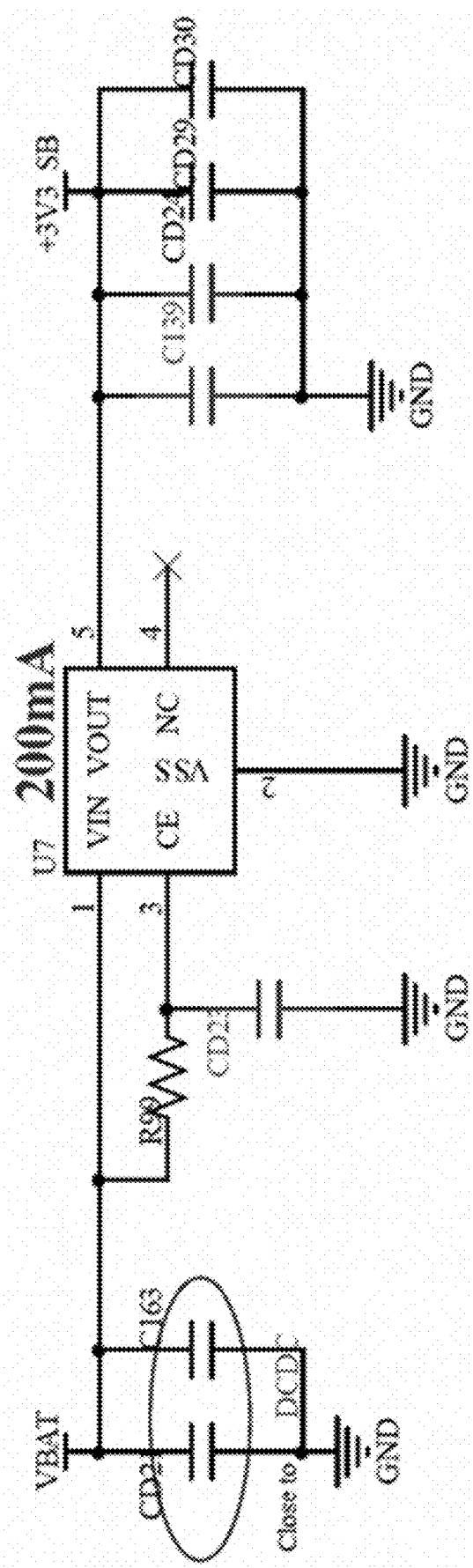
FIG. 13 is a schematic diagram of a power chip and peripheral circuits provided by some embodiments of the application.

Exemplarily, FIG. 12 is a schematic diagram of a charging management IC chip and peripheral circuits provided by some embodiments of this application. A power management chip with the type of SY6952B can be selected as the charging management module. Thereinto, the IN pin of the charging management IC chip is connected to the communication interface 31, to receive the electric power VBUS transmitted by the electronic device 1 through the communication interface 31. The LX pin of the charging management IC chip is connected to the battery B1, and the charging management IC chip can be used to control the electric power VBUS received from the IN pin to charge the battery 1. FIG. 13 is a schematic diagram of a power chip and peripheral circuits provided by some embodiments of the application. A power chip with the type of LC1458CB5TR33 can be selected as the power chip. Thereinto, the VIN pin of the power chip is connected to the electric power VBAT provided by the battery, and the VOUT pin is connected to the power supply pin of the microcontroller 34. The power chip can be used to convert VBAT into a voltage (for example, 3.3V) suitable for the working of the microcontroller, and to provide it to the microcontroller 34. It should be noted that FIGS. 12 and 13 only show a possible selection of the charging management IC chip and the power supply chip in the embodiment of this application, and this application does not limit the concrete implementation of the charging management IC chip and the power supply chip.

Overall, the data transmission device provided in the embodiment further refines the structure of the power supply on the basis of the data transmission device in the above-mentioned embodiment. The management module provided in the power supply controls the charging and discharging of the battery. After the transmission device is connected to the electronic device, the electronic device supplies power to the data transmission device and charges the battery, so that subsequently, after the data transmission device is disconnected from the electronic device, the battery can be used to supply power to the microcontroller and the data transmission module in the data transmission device and the like, thereby increasing the endurance of the power supply in the data transmission device, and since the battery can be charged, the requirement on the battery capacity can also be further reduced.

In some embodiments, with reference to FIG. 11, when the data transmission device 3 is plugged into the external electronic device 1, the interface power pin of the electronic device 1 supplies power to the data transmission device 3. Since the power supply of the electronic device 1 usually has a higher voltage than the battery 332 of the transmission device 3, the power supply of the electronic device 1 can directly charge the battery 332 through the path of "communication interface 31-controllable switch 36-battery 332." Because the charging current and/or charging voltage of the charging has not been processed by the power management module 331 (the processing mentioned above includes, for example, converting the output voltage and/or output current of the electronic device into a suitable output voltage and/or output current), the charging current and/or the charging voltage are too high or too low, which may damage the battery 332. Therefore, in order to prevent the power supply of the electronic device 1 from directly charging the battery 332 of the data transmission device 3, an external power detection module can be provided. The external power detection module can detect whether the electronic device 1 provides working power to the data transmission device 3. If so, the external power detection module transmits a level signal to the controllable switch 36 that instructs to turn off the controllable switch 36. Since the controllable switch 36 is turned off, the power supply of the electronic device 1 cannot directly charge the battery 332 through the path of "communication interface 31-controllable switch 36-battery 332."

Therefore, on the basis of the above-mentioned embodiments shown in FIGS. 4-13, in some embodiments, the data transmission device 3 further includes an external power detection module, and the external power detection module is used to detect whether an external power supply is connected to the communication interface 31 of the data transmission device 3. The situation where an external power supply is connected to the communication interface 31 in the data transmission device 3 can be the scenario shown in FIG. 4 where the electronic device 1 provides working power to the data transmission device 3 through the connection line 2. The situation where no external power supply is connected to the communication interface 31 in the data transmission device 3 can be the scenario as shown in FIG. 4 where the data transmission device 3 is not connected to the electronic device 1 through the connection line 2.

Figure 14:
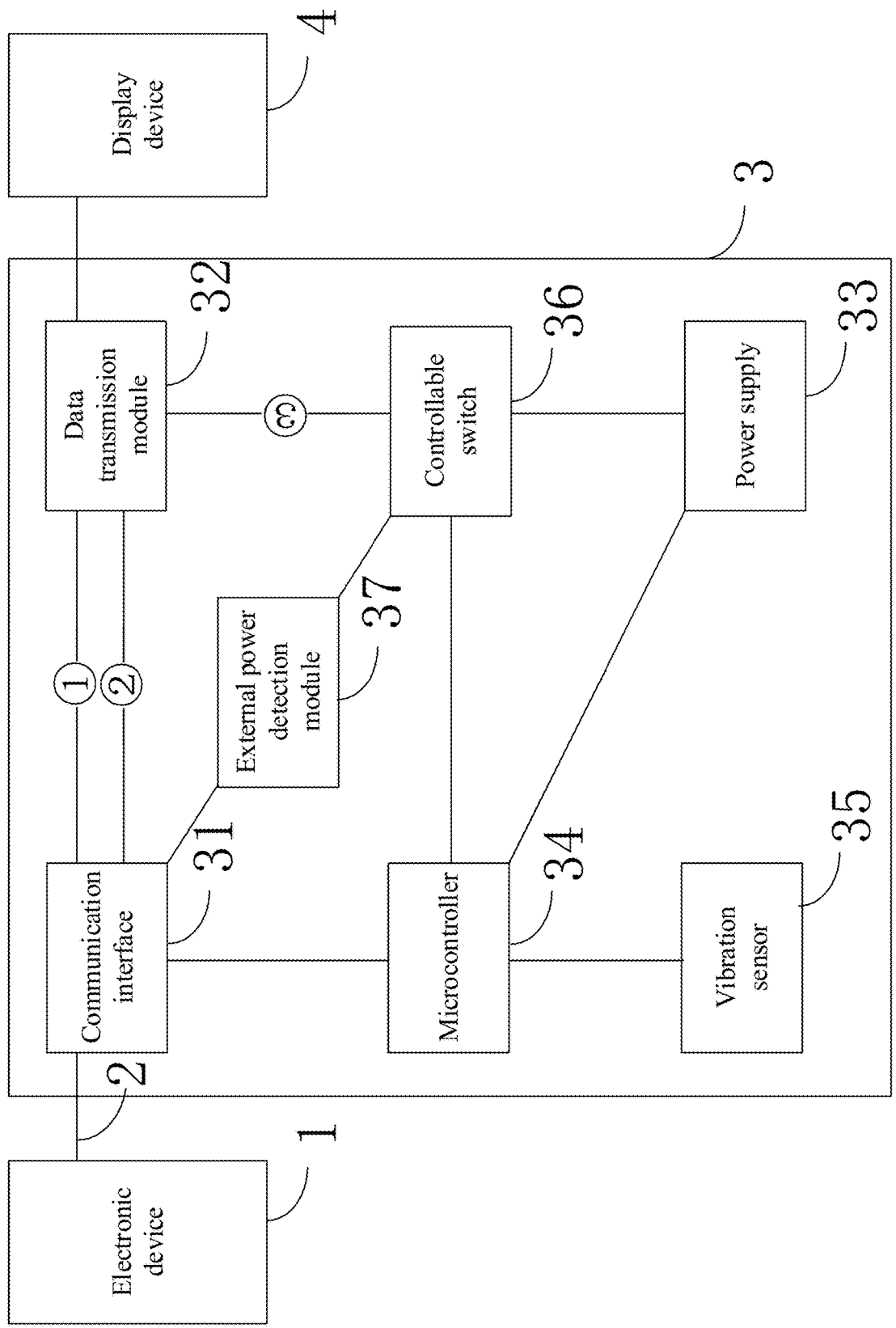
FIG. 14 is a schematic diagram of an application scenario framework of a data transmission device provided by an embodiment of this application.

Concretely, FIG. 14 is a schematic diagram of an application scenario framework of a data transmission device provided by an embodiment of the application. On the basis of the embodiment shown in FIG. 4, the data transmission device 3 shown in FIG. 10 further includes an external power detection module 37, which is respectively connected to the communication interface 31 and the controllable switch 36, and is used to detect whether an external power supply is connected to the communication interface 31. When detecting that no external power is connected to the communication interface 31, the external power detection module 37 transmits a second connection signal to the control switch 36, and the second connection signal is used for instructing to turn on the controllable switch 36. Thereinto, when the data transmission device 3 is connected to the electronic device 1 through the connection line 2, the electronic device 1 can transmit the electric power to the communication interface 31 of the data transmission device 3 through the connection line 2. At this time, the data transmission device 3 receives the electric power provided by the electronic device 1, therefore, the electronic device 1 can be called an external power supply, and correspondingly, the power supply 33 provided in the data transmission device 3 can be called an internal power supply.

When detecting the movement of the data transmission device 3, the microcontroller 34 transmits a first connection signal to the controllable switch 36 to instruct to turn on the controllable switch 36, and when detecting that no external power is connected to the communication interface 31, the external power detection module 37 transmits a second connection signal to the controllable switch 36 to instruct to turn on the controllable switch 36. Therefore, the controllable switch 36 in the data transmission device 3 can be provided with a related control circuit, so that the first connection signal provided by the microcontroller 34 and the second connection signal of the external power detection module 37 can be used together to control the controllable switch 36.

Concretely, when the microcontroller 34 determines that the user currently moves the data transmission device 3 according to the detection data of the vibration sensor 35 and the user may connect the data transmission device 3 to an electronic device subsequently, the microcontroller 34 provides the first connection signal to the controllable switch 36. However, if the communication interface 31 has been connected to the electronic device 1 through the connecting line 2, it is meaningless to turn on the controllable switch 36 according to the first connection signal. Therefore, when determining that no external power supply is currently connected to the communication interface 31, the external power detection module 37 can transmit the second connection signal to the controllable switch 36, so that the controllable switch 36 can be turned on only at the time of simultaneously receiving the first connection signal and the second connection signal. In addition, after the power connection is established between the internal power supply 33 and the data transmission module 32, if the external power detection module 37 subsequently detects that the external power supply is connected to the communication interface 31 (that is, the electronic device 1 is connected to the data transmission device 3), the external power detection module 37 does not transmit a second connection signal to the controllable switch (in one implementation, when the second connection signal is at a high level, the low level can be regarded as that the second connection signal is not transmitted. Or, when the second connection signal is at a low level, the high level is regarded as that the second connection signal is not transmitted, or is denoted as a second disconnection signal). At this time, regardless of whether the controllable switch 36 receives the first connection signal transmitted by the microcontroller 34, the controllable switch 36 is turned off when not receiving the second connection signal, so that the power connection between the internal power supply and the data transmission module 32 is disconnected.

Figure 15:
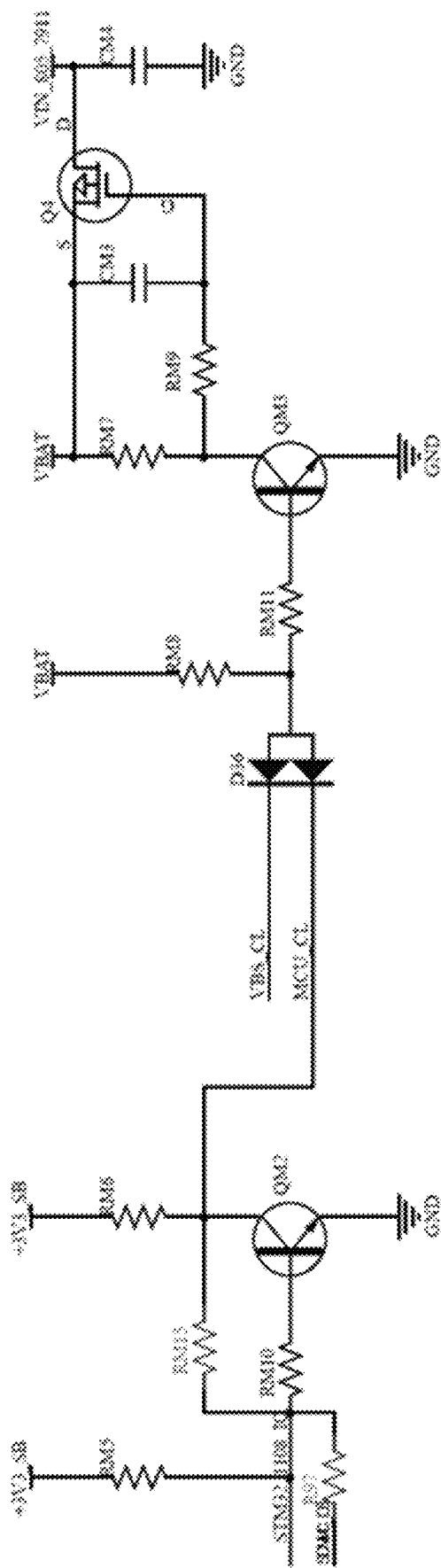
FIG. 15 is a schematic diagram of the structure of a related circuit of a controllable switch and an AND gate circuit provided by some embodiments of the application.

More concretely, in order to implement the above-mentioned controlling method of the data transmission device, to jointly determine the on and off of the controllable switch 36 according to the first connection signal and the second connection signal, this application further provides a concrete structural design of the controllable switch 36 and related control circuit in the data transmission device 3 as shown in FIG. 4. FIG. 15 is a schematic diagram of the structure of a related circuit of a controllable switch and an AND gate circuit provided by some embodiments of the application. As shown in FIG. 15, the controllable switch 36 can be turned on and off by turning on and off a field effect transistor Q4 in the figure. The source S of the field effect transistor Q4 is connected to the pin VBAT of the internal power supply, and the drain D is connected to the power supply end VIN 805_7911 of the data transmission module 32. In the example shown in FIG. 15, a p-channel enhancement type field effect transistor can be selected as the type of field effect transistor Q4. If the gate G is used as the control end of Q4, when a low-level signal is received, the field effect transistor Q4 is turned on, the connection between the source S and the drain D is connected; and when a high-level signal is received, the field effect transistor Q4 is turned off, and the connection between the source S and the drain D is broken off.

In the circuit shown in FIG. 15, a logic gate circuit is further provided in front of the field effect transistor Q4 for combining the first connection signal provided by the microcontroller 34 and the second connection signal provided by the external power detection module 37, and the two connection signals jointly determine whether to transmit the high-level signal or the low-level signal to the field effect transistor Q4. In a concrete implementation, an AND gate circuit serves as an example of the logic gate circuit.

In a first aspect, the first input end of the AND gate circuit D36 can be used to receive an MCU_CL signal. The low-level signal output by the microcontroller through the STM32_1108_IO pin is denoted as the first connection signal, and this low-level signal can be used for instructing to turn on the field effect transistor Q4. Therefore, in the circuit shown in FIG. 15, the low-level signal output by the STM32_1108_IO pin can cause the BJT QM2 (denoted as a second BJT) to be turned off, to obtain a high-level MCU_CL signal (that is, the low-level signal output by the microcontroller 34 is reversely processed), and the high-level MCU_CL signal is input to the AND gate circuit D36. It is understandable that, for example, the high-level signal output by the microcontroller through the STM32_1108_IO pin can be denoted as the first disconnection signal. This high-level signal can be used for instructing to turn off the field effect transistor Q4. Therefore, in the circuit shown in FIG. 15, the high-level signal output by the STM32_1108_IO pin is reversely processed by the BJT QM2, and then is input to the AND gate circuit D36 as the low-level MCU_CL signal. At this time, the low-level MCU_CL signal is input to the AND gate circuit D36.

Figure 16:
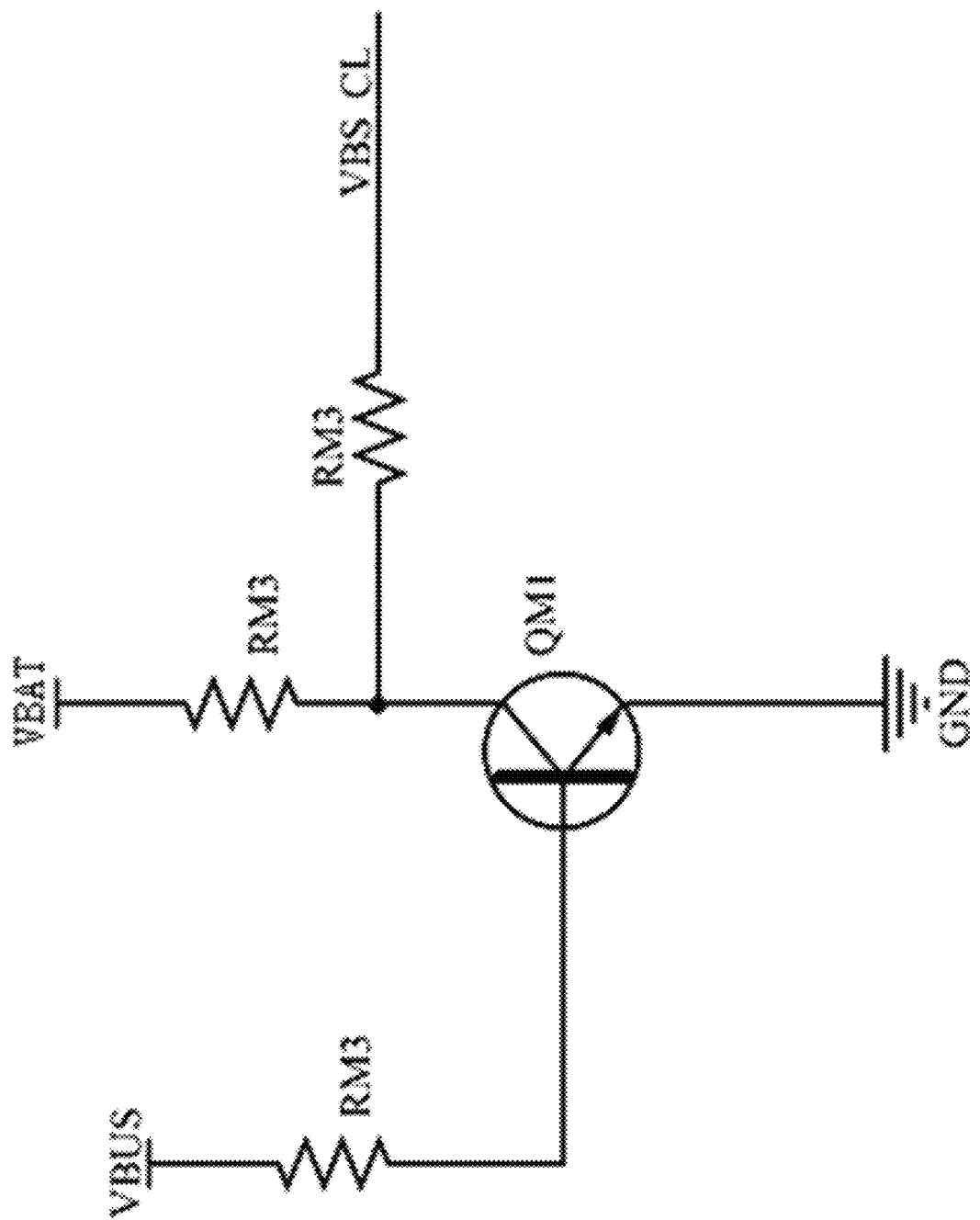
FIG. 16 is a schematic diagram of the structure of a partial circuit of an external power detection module provided by some embodiments of the application.

In a second aspect, the second input end of the AND gate circuit D36 can be used to receive a VBS_CL signal. FIG. 16 is a schematic diagram of the structure of a partial circuit of an external power detection module provided by some embodiments of the application, and the external power detection module 37 can include a BJT QM1 (denoted as the first BJT). The base of the BJT QM1 can be connected to the communication interface of the data transmission device 3 to detect whether the communication interface is connected to the external power supply VBUS. The emitter is grounded, and the collector is connected to the internal power supply (VBAT) and can be used to output the VBS_CL signal. When no external power supply is connected to the communication interface and VBUS is at a low level, the BJT QM1 is turned off, and the output VBS_CL signal is a high-level signal (VBAT), which can be denoted as the second connection signal and can be used for instructing to turn on the field effect transistor Q4. When an external power supply is connected to the communication interface and VBUS is at a high level, the BJT QM1 is turned on, and the output VBS_CL signal is a low-level signal (grounded), which can be denoted as the second disconnection signal and can used for instructing to turn off the FET Q4.

Finally, the AND gate circuit D36 can jointly determine whether the signal transmitted by the output end of the AND gate circuit D36 to the field effect transistor Q4 is concretely a low-level signal or a high-level signal, according to the combination of the MCU_CL signal transmitted by the microcontroller in the first aspect and the VBS_CL signal transmitted by the external power detection module 37 in the second aspect, so as to control the on and off of the transistor Q4. The logical correspondence between the MCU_CL signal and the VBS_CL signal is shown in Table 1.

TABLE 1

| Case | Level of VBS_CL | Level of MCU_CL | Level of the output of the AND | State of Q4 |
|---|---|---|---|---|
| 1 | High (No external power supply is connected) | Low (instructing to turn-off) | Low | Turning-off |
| 2 | High (No external power supply is connected) | High (instructing to turn-on) | High | Turning-on |
| 3 | Low (An external power supply is connected) | Low (instructing to turn-off) | Low | Turning-off |
| 4 | Low (An external power supply is connected) | High (instructing to turn-on) | Low | Turning-off |

Concretely, in case 1 shown in Table 1, when the data transmission device 3 is not connected to the electronic device 1, and no external power supply is connected to the communication interface 31, the external power detection module 37 outputs the second connection signal to the AND gate circuit D36. That is, the VBS_CL signal output by the external power detection module 37 to the second input end of the AND gate circuit D36 in the circuit shown in FIG. 15 is a high-level signal. At this time, when the microcontroller 34 does not detect the movement of the data transmission device 3, the high-level first disconnection signal is output. After the high-level first disconnection signal is reversely processed by the BJT QM2 in the circuit shown in FIG. 15, the MCU_CL signal finally output to the first input end of the AND gate circuit D36 is a low-level signal. The lower diode of the AND gate circuit D36 in FIG. 15 is connected, so as to cause the AND gate circuit D36 to output a low-level signal to turn off the BJT QM3 (denoted as the third BJT), and the signal finally input to the gate G of the field effect transistor Q4 is a high-level signal (the high-level signal output by the internal power supply VBAT through the resistors RM7 and RM9), the field effect transistor Q4 is turned off, and the connection between the source S and the drain D is broken off. Thus, the internal power supply will not supply power to the data transmission module 32 through the field effect transistor Q4.

In case 2 shown in Table 1, similarly, no external power supply is connected, and the VBS_CL signal transmitted by the external power detection module 37 to the second input end of the AND gate circuit D36 is a high-level signal. At this time, when the microcontroller 34 detects though the vibration sensor 35 that the data transmission device 3 has been moved, the microcontroller 34 outputs a low-level first connection signal to the AND gate circuit D36. After the low-level first connection signal is reversely processed by the BJT QM2 in the circuit shown in FIG. 15, the MCU_CL signal finally output to the first input end of the AND gate circuit D36 is a high-level signal. In FIG. 15, the two diodes of the AND gate circuit D36 are both cut off, and the internal power supply VBAT causes the BJT QM3 to be turned on. The signal finally input to the gate G of the field effect transistor Q4 is a low-level signal (grounded), the field effect transistor Q4 is turned on, and the connection between the source S and the drain D is connected. Thus, the internal power supply supplies power to the data transmission module 32 through the field effect transistor Q4.

In cases 3 and 4 in Table 1, after the data transmission device 3 is connected to the electronic device 1, the electronic device 1 can supply power to the data transmission device 3 through the connection line 2, and the external power detection module 37 outputs the second disconnection signal to the AND gate circuit D36. That is, the VBS_CL signal output by the external power module 37 to the second input end of the AND gate circuit D36 in the circuit shown in FIG. 15 is a low-level signal, and the upper diode of the AND D36 in FIG. 15 is turned on. Thus, no matter whether subsequently the MCU_CL signal transmitted by the microcontroller 34 to the first input end of the AND gate circuit D36 is a high-level signal or a low-level signal, the AND D36 outputs a low-level signal to the base of the BJT QM3 to cause the BJT QM3 to be turned off. The signal finally input to the gate G of the field effect transistor Q4 is a high-level signal (a high-level signal output by the internal power supply VBAT through the resistors RM7 and RM9), the field effect transistor Q4 is turned off, and the connection between the source S and the drain D is broken off. Therefore, after the data transmission device is connected to the external power supply, no matter how the microcontroller instructs, the internal power supply will not supply power to the data transmission module through the field effect transistor Q4.

It should be noted that the capacitors, resistors and other components provided in the circuit structure shown in FIGS. 15 and 16 are for the purpose of voltage division and protection, which belongs to an adaptive arrangement based on the functional elements such as field effect transistors, BJTs, and gate circuits mentioned above in this application. This application does not limit whether resistors and capacitors are installed at positions in the circuit, and the size and specifications of the resistors and capacitors. In actual applications, they can be adaptively arranged and adjusted according to concrete circuit requirements and working parameters of functional components.

In the above-mentioned embodiments of this application, from the perspective of the microcontroller provided in the data transmission device, the following contents were described: how the microcontroller controls the power supply to quickly supply power to the data transmission module, so that the data transmission module can be powered and started as soon as possible. As for the data transmission module itself, even when the data transmission device has not been connected to the electronic device yet, the data transmission device can start initialization and related communication configuration procedures after being powered on, and cooperate with the microcontroller to achieve rapid startup, so that after the data transmission device is connected to the electronic device subsequently, the data transmission device can transmit the data transmitted by the electronic device to the display device, for example, project the display interface of the electronic device onto the display device.

Figure 17:
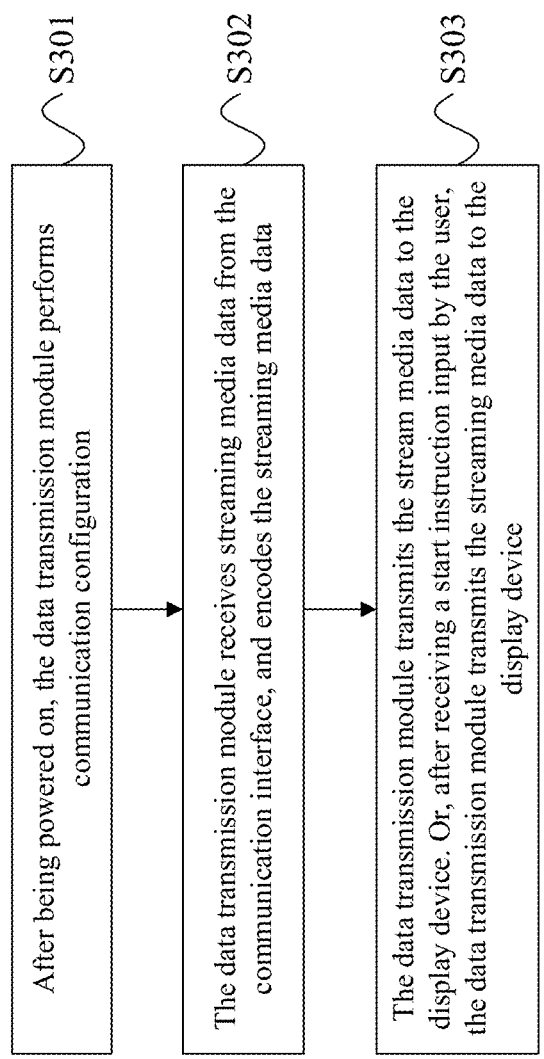
FIG. 17 is a schematic diagram of the flowchart of a controlling method of a data transmission device according to an embodiment of the application.

Concretely, FIG. 17 is a schematic diagram of the flowchart of a controlling method of a data transmission device according to an embodiment of the application. The execution subject of the method as shown in FIG. 17 can be a data transmission module in the data transmission device, or a processor in the data transmission module, for example, central processing unit (simply referred to as CPU), System on Chip (simply referred to as SoC), etc. The method shown in FIG. 17 can be executed by the data transmission module after S103 shown in FIG. 8 or S204 shown in FIG. 9, that is, after the microcontroller controls the power supply to supply power to the data transmission module. Concretely, the method includes:

S301: After being powered on, the data transmission module performs communication configuration.

Concretely, taking the data transmission device 3 in the embodiment shown in FIG. 4 as an example, after the microcontroller 34 in the data transmission device 3 controls the power supply 33 to supply power to the data transmission module 32, the data transmission module 32 is powered on and performs its own initial configuration and related communication configuration. The communication configuration includes the communication configuration of the data transmission module 32 to the interface 31, and/or the communication configuration for data communication between the data transmission module 32 and the display device 4. For example, when the communication interface 31 is a USB interface, the data transmission module 32 needs to perform communication configuration on the USB interface based on the USB communication protocol. When the data transmission module 32 projects the display interface to the display device 4 via Wi-Fi, the data transmission module 32 needs to perform communication configuration on the data transmission module 32 based on the Wi-Fi protocol.

S302: The data transmission module receives streaming media data from the communication interface, and encodes the streaming media data. The streaming media data includes but is not limited to video streaming data and audio streaming data.

Subsequently, after completing the communication-related configuration, the data transmission module 32 receives, from the communication interface 31, the streaming media data corresponding to the display interface of the electronic device 1 transmitted by the electronic device 1, and encodes the streaming media data. The function of encoding is to make the streaming media data meet the communication protocol between the data transmission module 32 and the display device 4. For example, if the data transmission module 32 communicates with the display device 4 through Wi-Fi, the data transmission module 32 encodes the streaming media data according to the Wi-Fi protocol in S302, and the encoded streaming media data can be subsequently transmitted to the display device 4 via Wi-Fi.

Thereinto, if the user has connected the electronic device 1 and the data transmission device 3 through the connection line 2 before the data transmission module 32 completes the communication configuration through S301, after the data transmission module completes the communication configuration through S301, the data transmission module receives, from the communication interface, the streaming media data output from the electronic device 1 through S302, and encodes the streaming media data. If the user has not connected the data transmission device 3 to the electronic device 1 after the data transmission module 32 completes the communication configuration through S301, the data transmission module 32 temporarily cannot receive the streaming media data from the communication interface 31. When the user connects the electronic device 1 and the data transmission device 3 through the connection line 2, the data transmission module 32 can start to execute S302—receive, from the communication interface, the streaming media data output from the electronic device 1 and encode the streaming media data, and then transmit the encoded streaming media data to the display device 4.

Therefore, in the embodiment, after the data transmission module 32 in the data transmission device 3 obtains electric power provided by the power supply 33, even if the data transmission device 3 is currently not connected to the electronic device 1, the data transmission device 3 can perform the configuration process of related communication first, so that after the user subsequently connects the data transmission device 3 to the electronic device 1 by using the connection line 2, the data transmission device 3 can receive the streaming media data corresponding to the display interface transmitted by the electronic device 1, and perform subsequent processing such as encoding, thereby improving the response speed and transmission efficiency of the data transmission module 32. The intuitive feeling brought to users is that after plugging the data transmission device 3 into the electronic device 1, the data transmission device 3 can process the streaming media data of the display interface on the electronic device 1 and project the streaming media data onto the display device 4 in a short time or even immediately, which brings user experience of "display immediately after plug" and improves work efficiency.

S303: The data transmission module transmits the stream media data encoded in S302 to the display device for display. Or, after receiving a start instruction input by the user, the data transmission module transmits the streaming media data to the display device.

Subsequently, in S303, the data transmission module 32 can transmit the streaming media data encoded in S302 to the display device 4 with the configured communication mode for display. Or, after receiving the instruction input by the user, the data transmission module 32 executes S303 and transmits the encoded streaming media data to the display device 4 with the configured communication mode for display. The streaming media data can be video streaming data received in real time, so that the picture of the electronic device 1 and the picture of the display device 4 are basically synchronized.

Optionally, when transmitting the streaming media data to the display device 4 in S303, the data transmission module can also transmit a data transmission instruction (a screen transmission instruction is taken as an example in this description) to the display device 4 synchronously, so that after receiving the data transmission instruction (a screen transmission instruction is taken as an example in this description), the display device 4 processes and displays the received streaming media data transmitted from the data transmission module. The meaning of the screen transmission instruction is to instruct the display device to perform decoding and other processing, and display. For example, when the user inputs a stop instruction on the data transmission device 3 during data transmission (for example, the user presses the stop button on the data transmission device), the data transmission device 3 stops transmitting the encoded streaming media data to the display device 4, and transmits a stop transmission instruction (a stop screen transmission instruction is taken as an example in this description) to the display device 4. The stop transmission instruction (a stop screen transmission instruction is taken as an example in this description) is used for instructing the display device 4 not to display the received streaming media data. Thus, the display device 4 stops displaying the display interface generated according to the streaming media data transmitted by the data transmission device 3.

Figure 18:
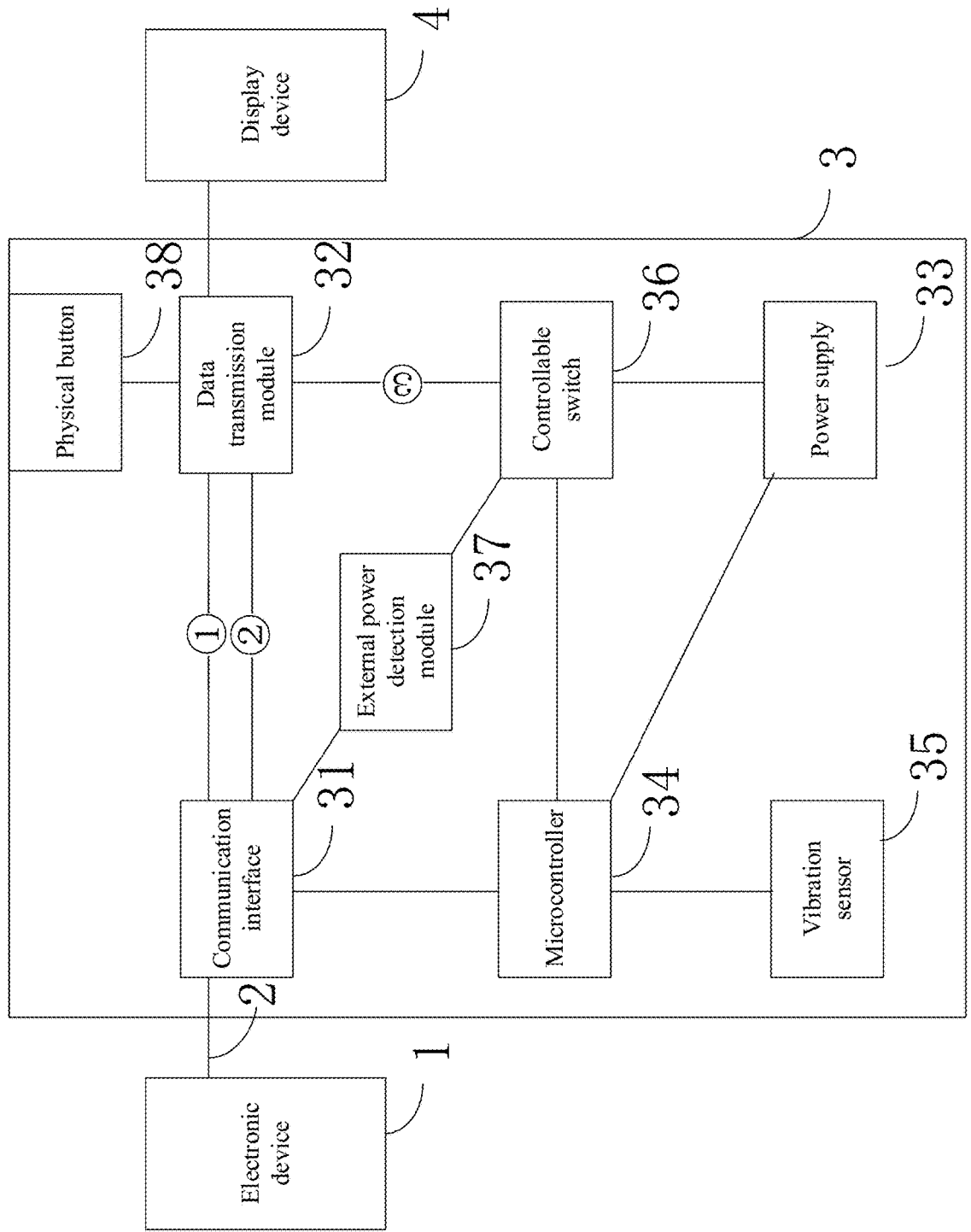
FIG. 18 is a schematic diagram of an application scenario framework of a data transmission device provided by an embodiment of this application.

Optionally, FIG. 18 is a schematic diagram of an application scenario framework of a data transmission device provided by an embodiment of this application. Based on the embodiment shown in FIG. 4, the data transmission device 3 shown in FIG. 18 further includes a physical button 38. The physical button 38 can be arranged on the surface of the data transmission device 3, and the physical button 38 is connected to the data transmission module 32 inside the data transmission device 3. Thus, the user can send a start instruction to the data transmission module 32 by pressing the physical button 38. After receiving the start instruction, the data transmission module 32 transmits the encoded streaming media data to the display device 4.

Figure 19:
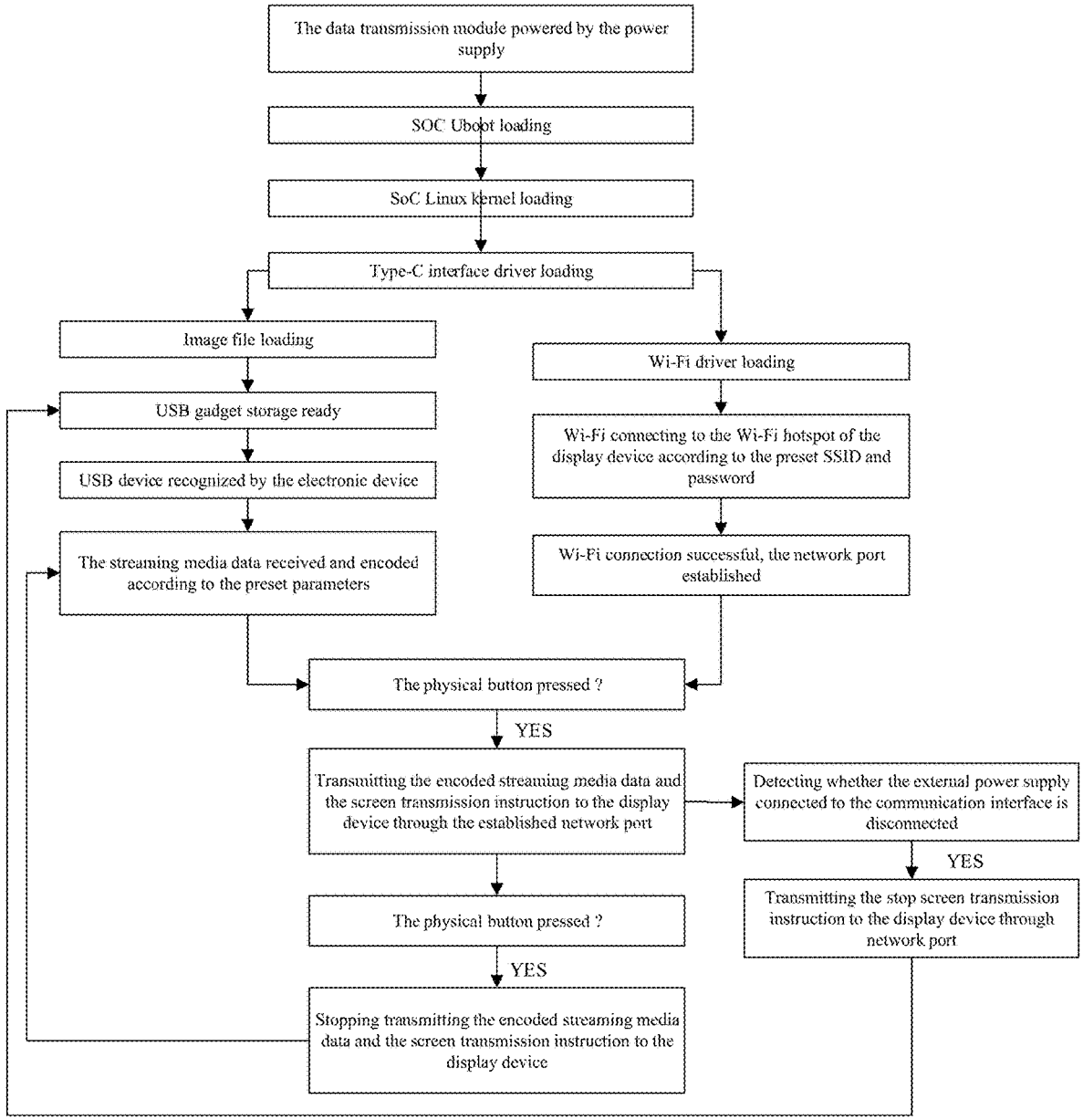
FIG. 19 is a schematic diagram of a state when a data transmission module executes a controlling method of a data transmission device provided by some embodiments of the application.

More concretely, FIG. 19 is a schematic diagram of a state when a data transmission module provided by some embodiments of the application executes a controlling method of a data transmission device, and by using the SoC in the data transmission module as the execution subject, the detailed operation of the data transmission module from the time of being powered on to the time of data transmission is described.

As shown in FIG. 19, taking an example of using USB Type-C interface as the communication interface and performing data communication between the data transmission module and the display device through Wi-Fi, when the data transmission module 32 is powered by the power supply 33, the initialization operations of SoC are executed first. The initialization operations include but are not limited to SOC UBoot loading, SoC Linux kernel loading, Type-C driver loading, and the like. And after the initialization of the SoC itself is completed, the configuration of the communication interface (USB interface) and the configuration of the data communication (Wi-Fi) are performed. The configuration of the USB interface shown by the arrow on the left in FIG. 19 and the Wi-Fi configuration shown by the arrow on the right in FIG. 19 can be executed by SoC simultaneously or sequentially, and the execution order is not limited. The Wi-Fi configuration process includes the following steps: Wi-Fi driver loading, Wi-Fi connecting to the Wi-Fi hotspot corresponding to the display device according to the preset account and password, and establishing the corresponding network port after connecting to the hotspot, so that the SoC can perform data communication with the display device 4 through Wi-Fi. The configuration process of the USB interface includes the following steps: loading image file, and getting USB gadget storage ready.

Subsequently, when the SoC completes the above initialization process and the data transmission device 32 is connected to the electronic device 1, the USB device (data transmission device 32) is recognized by the electronic device 1, and the SoC can receive the streaming media data transmitted by the electronic device 1 through the USB interface. After the streaming media data is encoded according to the configured Wi-Fi protocol parameters, the SoC waits for the user to press the physical button. When receiving the start instruction sent by the user through the physical button, the SoC can transmit the encoded streaming media data to the display device 4 through the pre-established network port, and at the same time, transmit the screen transmission instruction to the display device 4, and then the display device 4 displays the received streaming media data after performing processes such as decoding.

In addition, optionally, after the data transmission module 32 transmits the streaming media data to the display device 4, the method also includes, after receiving the stop instruction input by the user, the data transmission module 32 stops transmitting the screen transmission instruction to the display device 4, and the data transmission module 32 itself also stops continuing transmitting streaming media data to the display device. The input of a stop instruction by the user can be another pressing of the physical button 38.

Figure 20:
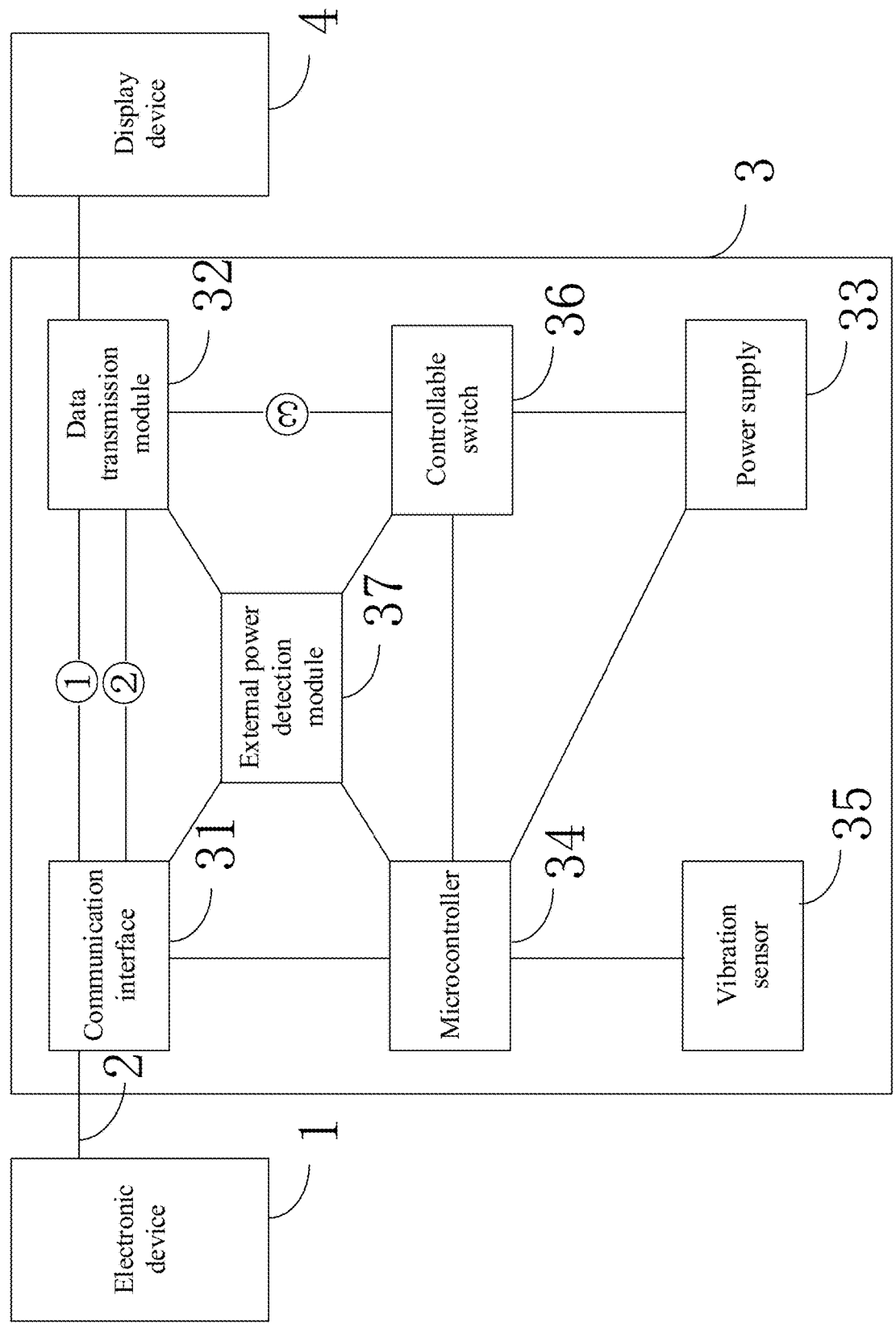
FIG. 20 is a schematic diagram of an application scenario framework of a data transmission device provided by an embodiment of this application.

In another implementation, FIG. 20 is a schematic diagram of an application scenario framework of a data transmission device provided by an embodiment of this application. In FIG. 20, in addition to the external power detection module 37 can connect to the controllable switch 36 and transmit the second connection signal to the controllable switch 36, the external power detection module 37 can also connect to the microcontroller 34 and the data transmission module 32 to detect whether an external power supply is connected to the communication interface 31, and according to the detection result, transmit corresponding instruction signals (for example, a high-level signal is used to instruct that an external power supply is connected to the communication interface 31, and a low-level signal is used to instruct that no external power is connected to the communication interface 31; or, a low-level signal is used to instruct that an external power supply is connected to the communication interface 31, and a high-level signal is used to instruct that no external power is connected to the communication interface 31, etc.) to the microcontroller 34 and/or the data transmission module 32. It can be understood that the external power detection module 37 can be connected to the microcontroller 34 while not being connected to the data transmission module 32. When the external power detection module 37 connects to both the microcontroller 34 and the data transmission module 32, the data transmission module 32 can also detect whether an external power supply is connected to the communication interface 31, so as to determine whether to transmit streaming media data to the display device.

Concretely, in the actual application of the external power detection module 37, a scenario can be that, after transmitting the streaming media data to the display device 4, the data transmission module 32 can detect whether the external power supply is disconnected from the communication interface 31 according to the instruction signal transmitted by the external power detection module 37 which is set in the data transmission device 3 and connected to the data transmission module 32. When the data transmission module 32 receives the instruction signal transmitted by the external power detection module 37 for instructing that the external power has been disconnected, the data transmission module 32 stops transmitting the screen transmission instruction to the display device 4, and the data transmission module 32 itself also stops continuing transmitting the streaming media data to the display device 4. In another scenario, when the microcontroller 34 receives the instruction signal transmitted by the external power detection module 37 for instructing that the external power has been disconnected, the microcontroller 34 starts a timer, and then if within a preset time (for example, 60 seconds) counted by the timer, the microcontroller 34 does not receive the instruction signal transmitted by the external power detection module 37 for instructing that an external power supply is connected to the communication interface 31, the microcontroller 34 transmits a signal (i.e., the above-mentioned first disconnection signal) to the controllable switch 36 for instructing to turn off the controllable switch 36. At this time, the external power detection module 37 also transmits a signal (i.e., the above-mentioned second disconnection signal) to the controllable switch 36 for instructing to turn off the controllable switch 36, so the controllable switch 36 is turned off and the microcontroller 34 enters the standby state. If within the preset time (for example, 60 seconds) counted by the timer, the microcontroller 34 receives the instruction signal transmitted by the external power detection module 37 for instructing that an external power supply is connected to the communication interface 31, the microcontroller 34 continues transmitting a signal (i.e., the above-mentioned first connection signal) to the controllable switch 36 continues for instructing to turn on the controllable switch 36. At this time, the external power detection module 37 can also transmit a signal (i.e., the above-mentioned second disconnection signal) to the controllable switch 36 for instructing to turn off the controllable switch 36, so the controllable switch 36 is turned off.

Figure 21:
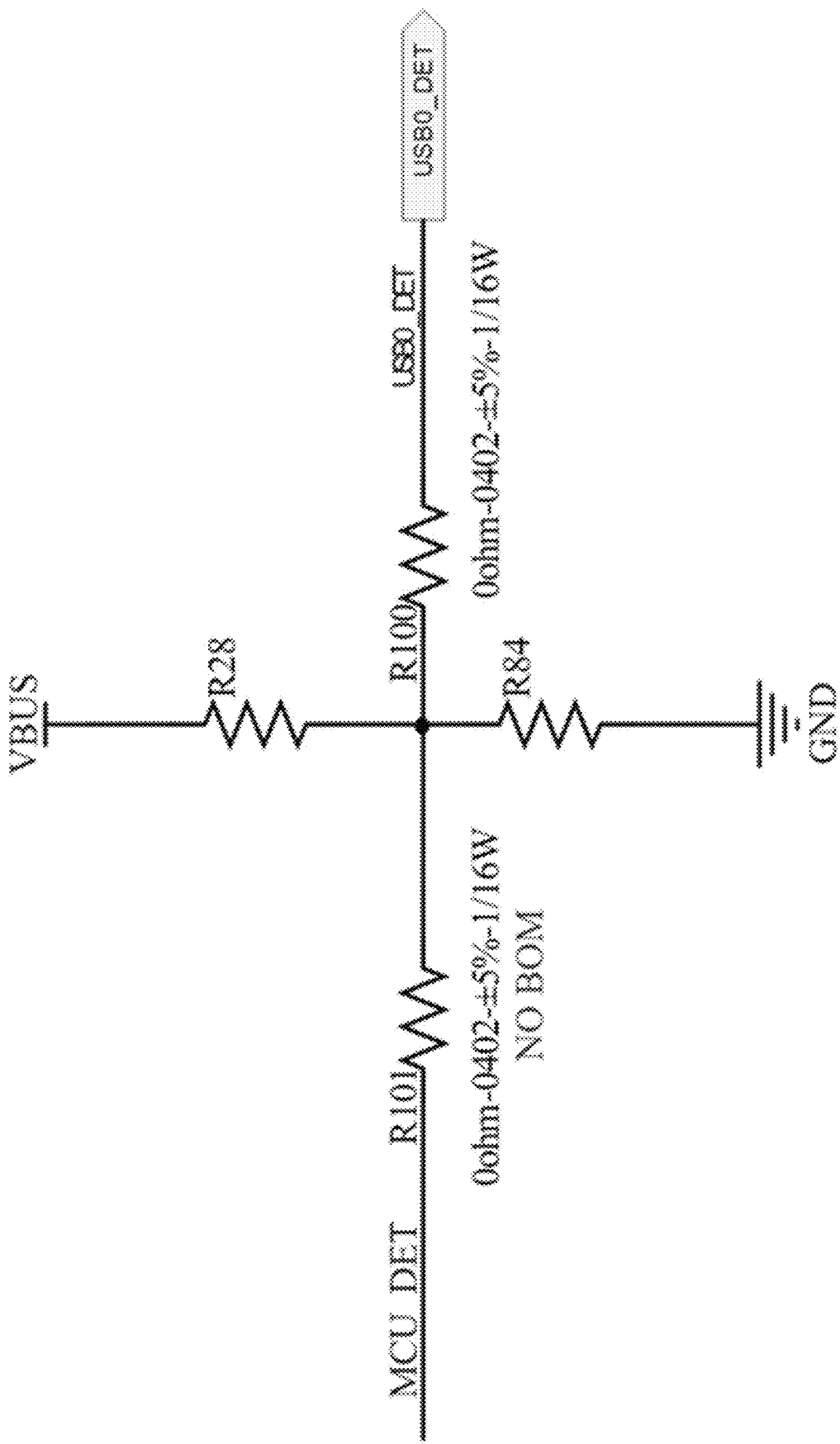
FIG. 21 is a schematic diagram of the structure of a partial circuit of an external power detection module provided by an embodiment of the application.

FIG. 21 is a schematic diagram of the structure of a partial circuit of an external power detection module provided by an embodiment of the application. On the basis of the partial circuit shown in FIG. 16, the external power detection module 37 provided in FIG. 21 further includes a resistor R28 (denoted as the first resistor), a resistor R84 (denoted as the fourth resistor), a resistor R101 (denoted as the second resistor), and a resistor R100 (denoted as the third resistor). It is understandable that, in order to cooperate with the circuit of the controllable switch 36 in the structure shown in FIG. 16, the external power detection module 37 needs to be provided with a transistor after the connected external power VBUS for reverse processing, and when the external power detection module 37 connects to the microcontroller 34 and the data transmission module 32, there is no need to provide a BJT.

Concretely, in the part of the circuit shown in FIG. 21 in the external power detection module 37, the power supply connected to the communication interface 31 is denoted as VBUS. VBUS is grounded through resistors R28 and R84, and VBUS is also connected to the USB0_DET pin of the data transmission module 32 through resistors R28 and R100. Therefore, the data transmission module can determine whether the external power supply VBUS is connected to the communication interface of the data transmission device 3 according to the level value of the USB0_DET pin. VBUS is also connected to the MCU_DET pin of the microcontroller 34 through the resistors R28 and R101, and the microcontroller 34 can determine whether the external power supply VBUS is connected to the communication interface of the data transmission device 3 through the level value of the MCU_DET pin.

For example, when an external power supply is connected to the communication interface 31, VBUS is at a high level. At this time, the transmission from the external power detection module 37 to the data transmission module 32 through the USB0_DET pin is also at a high level. This high-level signal can be regarded as an instruction signal for instructing that the external power supply is connected to the communication interface 31, so that the data transmission module 32 can determine that the communication interface 31 is connected to the external power supply according to the high-level instruction signal. When the communication interface 31 is not connected to the external power supply, the VBUS is at a low level, at this time, the transmission from the external power detection module 37 to the data transmission module 32 through the USB0_DET pin is also at a low level. This low-level signal can be regarded as an instruction signal for instructing that no external power supply is connected to the communication interface, so that the data transmission module 32 can determine that the communication interface 31 is not connected to an external power supply according to the low-level instruction signal. For another example, when an external power supply is connected to the communication interface, VBUS is at a high level, at this time, the transmission from the external power detection module 37 to the microcontroller 34 through the MCU_DET pin is also at a high level. This high-level signal can be regarded as an instruction signal for instructing that an external power supply is connected to the communication interface 31, so that the microcontroller 34 can determine that the communication interface 31 is connected to an external power supply according to the high-level instruction signal. When the communication interface 31 is not connected to an external power supply, the VBUS is at a low level. At this time, the transmission from the external power detection module 37 to the data microcontroller 34 through the MCU_DET pin is also at a low level. This low-level signal can be regarded as an instruction signal for instructing that no external power supply is connected to the communication interface 31, so that the microcontroller 34 can determine that the communication interface 31 is not connected to an external power supply according to the low-level instruction signal.

Optionally, the resistors R28, R84, R100, and R101 shown in FIG. 21 are all from the perspective of circuit safety to ensure the reliability of the circuit. In the simplest implementation, the connection detection circuit shown in FIG. 21 can also have no resistance or be set with a resistance value of 0, so that the MCU_DET pin of the microcontroller 34 and the USB0_DET pin of the data transmission module 32 can be directly connected to the external power supply VBUS for more direct detection.

Overall, in the controlling method of a data transmission device provided by the embodiment, after transmitting the streaming media data to the display device for display, the data transmission module which serves as the execution subject can detect that the external power supply is disconnected from the communication interface according to the stop instruction of the user or the external power detection module, and then the data transmission module immediately stops transmitting the screen transmission instruction to the display device, so that the display device will not continue displaying the display interface of the electronic device. In actual use, after the user connects the electronic device to the data transmission device, if it is found that the interface currently displayed by the electronic device is not convenient to be displayed on the display device, the user can send a stop instruction or directly unplug the data transmission device from the electronic device, so that the display device no longer displays the streaming media data transmitted by the data transmission device, thereby improving the response speed of the data transmission device to the user's disconnection instructions and actions, which improves the response speed and data transmission efficiency of the data transmission device and protects the privacy of the user to a certain extent, so that mistaken projection of private information on the screen by the user can be stopped in time, thereby improving the user experience of the data transmission device.

Optionally, in the data transmission device 3 provided by the embodiment of this application, when the movement of the data transmission device 3 is detected, the microcontroller 34 controls the power supply 33 to supply power to the data transmission module 32. However, in some application scenarios, the movement of the data transmission device 3 may not be that the user wants to use the data transmission device 3 for data transmission, but that the user accidentally touches the data transmission device 3 or just wants to move the data transmission device 3, and will not connect the data transmission device 3 to the electronic device 1 subsequently. At this time, if the internal power supply 33 continues to supply power to the data transmission module 32, the electric power of the power supply 33 will be wasted. Therefore, the embodiment of this application further proposes a dual power saving protection mechanism for this technical problem. The embodiment of this application first proposes to provide an acceleration threshold value in the vibration sensor 35 or the microcontroller 34 (referring to the setting method of the threshold value in the embodiments for details). Based on the comparison result, the microcontroller 34 determines whether to transmit a connection signal to the controllable switch 36. By setting the acceleration threshold, some small vibrations or invalid vibration signals can be filtered out to prevent the microcontroller 34 from transmitting a connection signal to the controllable switch 36 and supplying power from the power supply 33 to the data transmission module 32, which wastes electric power. However, even when part of the acceleration values in the detection data of the vibration sensor 35 exceeds the preset acceleration threshold, it does not mean that the user wants to use the data transmission device 3. Therefore, in order to further reduce the waste of electric power of the power supply 33, after the microcontroller 34 connects the power connection between the internal power supply 33 and the data transmission module 32, the method further includes the following steps.

Within the first preset time (for example, 60 seconds, this period of time is sufficient for the user to connect the data transmission device 3 with the electronic device 1) after the microcontroller 34 receives the detection data or an interrupt signal of the vibration sensor 35, if the microcontroller 34 receives the instruction signal from the external power detection module 37 for instructing that an external power is connected to the communication interface 31, the microcontroller 34 continues transmitting a signal (i.e., the above-mentioned first connection signal) to the controllable switch 36 for instructing to turn on the controllable switch 36. At this time, the external power detection module 37 transmits a signal (i.e., the above-mentioned second disconnection signal) to the controllable switch 36 for instructing to turn off the controllable switch 36, so the microcontroller 34 controls to turn off the controllable switch 36, and to disconnect the power connection between the internal power supply 33 and the data transmission module 32. Within the first preset time after the microcontroller 34 receives the detection data or an interrupt signal of the vibration sensor 35, if the communication interface 31 does not receive the instruction signal from the external power detection module 37 for instructing that an external power is connected to the communication interface 31, after the first preset time, the microcontroller 34 transmits a signal (i.e., the above-mentioned first disconnection signal) to the controllable switch 36 for instructing to turn off the controllable switch 36. At this time, the external power detection module 37 transmits a signal (i.e., the above-mentioned second connection signal) to the controllable switch 36 for instructing to turn on the controllable switch 36, so the controllable switch 36 is controlled to be turned off, and the power connection between the internal power supply 33 and the data transmission module 32 is controlled to be disconnected.

Concretely, the execution subject of this step can be the microcontroller 34. After determining that the data transmission device 3 is moved, the microcontroller 34 can transmit the first connection signal by setting the STM32_1108_IO pin of the microcontroller 34 to a low-level signal as shown in FIG. 15 to control to turn on the controllable switch 36, so that the internal power supply 33 supplies power to the data transmission module 32 through the controllable switch 36. And at this time, the microcontroller 34 starts a timer for a first preset time (for example, 60 seconds). After the controllable switch 36 is turned on, the microcontroller 34 detects whether an external power supply is connected to the communication interface 31. Optionally, for example, according to an instruction signal output by the external power detection module 37 in FIG. 21, that is, the level of the MCU_DET pin, the microcontroller 34 can determine whether an external power supply is connected to the communication interface 31. If it is determined that an external power supply is connected according to the instruction signal before the 60-second counting of the timer terminates, the time counting is terminated, and the microcontroller 34 maintains the STM32_1108_IO pin to be a low-level signal (for instructing to turn on the controllable switch 36). If after the 60-second counting of the timer terminates, it is determined according to the instruction signal that no external power supply is connected during the 60 seconds, after 60-second counting of the timer terminates, the microcontroller 34 transmits the first disconnection signal (for instructing to turn off the controllable switch 36) by adjusting the STM32_1108_IO pin to a high-level signal to control to turn off the controllable switch 36, so that the power supply does not need to continue supplying power to the data transmission module 32 after 60 seconds, thereby ensuring that the movement caused by accidentally touching the data transmission device by a non-user will not cause that the power supply 33 continuously supplies power to the data transmission module 32, which reduces the power loss and improves the completeness of the microcontroller 34 when controlling the data transmission device.

In addition, in another embodiment of this application, after the data transmission device 3 is connected to the electronic device 1, the microcontroller 34 continues to transmit a signal (i.e., the above-mentioned first connection signal) to the controllable switch 36 for instructing to turn on the controllable switch 36. At this time, since the external power detection module 37 transmits a signal (i.e., the above-mentioned second disconnection signal) to the controllable switch 36 for instructing to turn off the controllable switch 36, the microcontroller 34 controls to turn off the controllable switch 36, and to disconnect the power connection between the internal power supply 33 and the data transmission module 32. If the data transmission device 3 is later unplugged by the user, the microcontroller 34 does not transmit a signal (i.e., the above-mentioned first disconnection signal) to the controllable switch 36 for instructing to turn off the controllable switch 36, but will start a timer for the second preset time (for example, 60 seconds). Before the time counting terminates, the microcontroller 34 continues transmitting a signal (i.e., the above-mentioned first connection signal) for instructing to turn on the controllable switch 36, and the external power detection module 37 transmits a signal (i.e., the above-mentioned second connection signal) to the controllable switch 36 for instructing to turn on the controllable switch 36, so the controllable switch 36 is controlled to be turned on, and the power connection between the internal power supply 33 and the data transmission module 32 is controlled to resume connection. Thus, even after the data transmission device 3 is unplugged, before the second-preset-time counting of the timer terminates, if the data transmission device 3 is connected to the electronic device 1, since the controllable switch 36 is turned on and the power supply 33 supplies power to the data transmission module 32, the data transmission module 32 is in the working state, without causing the power supply to immediately stop due to the loss of external power after the data transmission device 3 is unplugged. As a result, when the data transmission device 3 is unplugged by the user from an electronic device 1 and plugged to the next electronic device 1, the data transmission can be performed quickly and work efficiency is improved.

Optionally, in the above embodiment, after the microcontroller 34 controls the controllable switch 36 to be turned on, if the vibration sensor 35 does not detect the subsequent movement of the data transmission device 3, the microcontroller 24 can enter the standby mode. Subsequently, when the vibration sensor 35 detects the movement of the data transmission device, the vibration sensor 35 can wake up the microcontroller 34 by transmitting an interrupt signal to the microcontroller 34, so that after switching back to the working state, the microcontroller 34 immediately sets the STM32_1108_IO pin to a low-level signal, starts a timer for a preset time, and detects whether the external power supply is connected.

Figure 22:
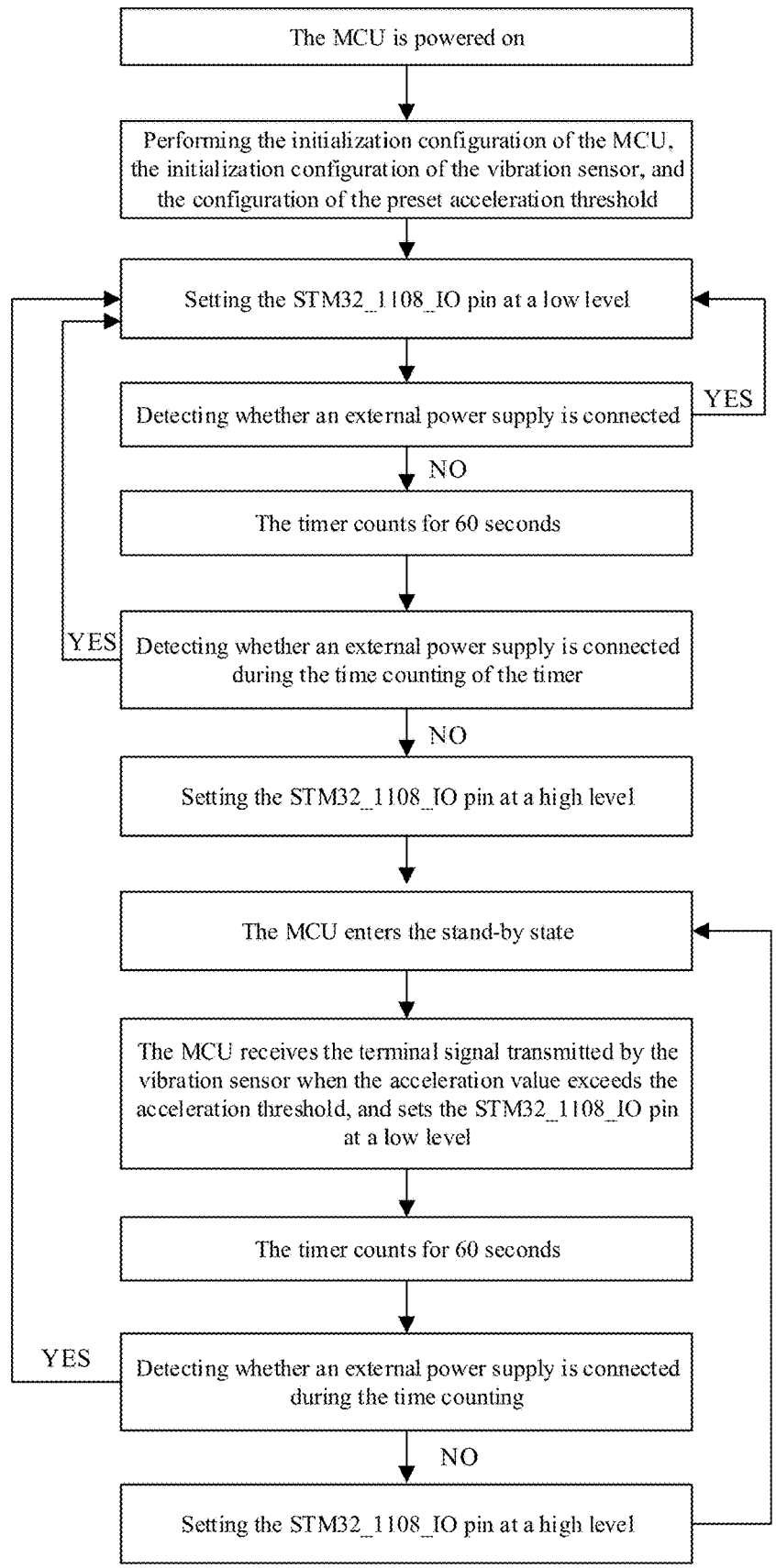
FIG. 22 is a schematic diagram of a state when a microcontroller executes a controlling method of a data transmission device provided by some embodiments of the application.

For example, FIG. 22 is a schematic diagram of a state when a microcontroller executes a controlling method of a data transmission device provided by some embodiments of the application, and the microcontroller 34 is taken as an example of the MCU provided in the data transmission device 3. When the MCU is powered on (for example, after the data transmission device 3 is powered on when it leaves the factory), the initialization configuration of the MCU is performed, which includes the configuration of the acceleration threshold. The MCU sets the STM32_1108_IO pin to a low level signal after completing the above-mentioned startup work, and starts a timer for 60-second counting when the MCU detects that no external power supply is connected to the communication interface of the data transmission device 3. Within 60 seconds of the timer, the MCU continues detecting whether an external power supply is connected to the communication interface. If the connection of an external power supply is detected within 60 seconds, the MCU maintains the STM32_1108_IO pin to be a low-level signal. If no connection of any external power supply is detected within 60 seconds, the MCU sets the STM32_1108_IO pin to a high-level signal and enters the standby state. Until the next time when the vibration sensor 35 detects the movement of the data transmission device (that is, the real-time acceleration value exceeds the preset acceleration threshold) and transmits an interrupt signal to the MCU, the MCU is switched from the standby to the working state, and sets the STM32_1108_IO pin to a low-level signal according to the interrupt signal, and then repeats the above-mentioned process of starting the timer for 60 seconds, and the routine continues to loop.

After the data transmission device 3 is connected to the electronic device 1 within the preset time, the MCU maintains the STM32_1108_IO pin to be a low-level signal to the controllable switch 36 for instructing to turn on the controllable switch 36. At this time, the VBS_CL signal transmitted by the external power detection module 37 to the control switch 36 is a low-level signal to instruct to turn off the controllable switch 36, so the controllable switch 36 is controlled to be turned off, and the power connection between the internal power supply 33 and the data transmission module 32 is controlled to be disconnected. If the data transmission device 3 is then unplugged by the user again, since the microcontroller 34 continues being a low level signal to the controllable switch 36 to instruct to turn on the controllable switch 36, and the VBS_CL signal transmitted by the external power detection module 37 to the controllable switch 36 is a high-level signal for instructing to turn on the controllable switch 36, so the controllable switch 36 is controlled to be turned on, and the power connection between the internal power supply 33 and the data transmission module 32 is controlled to resume connection. Thus, even if the data transmission device 3 is unplugged, the data transmission module 32 continues in the working state, without causing power supply to immediately stop due to the loss of external power after the data transmission device 3 is unplugged. As a result, when the data transmission device 3 is plugged to the next electronic device 1, the data transmission can be performed quickly and work efficiency is improved.

Optionally, an embodiment of this application further provides a controlling method of a data transmission device, which is applied to the process of switching the connection relationship between the same data transmission device and different electronic devices, and the execution subject can be a microcontroller. Thereinto, the microcontroller can also detect whether an external power supply is connected to the communication interface through the MCU_DET pin in the external power detection module as shown in FIG. 21. After detecting that the external power supply of the communication interface is disconnected, the microcontroller can control the internal power supply to supply power to the data transmission module, so that the data transmission module maintains a wireless connection with the display device. When the user connects the data transmission device to another electronic device subsequently, at this time, the data transmission module can transmit the streaming media data transmitted by the current electronic device to the display device, without needing to perform steps of initialization and related communication configuration, so as to reduce the preparation time required for connecting the data transmission device to the switched electronic device in the process of switching the data transmission device from another electronic device, thereby reducing the waiting time for the user to see the projected display interface on the display device after connecting the data transmission device to the switched electronic device, which improves the data transmission efficiency of the data transmission device and improves the user experience.

Figure 23:
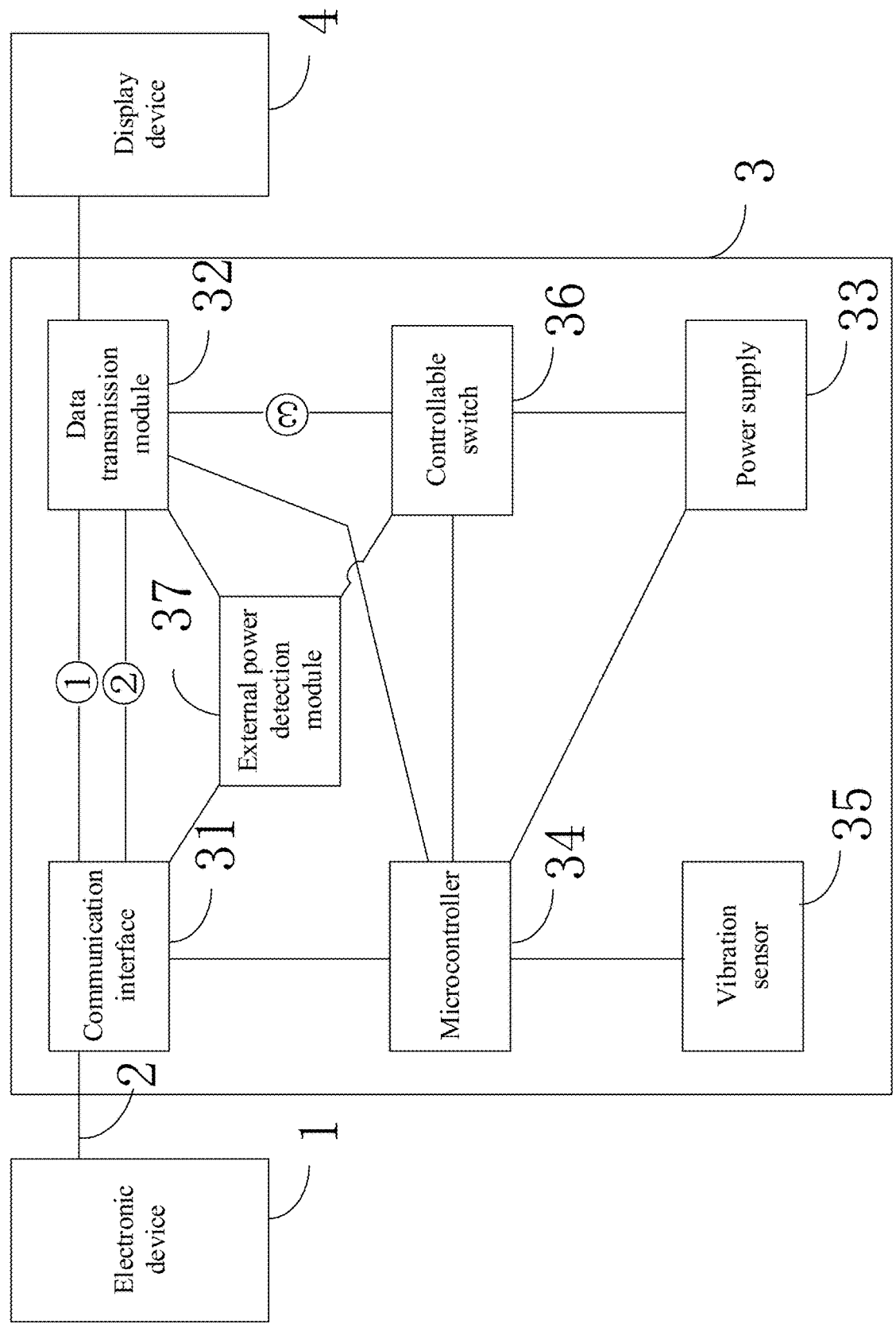
FIG. 23 is a schematic diagram of an application scenario framework of an embodiment of a data transmission device provided by this application.
Figure 24:
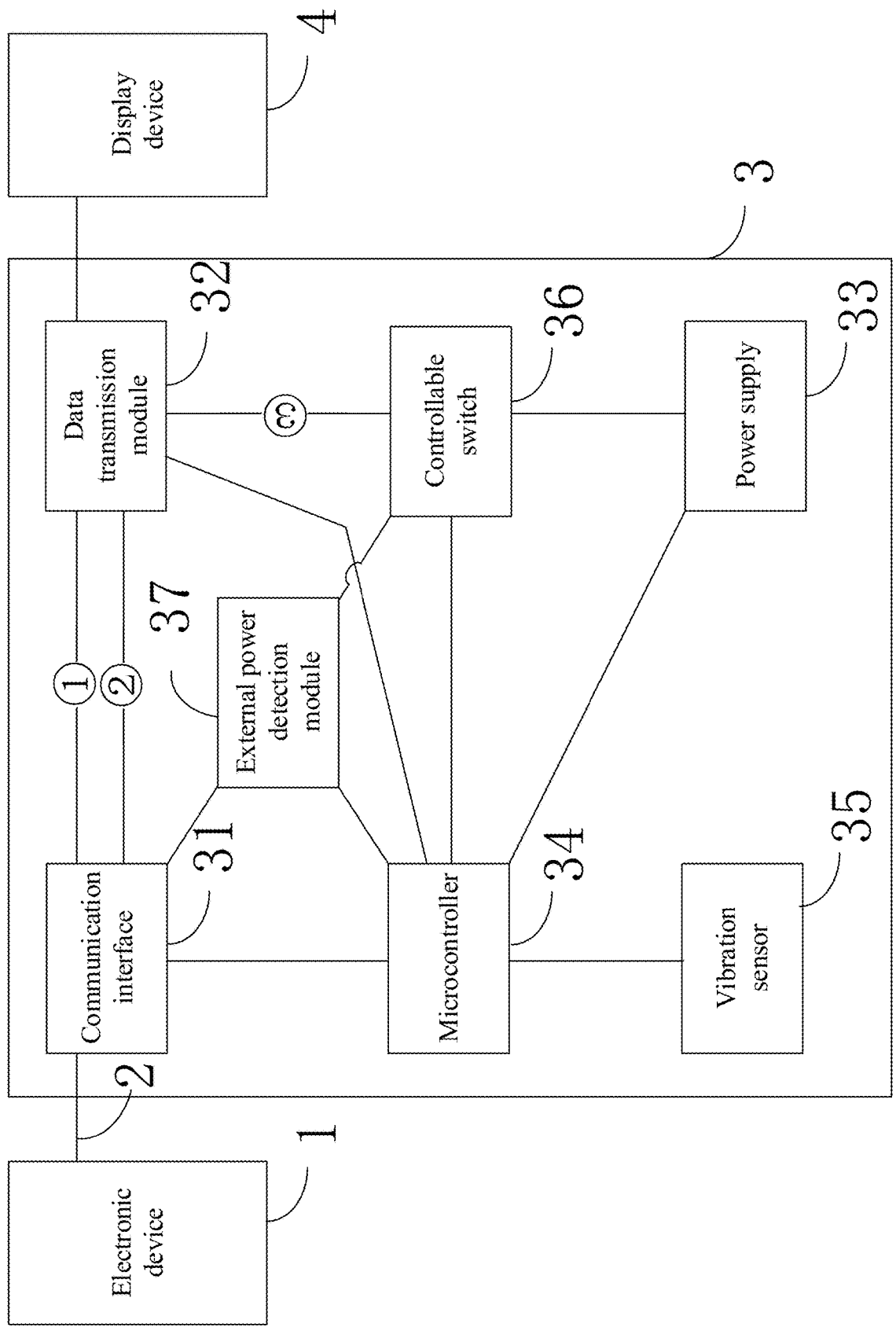
FIG. 24 is a schematic diagram of an application scenario framework of an embodiment of a data transmission device provided by this application.

In one implementation, the external power detection module 37 can only connect to one of the microcontroller 34 and the data transmission module 32, and at the same time, there is a communication connection between the microcontroller 34 and the data transmission module 32 (for example, through I2C, UART (Universal Asynchronous Receiver/Transmitter) or GPIO (General-purpose input/output, general-purpose input and output) and other connection methods). For example, FIG. 23 is a schematic diagram of an application scenario framework of an embodiment of a data transmission device provided by this application, and the external power detection module 37 connects to the communication interface 31 and the data transmission module 32, and the data transmission module 32 can determine whether the communication interface 31 is connected to an external power supply according to the instruction signal of the power detection module 37. For example, the data transmission module 32 determines whether the communication interface is connected to the external power supply VBUS according to the USB_DET pin as shown in FIG. 21, and transmits the determination result to the microcontroller 34. FIG. 24 is a schematic diagram of an application scenario framework of an embodiment of a data transmission device provided by this application, and the provided external power detection module 37 connects to the communication interface 31 and the microcontroller 34. The microcontroller 34 can determine whether the communication interface 31 is connected to an external power supply according to the instruction signal of the external power detection module 37. For example, the microcontroller 34 determines whether the communication interface is connected to the external power supply VBUS according to the MCU_DET pin as shown in FIG. 21, and transmits the determination result to the data transmission module 32.

Figure 25:
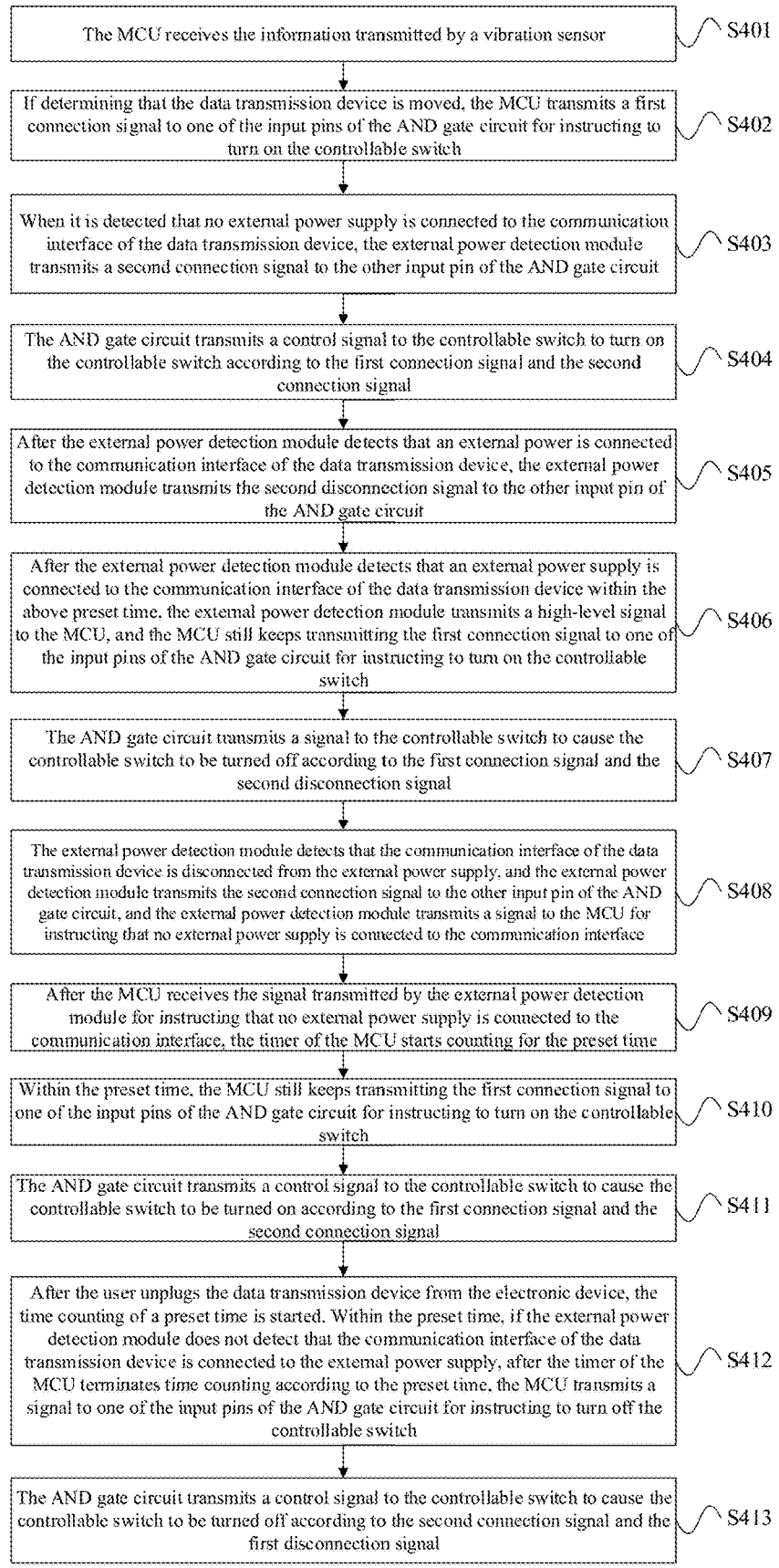
FIG. 25 is a schematic diagram of the flowchart of a data transmission method provided by an embodiment of this application.

This application provides another embodiment. FIG. 25 is a schematic diagram of the flowchart of a data transmission method provided by an embodiment of this application. Concretely, based on the embodiments of FIGS. 4, 7, 15, 16, and 21, this application provides a data transmission method, and the data transmission method shown in FIG. 25 includes:

Step S401: The MCU receives the information transmitted by a sensor.

The information transmitted by the sensor can be the detection data or the interrupt signal. The MCU can also be called a microcontroller, a micro-controlling unit, etc.

In the embodiment, the detection data transmitted by the vibration sensor 35 to the MCU is taken as an example. The detection data carries the acceleration value of the vibration sensor 35 itself. An acceleration threshold is pre-stored in the MCU, and the MCU determines whether the data transmission device 3 is moved according to the comparison result of the acceleration value in the detection data and the pre-stored acceleration threshold value.

In the embodiment, the vibration sensor 35 can be an acceleration sensor. The acceleration sensor detects the motion state of the data transmission device 3 in real time, and generates acceleration data in six directions (for example, the acceleration data detected in an embodiment is 0 mg, 200 mg, 100 mg, 150 mg, 0 mg, 400 mg). The MCU can acquire the detection data detected in real time by the vibration sensor 35 through communication with the vibration sensor 35 at intervals. Or, the vibration sensor 35 can transmit the detection data detected in real time to the MCU at intervals.

Optionally, the power supply 33 built in the data transmission device 3 provided in the embodiment can also be used to supply power to the MCU. In an embodiment, the MCU can set in two power consumption working states, namely the first power consumption working state and the second power consumption working state. Before the MCU receives the detection data or an interrupt signal, the MCU is in the first power consumption working state under the power of the built-in power supply 33 of the data transmission device 3. After the MCU receives the detection data (its acceleration value exceeds the preset acceleration threshold) or the interrupt signal, the MCU is in the second power consumption working state. The power consumption of the MCU in the first power consumption working state can be set to be lower than that in the second power consumption working state, and concretely, the first power consumption working state can be a low power consumption working state, and the second power consumption working state can be a high power consumption working state. A device with a low power consumption working state can be selected as the MCU. When the MCU is in the standby state, the MCU can be maintained in a low power consumption state, and its working current can be limited to uA level, so as to minimize the power consumption of the MCU to the power supply 33 when the data transmission device 3 is not connected to the electronic device 1.

Step S402: If determining that the data transmission device 3 is moved, the MCU transmits a first connection signal to one of the input pins of the AND gate circuit D36 for instructing to turn on the controllable switch 36.

Concretely, the MCU determines whether the acceleration value of the vibration sensor 35 itself received from the vibration sensor 35 exceeds the acceleration threshold. If so, it means that the data transmission device 3 has been moved. If not, it means that the data transmission device 3 has not been moved and is in a static state. For example, the MCU presets an acceleration threshold of 350 mg, if the acceleration values in the six directions obtained by the MCU are (0 mg, 200 mg, 100 mg, 150 mg, 0 mg, 400 mg), it means that the data transmission device 3 has been moved, and the STM32_1108_IO pin of the MCU transmits the first connection signal to one of the input pins of the AND gate circuit D36 (the cathode of the lower diode of the AND gate circuit D36 shown in FIG. 15).

In the embodiment, the first connection signal is used for instructing to turn on the controllable switch 36, and the first connection signal can be a low-level signal. Concretely, the first connection signal used for instructing to turn on the controllable switch 36 is a low-level signal output by the STM32_1108_IO pin of the MCU. It should be noted that the signal output by the MCU is a low-level signal, and after reverse processing by the BJT QM2, the pins of the AND gate circuit D36 is a high-level MCU_CL signal. Whether the first connection signal is a high-level signal or a low-level signal can be set according to the actual situation of the circuit. For example, in other embodiments, the signal output by the MCU for instructing to turn on the controllable switch 36 can directly control one of the pins of the AND gate circuit D36.

In other embodiments, if the MCU receives the interrupt signal transmitted by the vibration sensor 35, the MCU determines that the data transmission device 3 is moved.

After the MCU determines that the data transmission device 3 is moved, the timer of the MCU starts counting for a preset time (for example, 60 seconds).

Step S403: When it is detected that no external power supply is connected to the communication interface 31 of the data transmission device 3, the external power detection module 37 transmits a second connection signal to the other input pin of the AND gate circuit D36.

With reference to the drawings, the second connection signal is used for instructing to turn on the controllable switch 36. The second connection signal can be a high-level signal. Concretely, the external power detection module 37 is connected to another pin (the cathode of the upper diode of the AND gate circuit D36 shown in FIG. 15) of the AND gate circuit D36. The external power detection module 37 is used to detect whether an external power supply is connected to the communication interface 31. If the external power detection module 37 does not detect the connection of an external power supply, the external power detection module 37 transmits a high-level signal to the input pin of the AND gate circuit D36 for instructing to turn on the controllable switch 36. Concretely, the external power detection module 37 transmits the high-level VBS_CL signal to the cathode of the upper diode of the AND gate circuit D36 for instructing to turn on the controllable switch 36.

Step S404: The AND gate circuit D36 transmits a control signal to the controllable switch 36 to turn on the controllable switch 36 according to the first connection signal and the second connection signal, so that the power connection between the power supply 33 and the data transmission module 32 of the data transmission device 3 is connected.

Concretely, as shown in FIG. 15, the second connection signal and the first connection signal of the two input pins of the AND gate circuit D36 are the VBS_CL signal and the MCU_CL signal, respectively. The VBS_CL signal is a high-level signal, and the MCU_CL signal is a high-level signal, and the two diodes of the AND gate circuit D36 are both cut off. The high-level signal of the internal power supply VBAT causes the BJT QM3 to be turned on through the resistors RM8 and RM11, and the signal finally input as the signal of the gate G of the field effect transistor Q4 of the controllable switch 36 is a low-level signal (the gate G is grounded through the resistor RM9 and the BJT QM3), the field effect transistor Q4 is turned on, the connection between the source S and the drain D is connected, and the internal power supply (power supply 33) supplies power to the data transmission module 32 through the field effect transistor Q4.

The built-in power supply 33 of the data transmission device 3 supplies power to the data transmission module 32, and the data transmission module 32 starts and performs related communication configuration, for example, the communication configuration of the data transmission module 32 for communication with the communication interface, and/or the communication configuration of the data transmission module 32 for data communication with the display device 4. For example, in a Wi-Fi communication environment, the data transmission module 32 can be a Wi-Fi module, and the data transmission module 32 can complete the establishment of a communication link with the Wi-Fi module of the display device 4, and the Wi-Fi module of the display device 4 can also be an external device. When the display device 4 includes a built-in Wi-Fi module, a communication link with the display device can be established by directly establishing a communication link with the display device 4. When the display device 4 communicates through an external Wi-Fi module, a communication link can be established with the external Wi-Fi module first, and the external Wi-Fi module establishes the communication link when the display device 4 is in the working state.

Since the data transmission module 32 has completed the establishment of the communication link with the display device 4 before the data transmission device 3 is connected to the electronic device 1, when the data transmission device 3 is connected to the electronic device 1, the data to be transmitted by the electronic device 1 is directly processed by the data transmission device 3 and transmitted to the display device 4 for display, avoiding the configuration of the communication link when the data transmission device 3 is connected to the electronic device 1, which reduces the waiting time when the user uses the data transmission device 3, and realizing Plug-and-Play, thereby improving the response speed and work efficiency of the data transmission device.

Based on the steps S401-S404 of the embodiment, a possible application scenario is further provided where the user picks up or moves the data transmission device 3, and prepares to plug the communication interface 31 of the data transmission device 3 into the communication interface of the electronic device 1, such as a USB interface or a Type-C interface of the electronic device 1, which is not limited to the communication interface of the electronic device 1 in the embodiment of this application. It should be noted that the USB interface or the Type-C interface of the electronic device 1 may generally provide a power pin to provide power supply to the electronic device plugged thereto.

Step S405: After the external power detection module 37 detects that an external power is connected to the communication interface 31 of the data transmission device 3, the external power detection module 37 transmits the second disconnection signal to the other input pin of the AND gate circuit D36 for instructing to turn off the controllable switch 36.

Concretely, the second disconnection signal can be a low-level signal. With reference to the drawings, the external power detection module 37 transmits a low-level VBS_CL signal to the cathode of the upper diode of the AND gate circuit D36 for instructing to turn off the controllable switch 36.

Step S406: After the external power detection module 37 detects that an external power supply is connected to the communication interface 31 of the data transmission device 3 within the above preset time, the external power detection module 37 transmits a signal to the MCU for instructing that the external power supply has been connected. The MCU still keeps transmitting the first connection signal to one of the input pins of the AND gate circuit D36 for instructing to turn on the controllable switch 36. It is understandable that, at this time, the MCU still continues transmitting the first connection signal to one of the input pins of the AND gate circuit D36 for instructing to turn on the controllable switch 36.

It should be noted that the above-mentioned preset time is the preset time that the timer of the MCU starts time counting after the MCU determines that the data transmission device 3 is moved. Concretely, as shown in FIG. 21, when an external power supply is connected to the communication interface 31, the VBUS is at a high level, and at this time, the transmission from the external power detection module 37 to the MCU_DET pin of the MCU is also at a high level. This high-level signal can be regarded as the instruction signal for instructing that the external power supply is connected to the communication interface 31, so that the MCU can determine that the communication interface 31 is connected to the external power supply according to the high-level instruction signal. When the communication interface 31 is not connected to the external power supply, the VBUS is at a low level, and at this time, the transmission from the external power detection module 37 to MCU_DET pin of the MCU is also at low level (MCU_DET pin is grounded through the resistors R101 and R84). This low-level signal can be regarded as an instruction signal for instructing that no external power supply is connected to the communication interface, so that the MCU can determine that the communication interface 31 is not connected to an external power supply according to the low-level instruction signal.

In the above preset time, the MCU determines that an external power supply is connected to the communication interface 31 according to the high-level signal transmitted by the external power detection module 37, and the MCU terminates the time counting of the preset time. At the same time, the MCU still continues transmitting the signal to one of the input pins of the AND gate circuit D36 for instructing to turn on the controllable switch 36, and at this time the MCU_CL signal is still a high-level signal.

Step S407: The AND gate circuit D36 transmits a control signal to the controllable switch 36 according to the first connection signal and the second disconnection signal, so that the controllable switch 36 is turned off.

Concretely, as shown in FIG. 15, the second disconnection signal and the first connection signal of the two input pins of the AND gate circuit D36 are the VBS_CL signal and the MCU_CL signal, respectively. The VBS_CL signal is a low-level signal, and the MCU_CL signal is still a high-level signal. The upper diode of the AND gate circuit D36 is turned on and the lower diode thereof is cut off. The AND gate circuit D36 outputs a low-level signal. The low-level signal controls the BJT QM3 to be cut off through the resistor RM11, and the internal power supply VBAT makes the signal of the gate G of the field effect transistor Q4 to be a high-level signal through the resistors RM7 and RM9, and the field effect transistor Q4 is turned off, and the connection between the source S and the drain D is broken off.

Since the field effect transistor Q4 as the controllable switch 36 is turned off, the power supply of the electronic device 1 cannot directly charge the battery 332 through the path of "communication interface 31-controllable switch 36-battery 332," which can avoid the damage to the battery 332.

Based on steps S405-S407 of the embodiment, a possible application scenario is further provided where, within a preset time (for example, 60 seconds) after the MCU determines that the data transmission device 3 is moved, the user connects the data transmission device 3 to the electronic device 1.

Step S408: The external power detection module 37 detects that the communication interface 31 of the data transmission device 3 is disconnected from the external power supply, and the external power detection module 37 transmits the second connection signal to the other input pin of the AND gate circuit D36 for instructing to turn on the controllable switch 36. The external power detection module 37 transmits the signal to the MCU for instructing that no external power supply is connected to the communication interface 31, and the signal can be a low-level signal.

In the above step S408, a possible application scenario is that, after the user connects the data transmission device 3 to the electronic device 1, the user unplugs the data transmission device 3 from the electronic device 1.

Step S409: After the MCU receives the signal transmitted by the external power detection module 37 for instructing that no external power supply is connected to the communication interface 31, the timer of the MCU starts time counting according to the preset time (for example, 60 seconds).

In the embodiment, in order to meet the needs of using the same data transmission device 3 in turn between users for data transmission, and to ensure that the next user can also realize the "Plug and Play" of the data transmission device 3, the MCU needs to be set accordingly. Concretely, a preset time (for example, 60 seconds) can be stored in the MCU. The preset time can be 60 seconds in the embodiment, and can be other times, such as 50 seconds in other embodiments, and the time can be set according to concrete application scenarios.

Step S410: Within the preset time, the MCU still continues transmitting the first connection signal to one of the input pins of the AND gate circuit D36 for instructing to turn on the controllable switch 36.

Concretely, as shown in FIG. 15, the STM32_1108_IO pin of the MCU transmits a low-level signal to one of the input pins (the cathode of the lower diode of the AND gate circuit D36) of the AND gate circuit D36, which causes the BJT QM2 to be turned off, thereby obtaining a high-level MCU_CL signal (the cathode of the lower diode of the AND gate circuit D36 is connected to the high-level+3V3_SB provided by the internal power supply through a resistor RM6).

Step S411: The AND gate circuit D36 transmits a control signal to the controllable switch 36 to cause the controllable switch 36 to be turned on according to the first connection signal and the second connection signal.

Concretely, after the controllable switch 36 is turned on, the internal power supply of the data transmission device 3 supplies power to the data transmission module 32, so that the communication link between the data transmission module 32 and the display device 4 continues being in a connected state, ensuring that even after the data transmission device 3 is unplugged from the electronic device 1, within the preset time, when the user unplugs the data transmission device 3 from the electronic device 1 and then plugs it to the next electronic device within the preset time, the data of the electronic device can also be transmitted quickly, so that the "Plug and Play" of the data transmission device 3 in the data transmission process with alternate switching of multiple electronic devices is realized.

In the above steps S410-S411, a possible application scenario is that, after the user unplugs the data transmission device 3 from the electronic device 1, the data transmission device 3 is plugged to the next electronic device 1 within the preset time (the data transmission device 3 may be unplugged from the electronic device 1, and also be unplugged from another electronic device). During this switching period, the communication link between the data transmission module 32 and the display device 4 continues being in a connected state.

Further, in some embodiments, after this step S411, the routine can return to the loop after step S404 to detect whether an external power supply is connected within a preset time.

Concretely, when the external power detection module 37 detects that the communication interface 31 of the data transmission device 3 is connected to the external power supply within the preset time range of the timer, the external power detection module 37 transmits a low-level signal to the AND gate circuit D36. The AND gate circuit D36 transmits a signal to the controllable switch 36 for causing the controllable switch 36 to be turned off according to this low-level signal and the high-level signal transmitted by the MCU.

Step S412: After the user unplugs the data transmission device 3 from the electronic device 1, the time counting of a preset time is started. Within the preset time, if the external power detection module 37 does not detect that the communication interface 31 of the data transmission device 3 is connected to the external power supply, after the timer of the MCU terminates time counting according to the preset time, the MCU transmits a first disconnection signal to one of the input pins of the AND gate circuit D36 for instructing to turn off the controllable switch 36.

In the embodiment, the first disconnection signal received by the AND gate circuit D36 can be a low-level signal. Concretely, as shown in FIG. 15, the STM32_1108_IO pin of the MCU transmits a high-level signal to one (the cathode of the lower diode of the AND gate circuit D36) of the input pins of the AND gate circuit D36, which causes the BJT QM2 to be turned on, thereby obtaining a low-level MCU_CL signal (the cathode of the lower diode of the AND gate circuit D36 is grounded through the BJT QM2).

Step S413: The AND gate circuit D36 transmits a control signal to the controllable switch 36 for causing the controllable switch 36 to be turned off according to the second connection signal and the first disconnection signal.

Concretely, as shown in FIG. 15, the second connection signal and the first disconnection signal of the two input pins of the AND gate circuit D36 are the VBS_CL signal and the MCU_CL signal, respectively. The VBS_CL signal is a high-level signal, and the MCU_CL signal is a low-level signal. The lower diode of the AND gate circuit D36 is turned on and the upper diode thereof is cut off, so the AND gate circuit D36 outputs a low-level signal. The low-level signal controls the BJT QM3 to be cut off through the resistor RM11. The internal power supply VBAT makes the signal of the gate G of the field effect transistor Q4 to be a high-level signal through the resistors RM7 and RM9. Thus the field effect transistor Q4 is turned off, the connection between the source S and the drain D is broken off, and the power connection between the internal power supply of the data transmission device 3 and the data transmission module 32 is disconnected.

In the above steps S412-S413, a possible application scenario is that, after the user unplugs the data transmission device 3 from the electronic device 1, it is not plugged to the next electronic device 1 within the preset time (the user may complete data transmission and no longer needs to use the data transmission device 3). In this scenario, it can be considered that if the data transmission device 3 is not connected to any external power supply within the preset time, the user has completed the data transmission requirements this time. Then, the internal supplying of power is stopped, so as to save the electric power of the internal power supply of the data transmission device 3.

Optionally, in the above steps S401-S413, the MCU can be in the second power consumption working state under the power of the power supply of the data transmission device 3. Therefore, it can be understood that before S401, if the MCU does not receive the detection data or the interrupt signal, the MCU is maintained in the first power consumption working state. After the MCU receives the detection data or the interrupt signal in S401, the MCU is switched to the second power consumption working state. Further, the first power consumption working state can be a low power consumption working state, and the second power consumption working state can be a high power consumption working state.

In addition, in the embodiments of this application as shown in FIGS. 4-25, the power supply 33 provided by the data transmission device 3 being arranged inside the data transmission device 3 is taken as an example. In another possible implementation, the data transmission device 3 described in each embodiment of this application can also be powered by the manner of an external power supply. An external power supply supplies power to the data transmission device 3 when the electronic device 1 is not connected.

Figure 26:
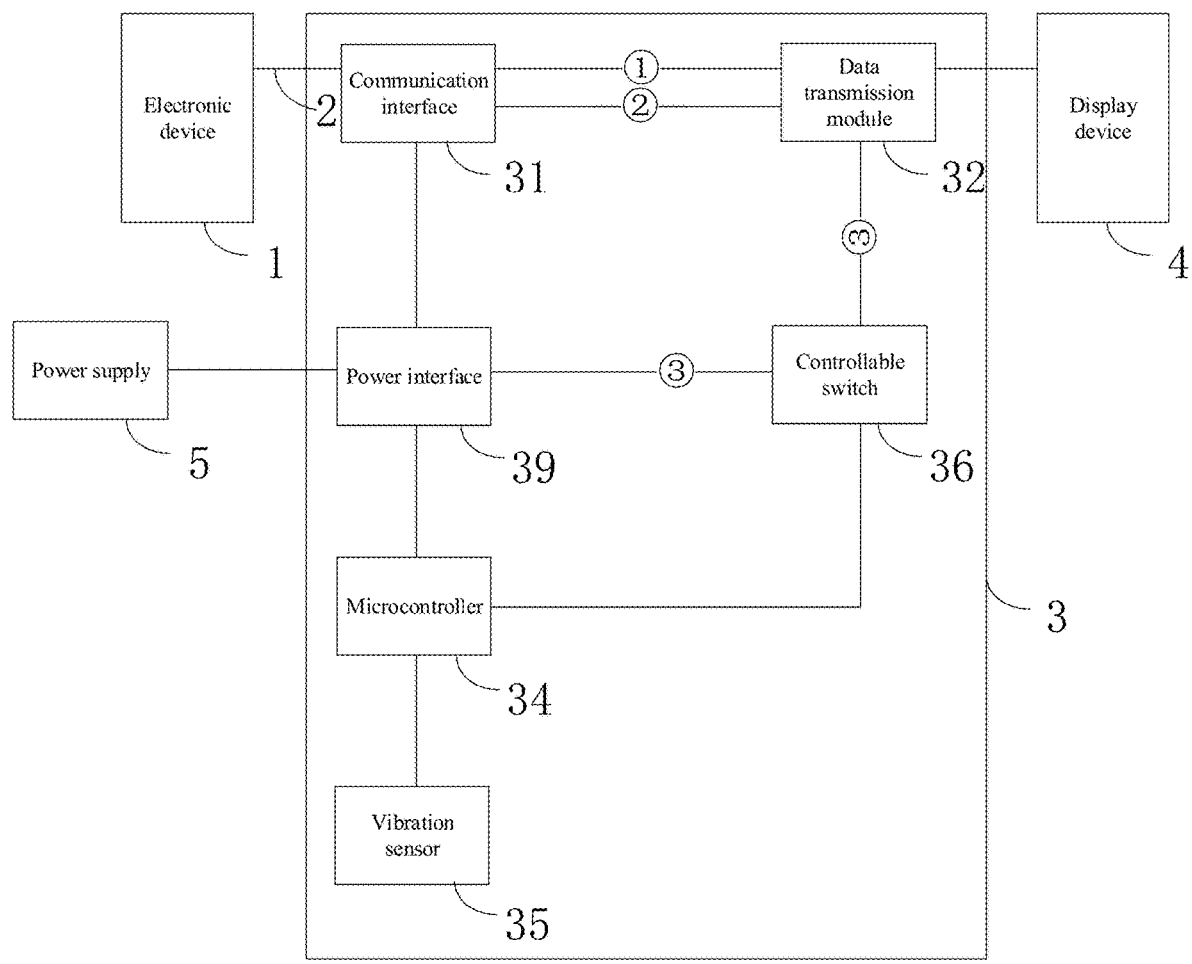
FIG. 26 is a schematic diagram of an application scenario framework of a data transmission device provided by an embodiment of this application.

For example, FIG. 26 is a schematic diagram of an application scenario framework of a data transmission device provided by an embodiment of this application, and the data transmission device 3 is provided with a power interface 39. When the user uses the data transmission device 3, after the power interface 39 is connected to the external power supply 5, the external power supply 5 can supply power to the data transmission device 3. At this time, the power supply function realized by the power supply 5 through the power interface 39 is the same as that implemented by the power supply 33 in each embodiment of this application as shown in FIGS. 4-25, which will not be repeated herein.

The data transmission method of the embodiments can be executed by an integrated circuit such as an MCU or SoC. The integrated circuit such as an MCU or SoC includes one or more processors, memories, and programs, and the programs are stored in the memory and are configured to be executed by the one or more processors, and the programs are configured to execute the data transmission method of the embodiments.

Those skilled in the art can understand that all or part of the steps in the above-mentioned method embodiments can be implemented through software, for example, a coded program. The program can be stored in a readable storage medium of the data transmission device. When the data transmission device performs the program, the data transmission device executes the steps including the data transmission method in each embodiment of this application, and the above-mentioned storage medium includes ROM, RAM, magnetic disk, optical disk, and other mediums which can store program codes.

Figure 27:
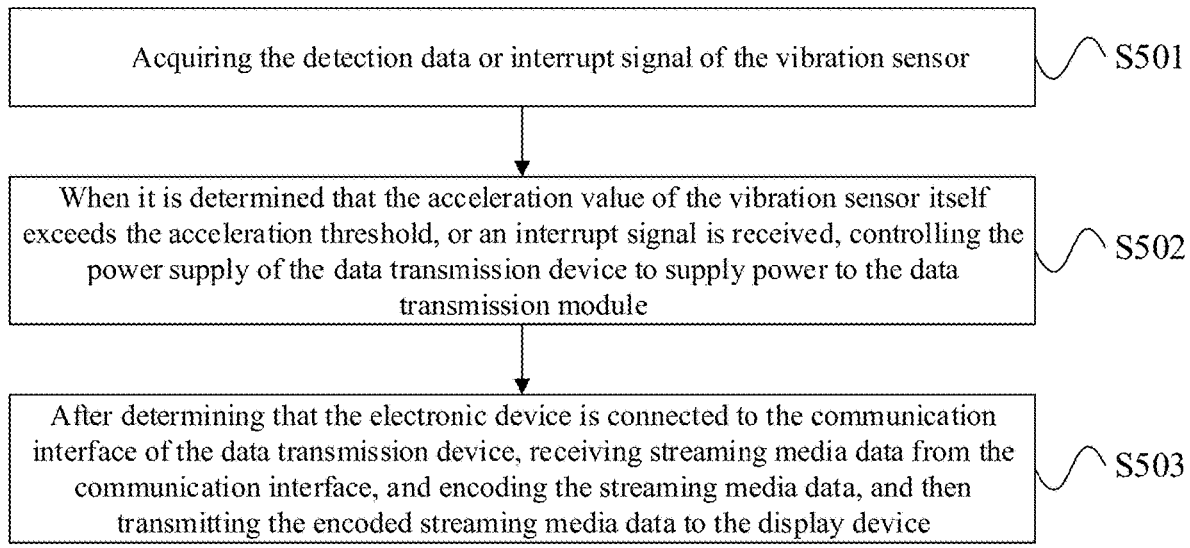
FIG. 27 is a schematic diagram of the flowchart of an embodiment of a data transmission method provided by this application.

For example, FIG. 27 is a schematic diagram of the flowchart of an embodiment of a data transmission method provided by this application. In the embodiment as shown in FIG. 27, a schematic diagram of a data transmission method provided in this application implemented by a data transmission device through software is shown, which can be applied to the scenario as shown in FIG. 1, the execution subject can be a data transmission device, or more concretely a processor in a data transmission device, such as a CPU, GPU, SoC and MCU in the data transmission device. Hereinafter, taking an example that the execution subject is the data transmission device, the data transmission method will be described. Concretely, the data transmission method shown in FIG. 27 includes:

S501: Receiving the detection data or the interrupt signal of the vibration sensor.

S502: When it is determined that the acceleration value of the vibration sensor itself exceeds the acceleration threshold, or when the interrupt signal is received, controlling the power supply of the data transmission device to supply power to the data transmission module.

Concretely, the method provided in the embodiment can be applied to the data transmission device. The data transmission device is provided with a vibration sensor, a power supply, and a data transmission module. The power supply can be used to supply power to the data transmission module, and the data transmission module can be used for data communication with display device.

In a concrete implementation, the vibration sensor provided in the data transmission device is used to generate detection data according to the movement of the data transmission device, and the detection data includes the acceleration value of the vibration sensor itself. After the data transmission device receives the detection data obtained by the vibration sensor in S501, the data transmission device can determine in S502 that when the acceleration value of the vibration sensor itself in the detection data exceeds the preset acceleration threshold, the power supply of the data transmission device is controlled to supply power to the data transmission module.

In another concrete implementation, the vibration sensor transmits an interrupt signal when its own acceleration value in the generated detection data exceeds a preset acceleration threshold, and then after the data transmission device receives an interrupt signal transmitted by the vibration sensor in S501, the power supply of the data transmission device can be controlled in S502 to supply power to the data transmission module according to the interrupt signal.

Therefore, the data transmission method provided in the embodiment causes that, after the data transmission device detects the movement of the data transmission device according to the vibration sensor, the data transmission device can control the power supply of the data transmission device to supply power to the data transmission module, so that when the data transmission device is not used, the power supply may not supply power to the data transmission module, and after the user moves the data transmission device, the power supply can be controlled to supply power to the data transmission module. Therefore, the data transmission device implementing the method of the embodiment can take care of both space and efficiency, and in the case where the power supply in the data transmission device does not require excessively large capacity and volume, the response speed and work efficiency of the data transmission device during data transmission can also be improved.

Optionally, after S502, the method further includes S503 in which, after determining that the electronic device is connected to the communication interface of the data transmission device, streaming media data is received from the communication interface, the streaming media data is encoded, and then the encoded streaming media data is transmitted to the display device.

Thereinto, when the data transmission module is powered by the power supply and completes the related configuration of startup, the data transmission module can start to receive the streaming media data corresponding to the display interface of the electronic device transmitted from the communication interface, encode the streaming media data, and transmit the streaming media data to the display device, thereby improving the response speed of the data transmission device to the streaming media data transmitted by the electronic device connected by the user through the communication interface, which brings a user experience of "Plug and Play" and improves the work efficiency of the data transmission module.

More concretely, in S502, while the data transmission device determines that the acceleration value of the vibration sensor itself exceeds the preset acceleration threshold or the interrupt signal is received, the data transmission device also needs to determine that no external power supply is connected to the communication interface. In such a case, the data transmission device can control the power supply of the data transmission device to supply power to the data transmission module. After S502, when the data transmission device determines that an external power supply is connected to the communication interface, the data transmission device can control the power supply to stop supplying power to the data transmission module. In other words, the data transmission device can control the power supply to supply power to the data transmission module only when no external power supply is connected. When the communication interface is connected to the external power supply of other electronic devices, the power supply cannot continue supplying power to the data transmission module, thereby reducing power loss.

Optionally, within the first preset time after the data transmission device executes S502, if no external power supply is connected to the communication interface all the time, the data transmission device can control the power supply to stop supplying power to the data transmission module after the first preset time. Concretely, the purpose of setting the first preset time for the data transmission device is to ensure that the movement caused by accidentally touching the data transmission device by a non-user will not cause that the power supply 33 continuously supplies power to the data transmission module 32, which reduces the power loss.

Optionally, after the data transmission device executes S502, and after the data transmission device determines that the external power supply is connected to the communication interface and then is disconnected from the communication interface, within the second preset time after the disconnection, if no external power supply is connected to the communication interface, the data transmission device keeps controlling the power supply to supply power to the data transmission module within the second preset time. Correspondingly, if no external power supply is connected to the communication interface within the second preset time, the data transmission device controls the power supply to stop supplying power to the data transmission module after the second preset time. If no external power supply is connected to the communication interface, the data transmission device keeps controlling the power supply to supply power to the data transmission module with the second preset time, so that when the user switches the data transmission device from one electronic device to another, the data transmission module can be maintained in the working state during the switching process, and will not be powered off immediately due to the loss of external power after the data transmission device is unplugged. Thus, data transmission can be carried out quickly when the data transmission device is unplugged by the user from one electronic device and plugged to the next electronic device, and the work efficiency is improved.

Optionally, in the embodiment, while transmitting the encoded streaming media data to the display device, the data transmission device also transmits a data transmission instruction to the display device. The data transmission instruction can be used to instruct the display device to process and display the encoded streaming media data received. Correspondingly, the data transmission device can also transmit a stop transmission instruction to the display device for instructing the display device not to continue displaying the encoded streaming media data received.

In one scenario, after receiving a start instruction input by the user, the data transmission device can transmit the encoded streaming media data and data transmission instruction to the display device. Or, after receiving a stop instruction input by the user, the data transmission device can stop transmitting the encoded streaming media data to the display device, and transmit a stop transmission instruction to the display device. In another scenario, when the data transmission device detects that the external power supply is disconnected from the communication interface, the data transmission device stops transmitting the encoded streaming media data to the display device, and transmits a stop transmission instruction to the display device.

Concretely, according to the data transmission method of the embodiment, after the data transmission device detects that the external power supply is disconnected from the communication interface according to the user's stop instruction or according to the external power detection module, the data transmission module immediately stops transmitting the screen transmission instruction to the display device, so that the display device will not continue displaying the display interface of the electronic device, thereby improving the response speed of the data transmission device to the user's disconnection instructions and actions, and improving the response speed and screen projection efficiency of the data transmission device, which protects the privacy of the user to a certain extent, so that mistaken projection of private information on the screen by the user can be stopped in time, thereby improving the user experience of the data transmission device.

Figure 28:
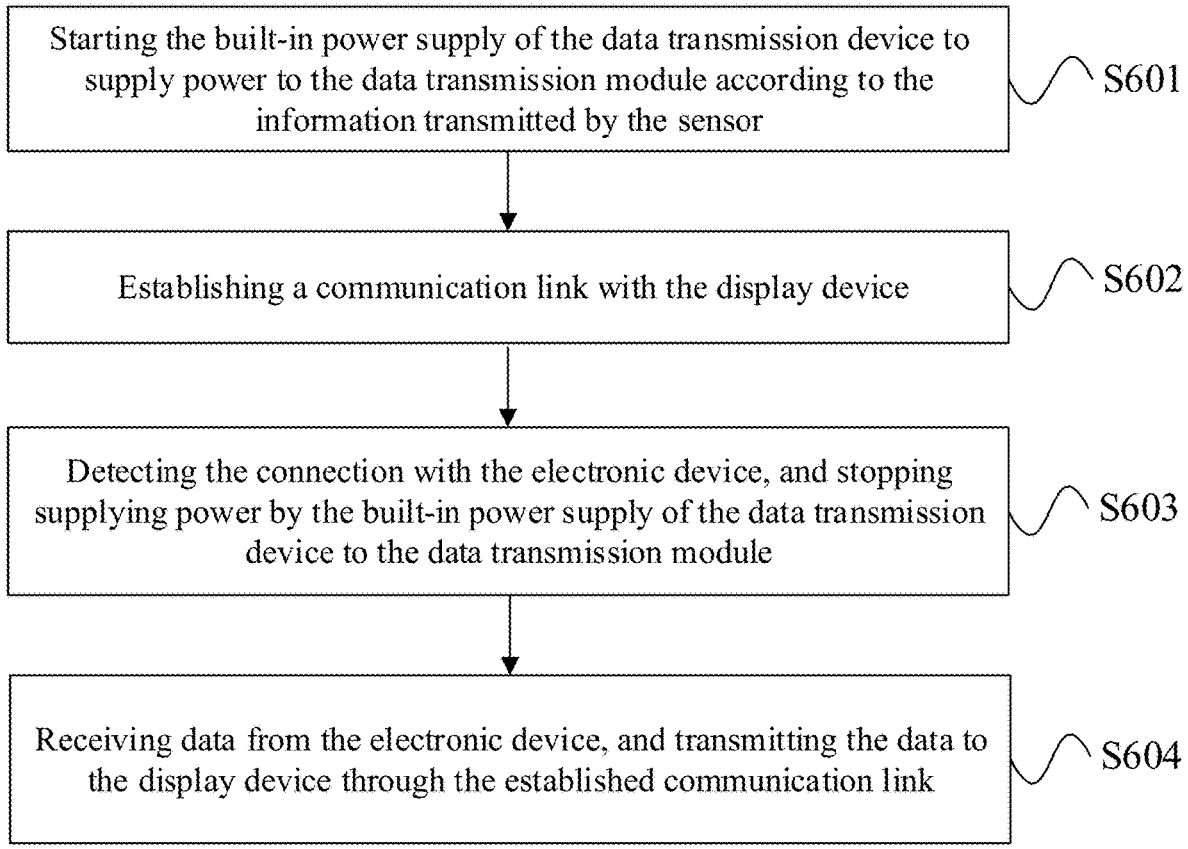
FIG. 28 is a schematic diagram of the flowchart of an embodiment of a data transmission method provided by this application.

For another example, FIG. 28 is a schematic diagram of the flowchart of an embodiment of a data transmission method provided by this application. In the embodiment shown in FIG. 28, a schematic diagram of a data transmission method provided in this application implemented by a data transmission device through software is shown, which can be applied to the scenario shown in FIG. 1, and the execution subject can be a data transmission device or a processor in a data transmission device. Concretely, the data transmission method shown in FIG. 28 includes:

S601: Starting the built-in power supply of the data transmission device to supply power to the data transmission module according to the information transmitted by the sensor.

Concretely, the method provided in the embodiment can be applied to a data transmission device, and a sensor is provided in the data transmission device, and the sensor is used to detect whether the data transmission device is moved. The sensor may be a vibration detector. When the sensor detects that the data transmission device is moved (for example, the vibration detector detects that the acceleration of the data transmission device exceeds the preset acceleration threshold), and the user may be about to use the data transmission device for data transmission, the sensor can transmit information. After the data transmission device receives the information transmitted by the sensor, the data transmission device starts the built-in power supply arranged in the data transmission device to supply power to the data transmission module.

S602: Establishing a communication link with the display device.

Concretely, in S601, after the built-in power supply supplies power to the data transmission module, the data transmission module can perform related configuration for startup, and establish the communication link between the data transmission module and the display device, and the related configuration includes at least the communication configuration for communication between the data transmission module and the display device. Furthermore, after the data transmission device is connected to the electronic device and the communication link is established, the data transmission device receives the data from the electronic device, encodes the data, and transmits the encoded data through the established communication link to the display device. Optionally, the data transmission module can be a Wi-Fi module, and the communication link can be a Wi-Fi communication link.

S603: Detecting the connection with the electronic device, and stopping supplying power by the built-in power supply of the data transmission device to the data transmission module.

Concretely, when the data transmission device detects that the data transmission device is connected to the electronic device, the power supply of the electronic device can supply power to the data transmission device, and the internal power supply of the data transmission device can be controlled to stop supplying power to the data transmission module, to prevent the power supply of the electronic device from directly charging the power supply inside the data transmission device.

S604: Receiving data from the electronic device, and transmitting the data to the display device through the established communication link.

In some embodiments, after detecting the connection with the electronic device, the data transmission device can receive the data corresponding to the display interface of the electronic device transmitted from the electronic device, encode the data, and transmit the encoded data to the display device through the established communication link. Optionally, after detecting the connection with the electronic device, the data transmission device can perform S603 and S604 at the same time, or perform S603 and S604 in an order, which is not limited.

Further, in some embodiments, after S604 shown in FIG. 28, when it is detected that the data transmission device is disconnected from the electronic device, the data transmission device starts the built-in power supply to supply power to the data transmission module, and at the same time, maintains the established communication link between the data transmission device and the display device. And within the preset time, if it is detected that no electronic device is connected to the data transmission device, the built-in power supply of the data transmission device stops continuing supplying power to the data transmission module after the preset time. After the data transmission module is powered off, the communication link established between the data transmission device and the display device will also be disconnected. Therefore, in the embodiment, when a user switches a data transmission device from one electronic device to another electronic device, the data transmission device can be switched to the built-in power supply in time during the switching process, so that it is possible to realize the seamless switching of the data transmission device from the external power supply to the built-in power supply, which maintains the data transmission device in the working state and maintains the established communication link. The data transmission device will not be powered off immediately due to the loss of external power after the data transmission device is unplugged, so that data transmission can be carried out quickly when the data transmission device is unplugged by the user from one electronic device and plugged to the next electronic device, thereby realizing the "Plug and Play" of the data transmission device during the alternate switching data transmission with multiple electronic devices, and improving the work efficiency.

In another embodiment, after S604 shown in FIG. 28, since the data transmission device loses the power supply of the electronic device, when the data transmission device detects that the data transmission device is disconnected from the connected electronic device, the data transmission device is powered off, and the communication link between the data transmission device and the display device is disconnected. Then, the data transmission device starts the built-in power supply of the data transmission device to supply power to the data transmission module. After receiving power from the built-in power supply of the data transmission device, the data transmission module performs again the communication configuration between the data transmission device and the display device, and re-establishes the communication link between the data transmission device and the display device. Since the data transmission device starts to perform the communication configuration with the display device before being plugged into the next electronic device, the data transmission device can quickly transmit data when being inserted into the next electronic device, thereby reducing or even eliminating the waiting time of the user, realizing "Plug and Play" of the data transmission device during the alternate switching data transmission with multiple electronic devices, and improving the response speed and work efficiency of the data transmission device during data transmission.

A typical embodiment of this application further provides a wireless screen transmission device.

The wireless screen transmission device includes a wireless transmitting unit (which can be implemented by the data transmission module in the above-mentioned embodiment of this application), a vibration sensor, a microcontroller, a switch unit (which can be implemented by the controllable switch in the above-mentioned embodiment of this application), and a power supply unit (which can be implemented by the power supply in the above-mentioned embodiment of this application), and the vibration sensor is used to detect whether the wireless screen transmission device is moved in at least one predetermined direction. The microcontroller is electrically connected to the vibration sensor. The switch unit is electrically connected to the microcontroller, the power supply unit and the wireless transmitting unit respectively. The microcontroller controls the on and off of the switch unit.

In this solution, when the vibration sensor detects the movement of the wireless screen transmission device, the vibration sensor transmits the detected signal to the microcontroller, and the microcontroller controls the switch unit to be turned on, so that the power supply unit supplies power to the wireless transmitting unit. The wireless transmitting unit can start to prepare for transmitting data after being powered on, that is, before being connected to the computer, the wireless transmitting unit is ready to transmit data, which saves the preparation time of data transmission from the computer to the wireless transmitting unit, and further saves the time of transmitting data from the computer to the monitor. Start-up preparation of 3-5 seconds is done before the wireless screen transmission device is connected to the computer, which reduces waiting time for 3-5 seconds between the time when the user plugs the wireless screen transmission device into the computer and the time when the screen transmission performs normally, as compared with the traditional wireless screen transmission device.

In an embodiment of this application, when the vibration sensor does not detect the movement of the wireless screen transmission device, the microcontroller controls the switch unit in the disconnection state, and will not supply power to the wireless transmitting unit. Compared with the prior art of constantly supplying power to all circuit modules, when the wireless screen transmission device does not transmit data, the device does not need to supply power to the wireless transmission unit, thereby saving electric power, which increases the endurance time of the wireless screen transmission device. Furthermore, a battery with a smaller capacity can meet the needs of practical applications, so that the wireless screen transmission device needs a smaller volume, which meets the current demand for small device, thereby facilitating application and carrying.

In an embodiment of this application, the wireless transmitting unit includes a system chip and a wireless transmitting module, and one end of the system chip is electrically connected to the switch unit, and the other end of the system chip is electrically connected to the wireless transmitting module. When the switch unit is turned on, the power supply unit supplies power to the system chip, and the system chip controls the wireless transmitting module to start working, which includes preparing for data transmission and transmitting data.

In an embodiment of this application, the wireless screen transmission device has a shell. The shell has a housing cavity, in which the wireless transmitting unit, the vibration sensor, the microcontroller, the switch unit, and the power supply unit are located. Therefore, the wireless screen transmission device has a simple structure and takes up less space.

In an embodiment of this application, the power supply unit includes a power management circuit (which can be implemented by the power management module in the above-mentioned embodiment of this application) and a battery, and the power management circuit is electrically connected to the microcontroller, the battery, and the switch unit, respectively. The battery supplies power to the microcontroller and the switch unit through the power management circuit. In a concrete implementation of this application, the power management circuit can be a power management chip, and a PMU (power management unit) chip is a highly integrated power management chip for portable applications. The power management chip integrates several types of traditional discrete power management components into a single package, which can achieve higher power conversion efficiency, lower power consumption, and fewer modules to adapt to the reduced board space, and concretely, the power management chip can be the RK805-2 chip, and those skilled in the art can select an appropriate power management chip according to the actual situation.

In an embodiment of this application, the above-mentioned wireless screen transmission device further has a power interface, and the power interface is electrically connected to the power management circuit, and power can be supplied to the wireless screen transmission device through the power interface. Obviously, the battery can also be charged through the power interface.

In an embodiment of this application, the power interface can be a USB interface, a Type-C interface, an HDMI interface, a DP interface, or the like. Since the USB interface is integrated in a general computer, when the USB interface is selected as the power interface, the computer can directly supply power to the wireless screen transmission device. Obviously, if the wireless screen transmission device is not powered by a computer, it can be powered by an external power supply, such as a power bank. The power interface is not limited to the above-mentioned interfaces, and it can be any interface as long as it satisfies that the power interface can supply power to the wireless screen transmission device.

In an embodiment of this application, the battery is a rechargeable battery, specifically a lithium battery. When the wireless screen transmission device is not powered through the power interface, it is possible to supply power by the battery equipped with the wireless screen transmission device itself, so that the power supply mode of the wireless screen transmission device is more flexible, which facilitates carrying the wireless screen transmission device. Moreover, the device does not need to supply power to all circuit modules constantly, that is, only a small-capacity lithium battery needs to be placed in the housing cavity of the device, which is beneficial to the appearance design of the device.

Obviously, the battery of this application is not limited to the lithium battery, and can also be another appropriate battery, and those skilled in the art can select appropriate batteries according to actual situation.

In an embodiment of this application, the vibration sensor can be at least one selected from the group consisting of an accelerometer, a gyroscope, a displacement sensor, a speed sensor, a vibration sensor, etc., which can detect the movement of the wireless screen transmission device. Those skilled in the art can select the appropriate sensor according to the actual situation. In addition, the position of the vibration sensor in the housing cavity of the wireless screen transmission device can be arranged according to the actual situation. Preferably, the vibration sensor can be arranged at a position sensitive to the movement signal of the wireless screen transmission device. This arrangement can reduce the time period for sensing a movement signal of the screen transmission device by the vibration sensor, thereby reducing the time period for the data transmission time of the wireless screen transmission device.

In an embodiment of this application, the switch unit can be a single-pole double-throw switch, a diode, a transistor, a mercury switch and other electronic components that play a switching function. Those skilled in the art can select an appropriate switch unit according to the actual situation. The switch unit can also be implemented through multiple circuit designs. In a concrete implementation of this application, the switch unit is connected to a certain pin of the microcontroller, so that the on and off of the switch unit is controlled by controlling the level of the pin. For example, when the pin is at a high level, the switch unit is turned on, and when the pin is at a low level, the switch unit is turned off. Preferably, an electronic component with a small size is selected as the switch unit, which can save space.

In an embodiment of this application, the wireless screen transmission device further includes a wireless receiving unit, which is used to receive data received by the wireless transmitting unit from the computer. The wireless receiving unit transmits the received data to the display unit through the data transmission interface for display. The data transmission interface can be a video interface for outputting data, such as an HDMI interface, a VGA interface, or a DP interface.

Another typical embodiment of this application provides an electronic system, including any one of the above-mentioned wireless screen transmission devices. In the system, when the vibration sensor detects the movement of the wireless screen transmission device, the vibration sensor transmits the detected signal to the microcontroller, and the microcontroller controls the switch unit to be turned on, so that the power supply unit supplies power to the wireless transmitting unit. The wireless transmitting unit starts to prepare for transmitting data, that is, before the wireless screen transmission device is connected to the computer, the wireless transmitting unit is ready to transmit data, which saves the preparation time of data transmission from the computer to the wireless transmitting unit, and further saves the time of transmitting data from the computer to the monitor. Start-up preparation of 3-5 seconds is done before the wireless screen transmission device is connected to the computer, which reduces the waiting time for 3-5 seconds between the time when the user plugs the wireless screen transmission device into the computer and the time when the screen transmission performs normally, as compared with the traditional wireless screen transmission device. When the vibration sensor does not detect the movement of the wireless screen transmission device, the microcontroller controls the switch unit in the disconnection state, and will not supply power to the wireless transmitting unit. Compared with the prior art of constantly supplying power to all circuit modules, when the wireless screen transmission device does not transmit data, the device does not need to supply power to the wireless transmission unit, thereby saving electric power, which increases the endurance time of the wireless screen transmission device. Furthermore, a battery with a smaller capacity can meet the needs of practical applications, so that the wireless screen transmission device needs a smaller volume, which meets the current demand for small device, thereby facilitating application and carrying.

From the above description, it can be seen that the above-mentioned embodiments of this application achieve the following technical effects:

1. In the wireless screen transmission device of this application, when the vibration sensor detects the movement of the wireless screen transmission device, the vibration sensor transmits the detected signal to the microcontroller, and the microcontroller controls the switch unit to be turned on, so that the power supply unit supplies power to the wireless transmitting unit. The wireless transmitting unit starts to prepare for transmitting data, that is, before the wireless screen transmission device is connected to the computer, the wireless transmitting unit is ready to transmit data, which saves the preparation time of data transmission from the computer to the wireless transmitting unit, and further saves the time of transmitting data from the computer to the monitor. Start-up preparation of 3-5 seconds is done before the wireless screen transmission device is connected to the computer, which reduces the waiting time for 3-5 seconds between the time when the user plugs the wireless screen transmission device into the computer and the time when the screen transmission performs normally, as compared with the traditional wireless screen transmission device.

2. In the system of this application, when the vibration sensor detects the movement of the wireless screen transmission device, the vibration sensor transmits the detected signal to the microcontroller, and the microcontroller controls the switch unit to be turned on, so that the power supply unit supplies power to the wireless transmitting unit. The wireless transmitting unit starts to prepare for transmitting data, that is, before the wireless screen transmission device is connected to the computer, the wireless transmitting unit is ready to transmit data, which saves the preparation time of data transmission from the computer to the wireless transmitting unit, and further saves the time of transmitting data from the computer to the monitor. Start-up preparation of 3-5 seconds is done before the wireless screen transmission device is connected to the computer, which reduces the waiting time of 3-5 seconds between the time when the user plugs the wireless screen transmission device into the computer and the time when the screen transmission performs normally, as compared with the traditional wireless screen transmission device. When the vibration sensor does not detect the movement of the wireless screen transmission device, the microcontroller controls the switch unit in the disconnection state, and will not supply power to the wireless transmitting unit. Compared with the prior art of constantly supplying power to all circuit modules, when the wireless screen transmission device does not transmit data, the device does not need to supply power to the wireless transmission unit, thereby saving electric power, which increases the endurance time of the wireless screen transmission device. Furthermore, a battery with a smaller capacity can meet the needs of practical applications, so that the wireless screen transmission device needs a smaller volume, which meets the current demand for small device, thereby facilitating application and carrying.

A typical embodiment of this application further provides a wireless screen transmission device.

The wireless screen transmission device includes a wireless transmitting unit (which can be implemented by the data transmission module in the above-mentioned embodiment of this application), a vibration sensor, a system chip (which can be implemented by the SoC in the data transmission device in the above-mentioned embodiment of this application, and in some concrete implementations, the system chip can also be used to perform the same functions as the microcontroller in the above-mentioned embodiment), a switch unit (which can be implemented by the controllable switch in the above-mentioned embodiment of this application), and a power supply unit (which can be implemented by the power supply in the above-mentioned embodiment of this application), and the vibration sensor is used to detect whether the wireless screen transmission device is moved in at least one predetermined direction. The system chip is electrically connected to the vibration sensor and the wireless transmitting unit, respectively. The switch unit is electrically connected to the system chip, the power supply unit and the wireless transmitting unit, respectively. The system chip controls the on and off of the switch unit.

In this solution, when the vibration sensor detects the movement of the wireless screen transmission device, the vibration sensor transmits the detected signal to the system chip, and the system chip controls the switch unit to be turned on, so that the power supply unit supplies power to the wireless transmitting unit. The wireless transmitting unit can start to prepare for transmitting data after being powered on, that is, before the wireless screen transmission device is connected to the computer, the wireless transmitting unit is ready to transmit data, which saves the preparation time of data transmission from the computer to the wireless transmitting unit, and further saves the time of transmitting data from the computer to the monitor. Start-up preparation of 3-5 seconds is done before the wireless screen transmission device is connected to the computer, which reduces the waiting time for 3-5 seconds between the time when the user plugs the wireless screen transmission device into the computer and the time when the screen transmission performs normally, as compared with the traditional wireless screen transmission device.

In an embodiment of this application, when the vibration sensor does not detect the movement of the wireless screen transmission device, the system chip controls the switch unit in the disconnection state, and will not supply power to the wireless transmitting unit. Compared with the prior art of constantly supplying power to all circuit modules, when the wireless screen transmission device does not transmit data, the device does not need to supply power to the wireless transmission unit, thereby saving electric power, which increases the endurance time of the wireless screen transmission device. Furthermore, a battery with a smaller capacity can meet the needs of practical applications, so that the wireless screen transmission device needs a smaller volume, which meets the current demand for small device, thereby facilitating application and carrying.

In an embodiment of this application, the system chip is further used to control the computer to transmit data to the wireless transmitting unit.

In an embodiment of this application, the wireless screen transmission device has a shell. The shell has a housing cavity, in which the wireless transmitting unit, the vibration sensor, the system chip, the switch unit, and the power supply unit are located. Therefore, the wireless screen transmission device has a simple structure and takes up less space.

In an embodiment of this application, the power supply unit includes a power management circuit (which can be implemented by the power management module in the above-mentioned embodiment of this application) and a battery, and the power management circuit is electrically connected to the system chip, the battery, and the switch unit, respectively. The battery supplies power to the system chip and the switch unit through the power management circuit. In a concrete implementation of this application, the power management circuit can be a power management chip, and a PMU (power management unit) chip is a highly integrated power management chip for portable applications. The power management chip integrates several types of traditional discrete power management components into a single package, which can achieve higher power conversion efficiency, lower power consumption, and fewer modules to adapt to the reduced board space, and concretely, the power management chip can be the RK805-2 chip, and those skilled in the art can select an appropriate power management chip according to the actual situation.

In an embodiment of this application, the above-mentioned wireless screen transmission device further has a power interface, and the power interface is electrically connected to the power management circuit. Power can be supplied to the wireless screen transmission device through the power interface. Obviously, the battery can also be charged through the power interface.

In an embodiment of this application, the power interface can be one selected from the group consisting of USB interface, Type-C interface, HDMI interface, DP interface, or the like. Since a USB interface is integrated in a general computer, when the USB interface is selected as the power interface, the computer can directly supply power to the wireless screen transmission device. Obviously, if the wireless screen transmission device is not powered by a computer, it can be powered by an external power supply, such as a power bank. The power interface is not limited to the above-mentioned interfaces, and it can be any interface as long as it satisfies that the power interface can supply power to the wireless screen transmission device.

In an embodiment of this application, the battery is a rechargeable battery, specifically a lithium battery. When the wireless screen transmission device is not powered through the power interface, it is possible to supply power by the battery equipped with the wireless screen transmission device itself, so that the power supply mode of the wireless screen transmission device is more flexible, which facilitates carrying the wireless screen transmission device. Moreover, the device does not need to supply power to all circuit modules constantly, that is, only a small-capacity lithium battery needs to be placed in the housing cavity of the device, which is beneficial to the appearance design of the device.

Obviously, the battery of this application is not limited to the lithium battery, and can also be another appropriate battery, and those skilled in the art can select appropriate batteries according to actual conditions.

In an embodiment of this application, the vibration sensor can be at least one selected from the group consisting of an accelerometer, a gyroscope, a displacement sensor, a speed sensor, a vibration sensor, etc., which can detect the movement of the wireless screen transmission device. Those skilled in the art can select the appropriate sensor according to the actual situation. In addition, the position of the vibration sensor in the housing cavity of the wireless screen transmission device can be arranged according to the actual situation. Preferably, the vibration sensor can be arranged at a position sensitive to the movement signal of the wireless screen transmission device. This arrangement can reduce the time period for sensing a movement signal of the screen transmission device by the vibration sensor, thereby reducing the time period for the data transmission time of the wireless screen transmission device.

In an embodiment of this application, the switch unit can be a single-pole double-throw switch, a diode, a transistor, a mercury switch and other electronic components that play a switching function. The switch unit can also be implemented through multiple circuit designs. Those skilled in the art can select an appropriate switch unit according to the actual situation. In a concrete implementation of this application, the switch unit is connected to a certain pin of the system chip, so that the on and off of the switch unit is controlled by controlling the level of the pin. For example, when the pin is at a high level, the switch unit is turned on, and when the pin is at a low level, the switch unit is turned off. Preferably, an electronic component with a small size is selected as the switch unit, which can save space.

In an embodiment of this application, the wireless screen transmission device further includes a wireless receiving unit, which is used to receive data received by the wireless transmitting unit from the computer. The wireless receiving unit transmits the received data to the display unit through the data transmission interface for display. The data transmission interface can be a video interface for outputting data, such as an HDMI interface, a VGA interface, or a DP interface.

Another typical embodiment of this application provides an electronic system, including any one of the above-mentioned wireless screen transmission devices. In the system, when the vibration sensor detects the movement of the wireless screen transmission device, the vibration sensor transmits the detected signal to the system chip, and the system chip controls the switch unit to be turned on, so that the power supply unit supplies power to the wireless transmitting unit. The wireless transmitting unit starts to prepare for transmitting data, that is, before the wireless screen transmission device is connected to the computer, the wireless transmitting unit is ready to transmit data, which saves the preparation time of data transmission from the computer to the wireless transmitting unit, and further saves the time of transmitting data from the computer to the monitor. Start-up preparation of 3-5 seconds is done before the wireless screen transmission device is connected to the computer, which reduces the waiting time for 3-5 seconds between the time when the user plugs the wireless screen transmission device into the computer and the time when the screen transmission performs normally, as compared with the traditional wireless screen transmission device. When the vibration sensor does not detect the movement of the wireless screen transmission device, the system chip controls the switch unit in the disconnection state, and will not supply power to the wireless transmitting unit. Compared with the prior art of constantly supplying power to all circuit modules, when the wireless screen transmission device does not transmit data, the device does not need to supply power to the wireless transmission unit, thereby saving electric power, which increases the endurance time of the wireless screen transmission device. Furthermore, a battery with a smaller capacity can meet the needs of practical applications, so that the wireless screen transmission device needs a smaller volume, which meets the current demand for small device, thereby facilitating application and carrying.

From the above description, it can be seen that the above-mentioned embodiments of this application achieve the following technical effects:

1. The wireless screen transmission device of this application, when the vibration sensor detects the movement of the wireless screen transmission device, the vibration sensor transmits the detected signal to the system chip, and the system chip controls the switch unit to be turned on, so that the power supply unit supplies power to the wireless transmitting unit. The wireless transmitting unit starts to prepare for transmitting data, that is, before the wireless screen transmission device is connected to the computer, the wireless transmitting unit is ready to transmit data, which saves the preparation time of data transmission from the computer to the wireless transmitting unit, and further saves the time of transmitting data from the computer to the monitor. Start-up preparation of 3-5 seconds is done before the wireless screen transmission device is connected to the computer, which reduces the waiting time for 3-5 seconds between the time when the user plugs the wireless screen transmission device into the computer and the time when the screen transmission performs normally, as compared with the traditional wireless screen transmission device.

2. In the system of this application, when the vibration sensor detects the movement of the wireless screen transmission device, the vibration sensor transmits the detected signal to the system chip, and the system chip controls the switch unit to be turned on, so that the power supply unit supplies power to the wireless transmitting unit. The wireless transmitting unit starts to prepare for transmitting data, that is, before the wireless screen transmission device is connected to the computer, the wireless transmitting unit is ready to transmit data, which saves the preparation time of data transmission from the computer to the wireless transmitting unit, and further saves the time of transmitting data from the computer to the monitor. Start-up preparation of 3-5 seconds is done before the wireless screen transmission device is connected to the computer, which reduces the waiting time for 3-5 seconds between the time when the user plugs the wireless screen transmission device into the computer and the time when the screen transmission performs normally, as compared with the traditional wireless screen transmission device. When the vibration sensor does not detect the movement of the wireless screen transmission device, the system chip controls the switch unit in the disconnection state, and will not supply power to the wireless transmitting unit. Compared with the prior art of constantly supplying power to all circuit modules, when the wireless screen transmission device does not transmit data, the device does not need to supply power to the wireless transmission unit, thereby saving electric power, which increases the endurance time of the wireless screen transmission device. Furthermore, a battery with a smaller capacity can meet the needs of practical applications, so that the wireless screen transmission device needs a smaller volume, which meets the current demand for small device, thereby facilitating application and carrying.

Noted that, it should be understood that in the above data transmission device provided by this application, the division of each module can only be a division of logical functions, and can be in whole or in part integrated into a physical entity in actual implementation, or can be physically separated. And these modules can all be implemented in the form of software called by processing elements, or can also be all implemented in the form of hardware. Or, some modules can be implemented in the form of calling software by processing elements, and some modules can be implemented in the form of hardware. For example, the microcontroller in the data transmission device can be a separate processing element, or can be integrated into a chip of the data transmission device for implementation. In addition, these modules can also be stored in the memory of the data transmission device in the form of program code, and a certain processing element of the data transmission device calls and executes the functions of the above data transmission device. The implementation of other modules is similar. In addition, all or part of these modules can be integrated together or implemented independently. The processing element described herein can be an integrated circuit. In the implementation process, each step of the above method or each of the above modules can be completed by an integrated logic circuit of hardware in the processor element or instructions in the form of software. For example, the above modules can be one or more integrated circuits configured to implement the above methods, for example, one or more specific integrated circuits (application specific integrated circuit, ASIC), or one or more microprocessors (digital signal processor, DSP), or, one or more field programmable gate arrays (FPGA), etc. In another example, when one of the above modules is implemented in the form that the processing element schedules program codes, the processing element can be a general-purpose processor, such as a central processing unit (CPU) or other processors that can call program codes. For another example, these modules can be integrated together and implemented in the form of system-on-a-chip (SOC).

The above-mentioned embodiments can be implemented in whole or in part by software, hardware, firmware, or any combination thereof. When implemented by software, the embodiments can be implemented in the form of a computer program product in whole or in part. The computer program product includes one or more computer instructions. When the computer program instructions are loaded and executed on the computer, the embodiments are generated according to the processes or functions described in the embodiments of this application in whole or in part. The computer can be a general-purpose computer, a dedicated computer, a computer network, or other programmable devices. The computer instructions can be stored in a computer-readable storage medium or transmitted from one computer-readable storage medium to another computer-readable storage medium. For example, the computer instructions can be transmitted from a website, a computer, a server, or a data center to another website, computer, server or data center via wired (such as coaxial cable, optical fiber, digital subscriber line (DSL)) or wireless (such as infrared, wireless, microwave, etc.) methods. The computer-readable storage medium can be any available medium that can be connected to a computer or a data storage device such as a server or data center integrated with one or more available media. The computer-readable storage medium can be a magnetic medium (for example, a floppy disk, a hard disk, a magnetic tape), an optical medium (for example, digital video disc, DVD), a semiconductor medium (for example, a solid state disk (SSD)), or the like.

In the embodiments of this application, "at least one" refers to one or more, and "multiple" refers to two or more. "And/or" describes the association relationship of the associated objects, instructing that there can be three relationships, for example, A and/or B, which can mean either A exists alone, or both A and B exist, or B exists alone, wherein A, B can be singular or plural. It can be understood that the various numerical numbers involved in the embodiments of this application are only for the convenience of description, and are not used to limit the scope of the embodiments of this application. It can be understood that, in the embodiments of this application, the magnitude of the sequence numbers of the above-mentioned processes does not imply the order of execution. The execution order of each process should be determined by its function and internal logic, and should not constitute any limitation to the implementation process of the embodiments of this application.

Finally, it should be noted that the above embodiments are only used to illustrate the technical solutions of the application, not to limit it. Although the application has been described in detail with reference to the above-mentioned embodiments, those skilled in the art should understand that it is still possible to modify the technical solutions described in the above-mentioned embodiments, or equivalently replace some or all of the technical features. These modifications or replacements do not make the essence of the corresponding technical solutions deviate from the technical solutions of the embodiments of the application range.

What is claimed is:

1. A data transmission method, applied to a data transmission device,
wherein the data transmission device comprises:
a power supply;
a microcontroller;
a communication interface;
a vibration sensor;
a controllable switch; and
a data transmission module, wherein the controllable switch is connected between the power supply and the data transmission module, the communication interface is configured to receive data from an electronic device and transmit the received data to the data transmission module, the vibration sensor is configured to generate detection data according to movement of the data transmission device, the data transmission module is used for data communication with a display device, and the microcontroller is configured to control on and off of the controllable switch according to an interrupt signal transmitted by the vibration sensor, and
wherein the data transmission method comprises:
generating, by the vibration sensor, the detection data according to the movement of the data transmission device, wherein the detection data comprises an acceleration value of the vibration sensor itself;
transmitting, by the vibration sensor, the interrupt signal to the microcontroller when the vibration sensor determines that the acceleration value of the vibration sensor itself exceeds a preset acceleration threshold;
transmitting, by the microcontroller, a first connection signal to the controllable switch after the microcontroller receives the interrupt signal;
turning on the controllable switch according to the first connection signal and connecting a power connection between the power supply and the data transmission module;
after the electronic device is connected to the communication interface, receiving, by the data transmission module, streaming media data from the communication interface, and encoding the streaming media data; and
transmitting, by the data transmission module, the encoded streaming media data to the display device.

2. The method according to claim 1, wherein the data transmission device further comprises an external power detection module, and the external power detection module is configured to detect whether an external power supply is connected to the communication interface, and wherein the method further comprises:
transmitting, by the external power detection module, a second connection signal to the controllable switch when the external power detection module does not detect that the external power supply is connected to the communication interface,
wherein turning on the controllable switch according to the first connection signal and connecting a power connection between the power supply and the data transmission module comprise:
turning on the controllable switch according to the first connection signal and the second connection signal, and connecting the power connection between the power supply and the data transmission module.

3. The method according to claim 2, wherein, after the power connection between the power supply and the data transmission module is connected, the method further comprises:
when the external power detection module detects that the external power supply is connected to the communication interface, transmitting, by the external power detection module, a second disconnection signal to the controllable switch; and turning off the controllable switch according to the second disconnection signal and disconnecting the power connection between the power supply and the data transmission module.

4. The method according to claim 2, wherein, after the power connection between the power supply and the data transmission module is connected, the method further comprises:
if the microcontroller determines that no external power supply is connected to the communication interface within a first preset time after the first connection signal is transmitted to the controllable switch, transmitting, by the microcontroller, a first disconnection signal to the controllable switch after the first preset time; and
turning off the controllable switch according to the first disconnection signal and disconnecting the power connection between the power supply and the data transmission module.

5. The method according to claim 3, wherein, after the power connection between the power supply and the data transmission module is disconnected, the method further comprises:
when the external power detection module detects that the external power supply is separated from the communication interface and no external power supply is connected to the communication interface, transmitting, by the external power detection module, the second connection signal to the controllable switch; and
within a second preset time after the external power supply is separated from the communication interface, transmitting, by the microcontroller, the first connection signal to the controllable switch.

6. The method according to claim 5, further comprising:
transmitting, by the microcontroller, the first disconnection signal to the controllable switch after the second preset time.

7. The method according to claim 1, further comprising:
performing, by the data transmission module, a communication configuration, wherein the communication configuration comprises a first communication configuration of the communication interface, and a second communication configuration for the data communication between the data transmission module and the display device.

8. A data transmission device, comprising:
a power supply;
a microcontroller;
a communication interface;
a vibration sensor;
a controllable switch; and
a data transmission module, wherein the controllable switch is connected between the power supply and the data transmission module, the communication interface is configured to receive data from an electronic device and transmit the received data to the data transmission module, the vibration sensor is configured to generate detection data according to movement of the data transmission device,
wherein the detection data carries an acceleration value of the vibration sensor itself, and
wherein the vibration sensor is configured to transmit an interrupt signal to the microcontroller according to the acceleration value of the vibration sensor itself and a preset acceleration threshold, the data transmission module is used for data communication with a display device, and the microcontroller is configured to control on and off of the controllable switch according to the interrupt signal transmitted by the vibration sensor, and
wherein, after the electronic device is connected to the communication interface, the data transmission module is configured to receive streaming media data from the communication interface, encode the streaming media data, and transmit the encoded streaming media data to the display device.

9. The data transmission device according to claim 8, further comprising:
an external power detection module, which is connected to the communication interface and the controllable switch, wherein the external power detection module is configured to detect whether an external power supply is connected to the communication interface.

10. The data transmission device according to claim 9, wherein the external power detection module comprises a first bipolar junction transistor (BJT), and
wherein a base of the first BJT is connected to the communication interface, an emitter of the first BJT is grounded, and a collector of the first BJT is connected to the power supply, and
wherein, when the base of the first BJT is connected to the external power supply, the collector transmits a second interrupt signal for instructing to turn off the controllable switch, and when no external power supply is connected to the base of the first BJT, the collector transmits a second connection signal for instructing to turn on the controllable switch.

11. The data transmission device according to claim 10, wherein the external power detection module and the microcontroller are configured together to control the on and off of the controllable switch,
wherein the controllable switch is turned on when the controllable switch receives a first signal for instructing connection of the controllable switch transmitted by the external power detection module and a second signal for instructing connection of the controllable switch transmitted by the microcontroller, and
wherein the controllable switch is turned off when the controllable switch receives a third signal for instructing disconnection of the controllable switch transmitted by the external power detection module or a fourth signal for instructing disconnection of the controllable switch transmitted by the microcontroller.

12. The data transmission device according to claim 11, further comprising a logic gate circuit,
wherein the logic gate circuit is configured to control the on and off of the controllable switch according to instruction signals from the external power detection module and the microcontroller.

13. The data transmission device according to claim 12, wherein the controllable switch comprises a field effect transistor,
wherein a gate of the field effect transistor is connected to an output end of the logic gate circuit, and
wherein a source of the field effect transistor is connected to the power supply and a drain of the field effect transistor is connected to the data transmission module, or wherein the drain of the field effect transistor is connected to the power supply and the source of the field effect transistor is connected to the data transmission module.

14. The data transmission device according to claim 13, wherein the logic gate circuit comprises an AND gate circuit,
  wherein the microcontroller is configured to transmit a first connection signal to a first input end of the AND gate circuit,
  wherein the external power detection module is configured to control, when no external power supply is connected to the base of the first BJT, the collector of the first BJT transmitting the second connection signal to the second input end of the AND gate circuit, and
  wherein the AND gate circuit is configured to output a control signal to the gate of the field effect transistor according to the first connection signal and the second connection signal, and to control to connect the source of the field effect transistor and the drain of the field effect transistor through the gate of the field effect transistor.

15. The data transmission device according to claim 14, wherein the external power detection module is configured to control, when the base of the first BJT is connected to an external power supply, the collector of the first BJT transmitting a second disconnection signal to the second input end of the AND gate circuit, and
  wherein the AND gate circuit is configured to output a control signal to the gate of the field effect transistor according to the second disconnection signal, and to control to break off the source of the field effect transistor and drain of the field effect transistor through the gate of the field effect transistor.

16. The data transmission device according to claim 9, wherein the external power detection module is also connected to the microcontroller, and
  wherein the microcontroller is configured to determine with the external power detection module whether an external power supply is connected to the communication interface.

17. The data transmission device according to claim 16, wherein the microcontroller is configured to control, after the power connection between the power supply and the data transmission module is connected, in response to the external power detection module determines that no external power supply is connected to the communication interface within a first preset time, the microcontroller transmitting a first disconnection signal to the controllable switch after the first preset time, and
  wherein the controllable switch is configured to be turned off according to the first disconnection signal.

18. The data transmission device according to claim 16, wherein the microcontroller is configured to, when the external power detection module detects that an external power supply is connected to the communication interface and then separated from the communication interface, transmit the first connection signal to the controllable switch within a second preset time after the external power supply is separated from the communication interface.

19. The data transmission device according to claim 18, wherein the microcontroller is configured to transmit the first disconnection signal to the controllable switch after the second preset time.

* * * * *